(12) United States Patent  
Matsubara et al.

(10) Patent No.: US 7,868,881 B2  
(45) Date of Patent: Jan. 11, 2011

(54) PICTURE DISPLAY DEVICE AND PICTURE DISPLAY METHOD

(75) Inventors: Yoshiaki Matsubara, Tokyo (JP); Nobuo Yamazaki, Chiba (JP); Hirotaka Takegoshi, Kanagawa (JP)

(73) Assignee: Sony Corporation (JP)

( * ) Notice: Subject to any disclaimer, the term of this patent is extended or adjusted under 35 U.S.C. 154(b) by 855 days.

(21) Appl. No.: 11/650,125

(22) Filed: Jan. 4, 2007

(65) Prior Publication Data

US 2007/0109287 A1     May 17, 2007

Related U.S. Application Data

(62) Division of application No. 09/936,158, filed as application No. PCT/JP01/00058 on Jan. 10, 2001, now Pat. No. 7,176,908.

(30) Foreign Application Priority Data

Jan. 12, 2000   (JP)  ............................ P2000-003363  
Feb. 22, 2000   (JP)  ............................ P2000-044447  
Feb. 22, 2000   (JP)  ............................ P2000-044448

(51) Int. Cl.  
*G09G 5/00*     (2006.01)

(52) U.S. Cl. .................. 345/204; 345/632; 345/633; 345/634; 345/635

(58) Field of Classification Search ............... 345/1.1, 345/1.2, 168, 204, 443, 501, 503, 632–635, 345/690, 698, 733–736, 568, 750, 593, 601; 348/553, 556, 806; 710/8, 65; 725/35; 709/204  
See application file for complete search history.

(56) References Cited

U.S. PATENT DOCUMENTS 5,293,468 A  *   3/1994   Nye et al. .................... 345/593

(Continued)

FOREIGN PATENT DOCUMENTS

EP              950944          10/1999

(Continued)

OTHER PUBLICATIONS

NA9309423 Publication-Data: IBM Technical Disclosure Bulletin, Sep. 1993, US vol. No. 36 Issue No. 9A Page No. 423-428 Publication-Date: Sep. 1, 1993 Cross Reference: 0018-8689-36-9A-423 Disclosure Title: Window of Focus for Variable Resolution Display of Video.*

*Primary Examiner*—Prabodh M Dharia  
(74) *Attorney, Agent, or Firm*—Lerner, David, Littenberg, Krumholz & Mentlik, LLP

(57) ABSTRACT

A picture display device displays a video signal supplied from a data process device. Bi-directional communication is carried out with each of a plurality of data process devices. A plurality of video signals is combined into one screen corresponding to information of the picture size of each of the plurality of video signals obtained by the bi-directional communication with each of the plurality of data process devices. A video signal, outputted when the plurality of video signals is combined, is displayed. A second control signal is generated which controls the plurality of data process devices and which corresponds to a first control signal that corresponds to a user operation. The first control signal and the second control signal are transmitted to the plurality of data process devices. The plurality of data process devices also communicate bi-directionally with each other.

19 Claims, 37 Drawing Sheets

U.S. PATENT DOCUMENTS

| | | | |
|---|---|---|---|
| 5,343,409 A | | 8/1994 | Satterfield et al. |
| 5,400,057 A | * | 3/1995 | Yin .......................... 345/601 |
| 5,548,696 A | * | 8/1996 | Kubota et al. ............... 345/639 |
| 5,602,567 A | | 2/1997 | Kanno et al. |
| 5,771,047 A | | 6/1998 | Ohba et al. |
| 5,818,416 A | * | 10/1998 | Hwang ....................... 345/667 |
| 6,067,098 A | * | 5/2000 | Dye ........................... 345/531 |
| 6,108,460 A | * | 8/2000 | Rich .......................... 382/304 |
| 6,175,347 B1 | | 1/2001 | Shindo et al. |
| 6,195,104 B1 | | 2/2001 | Lyons |
| 6,330,005 B1 | | 12/2001 | Tonelli et al. |
| 6,362,853 B1 | | 3/2002 | Ouchiyama et al. |
| 6,366,262 B1 | | 4/2002 | Amell et al. |
| 6,380,990 B1 | | 4/2002 | Bessel |
| 6,519,628 B1 | * | 2/2003 | Locascio .................... 709/204 |
| 6,562,001 B2 | * | 5/2003 | Lebel et al. ................... 604/65 |
| 6,677,950 B1 | | 1/2004 | Ohba et al. |
| 6,738,978 B1 | | 5/2004 | Hendricks et al. |
| 6,933,956 B2 | | 8/2005 | Sato et al. |
| 7,176,908 B2 | * | 2/2007 | Matsubara et al. .......... 345/204 |
| 2002/0087761 A1 | | 7/2002 | Clapp et al. |
| 2003/0058262 A1 | | 3/2003 | Sato et al. |
| 2003/0185298 A1 | | 10/2003 | Alvarez et al. |
| 2004/0160533 A1 | | 8/2004 | Oku et al. |
| 2004/0236874 A1 | | 11/2004 | Largman et al. |
| 2005/0253966 A1 | | 11/2005 | Mertens |

FOREIGN PATENT DOCUMENTS

| | | |
|---|---|---|
| JP | 4-295926 | 10/1992 |
| JP | 6-202834 | 7/1994 |
| JP | 7-271966 | 10/1995 |
| JP | 10-083273 | 3/1998 |
| JP | 10-133821 | 5/1998 |
| JP | 10-187303 | 7/1998 |
| JP | 10-387303 | 7/1998 |
| JP | 11-167479 | 6/1999 |
| JP | 11-126119 | 11/1999 |
| JP | 2000-10680 | 1/2000 |
| JP | 2000-214836 | 4/2000 |
| JP | 2000-305543 | 4/2000 |

* cited by examiner

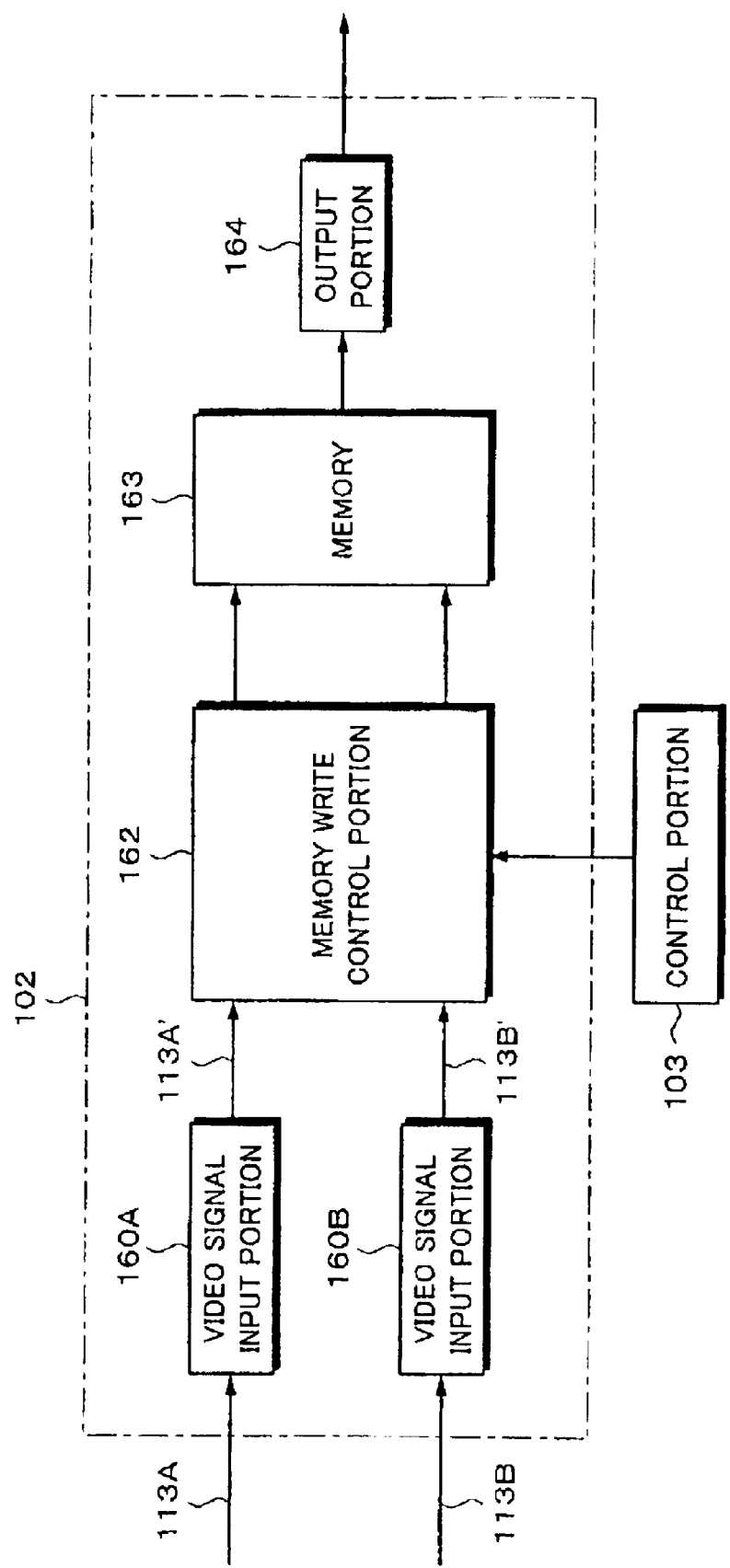

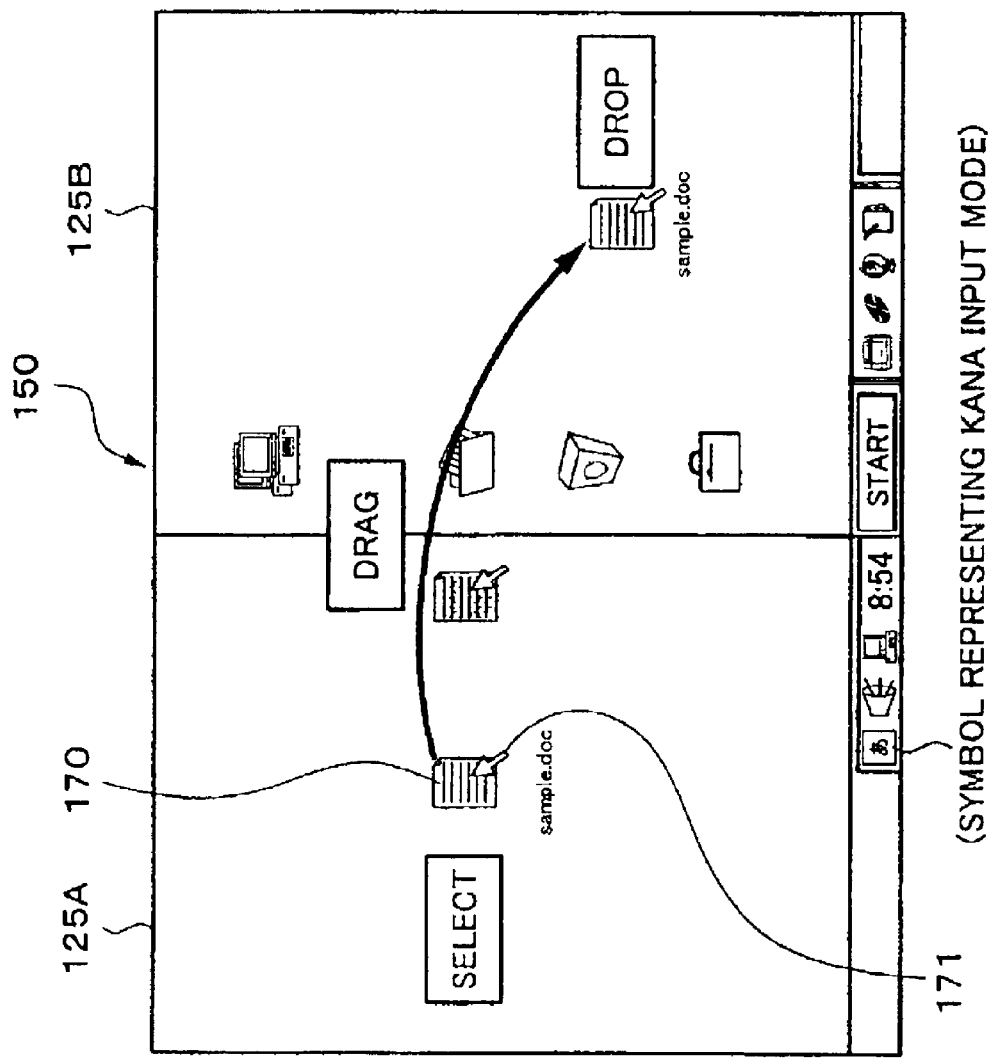

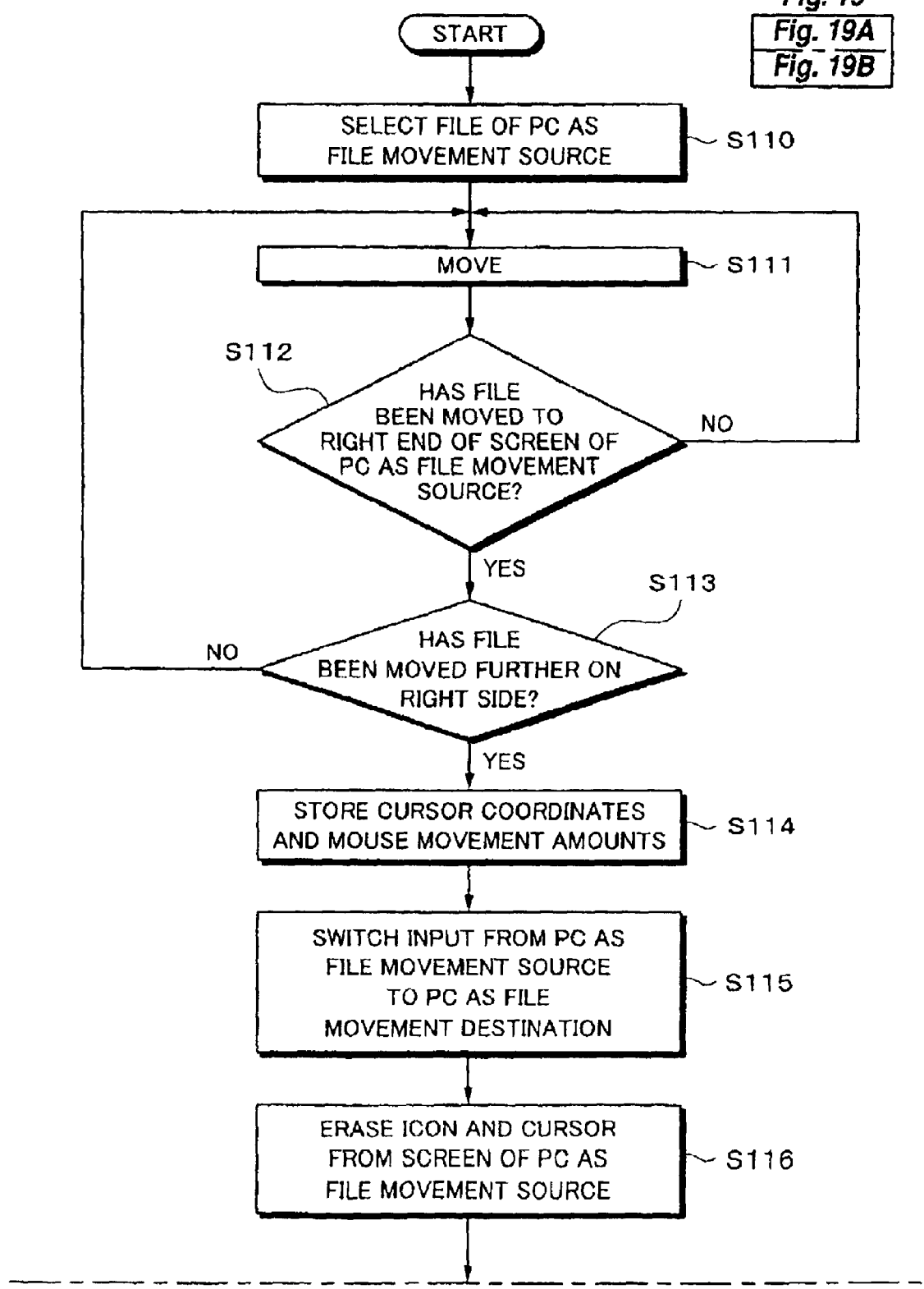

*Fig. 23*
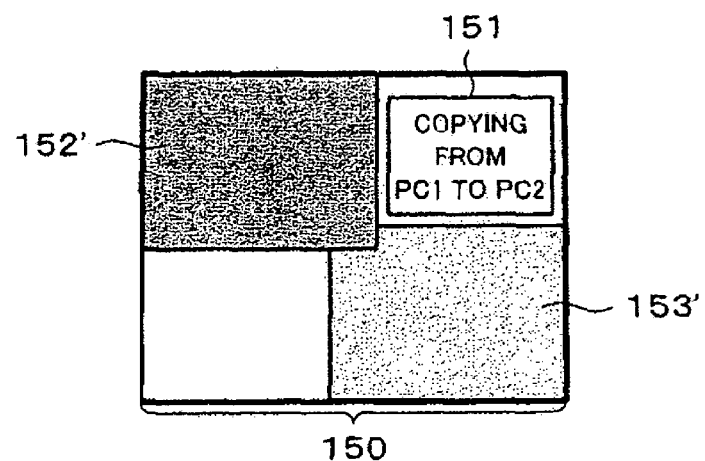
*Fig. 24A*  *Fig. 24B*
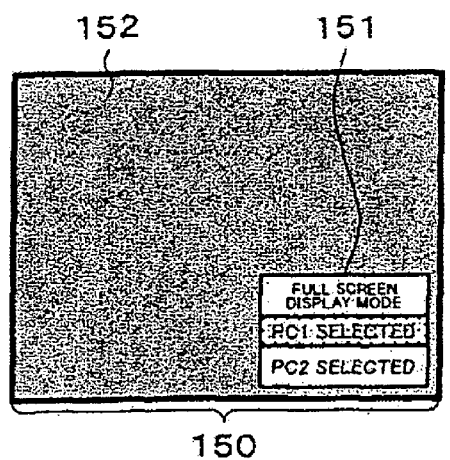 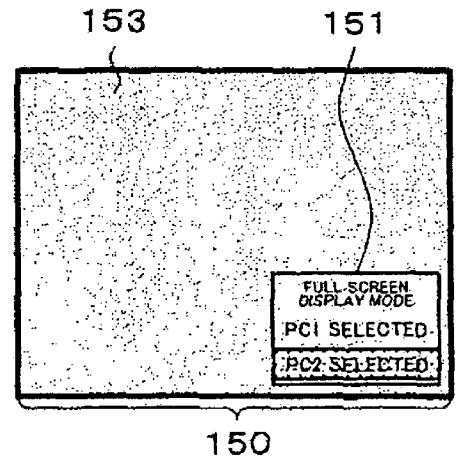

PICTURE DISPLAY DEVICE AND PICTURE DISPLAY METHOD

CROSS-REFERENCE TO RELATED APPLICATIONS

This application is a division of U.S. application Ser. No. 09/936,158, filed Feb. 28, 2002, which is a national stage of International Application No. PCT/JP01/00058, filed Jan. 10, 2001, which claims priority from Japanese Patent Application Nos. P2000-003363, filed Jan. 12, 2000, P2000-044447, filed Feb. 22, 2000, and P2000-044448, filed Feb. 22, 2000, the disclosures of which are incorporated herein by reference.

BACKGROUND OF THE INVENTION

The present invention relates to a picture display device and a picture display method that allow a plurality of computer devices to be connected, display screens thereof to be displayed on one screen, and the connected computer devices connected to be controlled by a common input device.

Conventional computer devices are connected to an external monitor device and input devices such as a keyboard and a mouse. A user operates the input devices corresponding to a display on the monitor device so as to cause application software to perform a data process or the like.

Depending on a desired process and user's requirement, a plurality of computer devices may be activated and operated in parallel. In this case, from a viewpoint of the installation space of the monitor device and so forth, it is preferred to connect a plurality of computer devices to one monitor device.

FIG. 1 shows an example of which two computer devices 501A and 501B are connected to one monitor device 500 according to related art. In the following description, it is assumed that the computer devices are personal computers. The monitor device 500 can input two channels of video signals. A video signal 502A that is output from the personal computer main body 501A is input to a first video input terminal (not shown) of the monitor device. Likewise, a video signal 502B that is output from the personal computer main body 501B is input to a second video input terminal (not shown) of the monitor device 500.

A display portion 507 of the monitor device 500 displays contents corresponding to the video signals that are input from the first and second video input terminals. The monitor device 500 has an operation switch 505 on its front panel. For example, by operating the operation switch 505, an OSD (On Screen Display) screen 506 that represents settings of the monitor device 500 can be displayed in a predetermined area of the display portion 507. In addition, by operating the operation switch 505 in a predetermined manner, setting values of the monitor device 500 (for example, contrast, brightness, hue, and so forth) can be changed. Corresponding to the changed values, the display picture quality of the monitor device 500 are changed. In addition, a display of the OSD screen 506 is updated.

As input devices that allow a user's command to be input to the personal computer main body 501A, a keyboard 503A and a mouse 504A are connected thereto. The keyboard 503A transmits input key information to the personal computer main body 501A. The mouse 504A transmits the movement amounts in the (X, Y) directions of the mouse 504A and button operation information thereof to the personal computer main body 501A.

For example, the personal computer main body 501A converts the mouse movement amounts supplied from the mouse 504A into coordinates on the display portion 507 of the monitor device 500 so as to generate a video signal for displaying a cursor on the coordinates. The video signal for displaying the cursor is superimposed with the video signal 502A. The superimposed signal is supplied to the monitor device 500. As a result, the monitor device 500 displays a cursor 508.

Likewise, a keyboard 503B and a mouse 504B are connected to the personal computer main body 501B. Key information, mouse movement amounts, and button operation information are transmitted to the personal computer main body 501B. In the same manner as the personal computer main body 501A, the cursor 508 is displayed.

In the related art shown in FIG. 1, the video signal is statically switched between the video signal 502A of the personal computer main body 501A and the video signal 502B of the personal computer main body 501B by operating for example the operation switch 505.

FIG. 2 shows an example of the structure of the above-described monitor device 500. The video signal 502A that is output from the personal computer main body 501A and the video signal 502B that is output from the personal computer main body 501B are input to a first input terminal and a second input terminal of a video switch 512. The video switch 512 is controlled by a CPU 511 (that will be described later) so as to select one of the video signals that are input to the first input terminal and the second input terminal. The selected video signal is output from the video switch 512 and supplied to a first input terminal of a video mix circuit 514.

The monitor device 500 has the above-mentioned CPU 511. A signal corresponding to the operation of the operation switch 505 is supplied to the CPU 511. When the operation of the operation switch 505 represents the switching between the personal computer main body 501A and the personal computer main body 501B, a control signal that causes an input to be switched is supplied from the CPU 511 to the video switch 512.

When the operation of the operation switch 505 represents the displaying of the OSD screen 506, a command that causes the OSD screen 506 to be displayed is supplied from the CPU 511 to a character generator 513. The character generator 513 generates a video signal for displaying the OSD screen 506 corresponding to the supplied command. The generated video signal is for example RGB signals. The video signal is supplied to a second input terminal of the video mix circuit 514.

The video mix circuit 514 switches the video signals supplied to the first and second input terminals at predetermined timings so that the OSD screen 506 is displayed at a predetermined area of the display portion 507. A video signal that is output from the video mix circuit 514 is supplied to a picture display device 516 composed of for example a CRT (Cathode Ray Tube) or an LCD (Liquid Crystal Display) and a corresponding drive circuit through a display control circuit 515.

The picture display device 516 causes the display portion 507 to display a picture corresponding to the frequency and resolution of the supplied video signal. For example, the picture display device 516 detects a horizontal synchronous signal and a vertical synchronous signal contained in the supplied video signal so as to obtain the horizontal frequency and vertical frequency.

When the settings of the monitor device 500 are changed by an operation of the operation switch 505, a control signal corresponding to the changed settings is supplied form the CPU 511 to the display control circuit 515. Corresponding to the control signal, the video signal supplied to the display control circuit 515 is processed so as to adjust the display picture quality and so forth of the picture display device 516.

Since the computer devices 501A and 501B are connected to the monitor device 500 in such a manner, when the user operates the operation switch 505 in a predetermined manner, the personal computer main bodies 501A and 501B can be switchably operated. When the personal computer main body 501A has been selected, the user can operate it using the mouse 504A and the keyboard 503A while observing the display of the monitor device 500. Likewise, when the personal computer main body 501B has been selected, the user can operate it using the mouse 504B and the keyboard 503B while observing the display of the monitor device 500.

In addition, as shown in FIG. 3, when a plurality of personal computer main bodies 501A and 501B connected to the monitor device 500 are connected through a network 520, a data communication can be performed between the personal computer main bodies 501A and 501B. For example, a file can be transferred from the personal computer main body 501A to the personal computer main body 501B through the network 520.

Conventionally, even if a plurality of computer devices are connectable to one monitor device, the video switch that switches video signals of the plurality of computer devices that are connected is static as was described above. In addition, the frequencies of the video signals that are input from the plurality of computer devices are different and asynchronous. Thus, there is a problem of which video signals of a plurality of computer devices cannot be displayed on one monitor device at a time.

In other words, conventionally, to display video signals of for example two computer devices at a time, it is inevitable to use two monitor devices corresponding to the computer devices.

In addition, conventionally, to operate a plurality of computer devices, a corresponding number of sets of input devices such as keyboards and mice are required. Thus, from view points of installation space and operability, the conventional method is not effective.

In addition, the signal formats of video signals supplied from a plurality of computer devices connected to one monitor device are subject to be different and asynchronous. In such a case, in particular, when the monitor device 500 uses a CRT as a picture display device, to switch a plurality of video signals, it takes a time to determine the system of the supplied video signals. Thus, conventionally, a plurality of video signals cannot be quickly switched.

In addition, even if two personal computers 501A and 501B are connected to the monitor device 500, since the monitor device 500 can display only a video signal supplied from only one personal computer, the user should operate the operation switch 505 so as to manually select one of the personal computers 501A and 501B. Thus, even if the personal computer main body 501A and the personal computer main body 501B are connected through the network 520 as shown in FIG. 3, when the user tries to operate a file between the two personal computers 501A and 501B, the operation procedure becomes troublesome and takes a long time to switch the two personal computers. Consequently, the operability becomes low and the operation becomes inconvenient.

Depending on the OS (Operating System) for use, to operate a file between two different personal computers, it is necessary to exchange data therebetween through a common folder that can be accessed from the two personal computers. For example, when a file of the personal computer 501A is opened by an application of the personal computer 501B, the user selects the signal 502A using the operation switch 505, causes a picture of the personal computer 501A to be displayed, and moves or copies a desired file to the common folder. Thereafter, the user selects the signal 502B using the operation switch 505 and causes the monitor device 500 to display the screen of the personal computer 501B. Thereafter, the user opens the common folder, selects a desired file of the folder, and causes the application of the personal computer main body 501B to open the selected file. Thus, according to the related art, even if data is transferred between the personal computer 501A and the personal computer 501B, the process becomes troublesome.

SUMMARY OF THE INVENTION

According to an aspect of the present invention is a picture display device for displaying a video signal supplied from a data process device, comprising a display means for displaying a video signal, a display control means for controlling the display means to display a plurality of video signals supplied from a plurality of data process devices at a time, an input device connection means to which an input device for outputting a first control signal is output corresponding to a user's operation, and a control signal output means for outputting the first control signal supplied from the input device to the plurality of data process devices.

According to another aspect of the present invention is a picture display method for displaying a video signal supplied from a data process device, comprising the steps of displaying a video signal, controlling displays of a plurality of video signals supplied from a plurality of data process devices at a time at the displaying step, and outputting a first control signal to the plurality of data process devices, the first control signal being supplied from an input device connected to an input device connection means, the first control the input device configured for outputting the first control signal corresponding to a user's operation.

According to yet another aspect of the present invention is a picture display device for displaying a video signal supplied from a data process device, comprising an input means for inputting a plurality of video signals that are output from a plurality of data process devices, a communication means for bi-directionally communicating with each of the plurality of data process devices, a video process means for combining the plurality of video signals that are input by the input means into one screen corresponding to information of the picture size of each of the plurality of video signals that the communication means communicates with each of the plurality of data process devices, a display means for displaying a video signal that is output from the video signal process means, an input device connection means to which an input device is connected, the input device being configured for outputting a first control signal corresponding to a user's operation, a transmission means for generating a second control signal for controlling the plurality of data process devices corresponding to the first control signal that is output from the input device connection means and causing the communication means to transmit the first control signal and the second control signal to the plurality of data process devices, and a communication control means for controlling the communication means to communicate with the plurality of data process devices.

According to still another aspect of the present invention is a picture display method for displaying a video signal supplied from a data process device, comprising the steps of inputting a plurality of video signals that are output from a plurality of data process devices, bi-directionally communicating with each of the plurality of data process devices, combining the plurality of video signals that are input at the input step into one screen corresponding to information of the picture size of each of the plurality of video signals obtained at the communication step with each of the plurality of data process devices, displaying a video signal that is output at the video signal process step, generating a second control signal for controlling the plurality of data process devices corresponding to a first control signal that is output from input device connection means and causing communication means to transmit the first control signal and the second control signal to the plurality of data process devices, an input device being connected to the input device connection means, the input device being configured for outputting the first control signal corresponding to a user's operation, and controlling communications with the plurality of data process devices so that they bi-directionally communicate with each other.

According to a further aspect of the present invention is a picture display device for displaying a video signal supplied from a data process device, comprising a communication means for bi-directionally communicating with each of a plurality of data process devices, a video process means for combining the plurality of video signals into one screen corresponding to information of picture sizes of the plurality of video signals that the communication means communicates with the plurality of data process devices, a display means for displaying a video signal that is output from the video signal process means, an input device connection means to which an input device is connected, the input device being configured for outputting a first control signal corresponding to a user's operation, a transmission means for generating a second control signal for controlling the plurality of data process devices corresponding to the first control signal that is output from the input device connection means and causing the communication means to transmit the first control signal and the second control signal to the plurality of data process devices, and a communication control means for controlling the communication means to communicate with the plurality of data process devices.

According to a still further aspect of the present invention is a picture display method for displaying a video signal supplied from a data process device, comprising the steps of bi-directionally communicating with each of a plurality of data process devices, combining the plurality of video signals into one screen corresponding to information of the picture size of each of the plurality of video signals obtained at the communication step with each of the plurality of data process devices, displaying a video signal that is output at the video signal process step, generating a second control signal for controlling the plurality of data process devices corresponding to a first control signal that is output from input device connection means and causing the communication step to transmit the first control signal and the second control signal to the plurality of data process devices, an input device being connected to the input device connection means, the input device being configured for outputting the first control signal corresponding to a user's operation, and controlling communications with the plurality of data process devices so that they bi-directionally communicate with each other.

According to yet a further aspect of the present invention is a picture display device for displaying a video signal supplied from a data process device, comprising an input means for allowing a plurality of video signals that are output from a plurality of data process devices to be input, a communication means for bi-directionally communicating with each of the plurality of data process devices, a video process means for combining the plurality of video signals into one screen corresponding to information of the picture size of each of the plurality of video signals that the communication means communicates with each of the plurality of data process devices, a display means for displaying a video signal that is output from the video signal process means, an input device connection means to which an input device is connected, the input device being configured for outputting a first control signal corresponding to a user's operation, a transmission means for generating a second control signal for controlling the plurality of data process devices corresponding to the first control signal that is output from the input device connection means and causing the communication means to transmit the first control signal and the second control signal to the plurality of data process devices, and a control means for controlling a data transfer among the plurality of data process devices on the same screen of the display means using the input device.

According to an additional aspect of the present invention is a picture display method for displaying a video signal supplied from a data process device, comprising the steps of allowing a plurality of video signals that are output from a plurality of data process devices to be input, bi-directionally communicating with each of the plurality of data process devices, combining the plurality of video signals into one screen corresponding to information of the picture size of each of the plurality of video signals obtained at the communication step with each of the plurality of data process devices, displaying a video signal that is output at the video signal process step, generating a second control signal for controlling the plurality of data process devices corresponding to a first control signal that is output from input device connection means and causing the communication step to transmit the first control signal and the second control signal to the plurality of data process devices, an input device being connected to the input device connection means, the input device being configured for outputting the first control signal corresponding to a user's operation, and controlling a data transfer among the plurality of data process devices on the same screen o the display means using the input device.

According to a still additional aspect of the present invention is a picture display device for displaying a video signal supplied from a data process device, comprising a display means for allowing a plurality of video signals that are output from a plurality of data process devices to be input and displaying the plurality of video signals that have been input on the same screen, an input device connection means to which an input device for controlling a data process device selected from the plurality of data process devices is connected, and a control means for controlling a data transfer among the plurality of data process devices on the same screen of the display means using the input device.

According to yet an additional aspect of the present invention is a picture display method for displaying a video signal supplied from a data process device, comprising the steps of allowing a plurality of video signals that are output from a plurality of data process devices to be input and displaying the plurality of video signals that have been input on the same screen, controlling a data process device selected from the plurality of data process devices by a connected input device, and controlling a data transfer among the plurality of data process devices on the same screen displayed at the display step using the input device.

According to a further additional aspect of the present invention is a picture display device for displaying a video signal supplied from a data process device, comprising an input means for allowing a plurality of video signals that are output from a plurality of data process devices to be input, a frequency measuring means for measuring synchronous frequencies of the plurality of video signals, a video signal process means for combining the plurality of video signals into one screen corresponding to the measured results of the frequency measuring means, a display means for displaying a video signal that is output from the video signal process means, an input device connection means to which an input device is connected, the input device being configured for outputting a first control signal corresponding to a user's operation, a control means for generating a second control signal for controlling the plurality of data process devices corresponding to the first control signal that is output from the input device connection means, and a communication means for transmitting the first control signal and the second control signal to the plurality of data process devices.

According to another additional aspect of the present invention is a picture display method for displaying a video signal supplied from a data process device, comprising the steps of allowing a plurality of video signals that are output from a plurality of data process devices to be input, measuring the synchronous frequencies of the plurality of video signals, combining the plurality of video signals into one screen corresponding to the measured results at the frequency measuring step, displaying a video signal that is output at the video signal process step, generating a second control signal for controlling the plurality of data process devices corresponding to a first control signal that is output from input device connection means, an input device being connected to the input device connection means, the input device being configured for outputting the first control signal corresponding to a user's operation, and transmitting the first control signal and the second control signal to the plurality of data process devices.

As was described above, according to one or more of the above aspects of the present invention, a plurality of video signals supplied from a plurality of data process devices are displayed on a picture display means at a time. A first control signal that is supplied from an input device corresponding to a user's operation is output to the plurality of data process devices. Thus, corresponding to a display of the picture display means, using one set of input devices, the plurality of data process devices can be controlled.

According to one or more of the above aspects of the present invention, a plurality of video signals that are output from a plurality of data process devices can be input. The plurality of data process devices can bi-directionally communicate with each other. The plurality of video signals that are input at the input step are combined into one screen corresponding to information of the picture size of each of the plurality of video signals obtained at the communication step with each of the plurality of data process devices and displayed by a display means. A first control signal that is output from an input device by a user's operation and a second control signal that controls the plurality of data process devices are transmitted to the plurality of data process devices. The second control signal is generated corresponding to the first control signal. In addition, the plurality of data process devices communicate with each other. Thus, while observing the display of the display means, the communications among the plurality of data process devices can be controlled corresponding to an operation of the input device.

Also, according to one or more of the above aspects of the present invention, a plurality of data process devices bi-directionally communicate with each other. The plurality of video signals are combined into one screen corresponding to information of the picture size of each of the plurality of video signals obtained at the communication step with each of the plurality of data process devices and displayed by a display means. A first control signal that is output from an input device by a user's operation and a second control signal that controls the plurality of data process devices are transmitted to the plurality of data process devices. The second control signal is generated corresponding to the first control signal. In addition, the plurality of data process devices communicate with each other. Thus, while observing the display of the display means, the communications among the plurality of data process devices can be controlled corresponding to an operation of the input device.

Further, according to one or more of the above aspects of the present invention, a plurality of video signals that are output from a plurality of data process devices can be input. In addition, the plurality of data process device can bi-directionally communicate with each other. The plurality of video signals are combined into one screen corresponding to information of the picture size of each of the plurality of video signals obtained at the communication step with each of the plurality of data process devices and displayed by a display means. A first control signal that is output from an input device by a user's operation and a second control signal that controls the plurality of data process devices are transmitted to the plurality of data process devices. The second control signal is generated corresponding to the first control signal. A data transfer is controlled among the plurality of data process devices on the same screen of the display means using the input device. Thus, while observing the display of the display means, data can be transferred among the plurality of data process devices using the input device.

Additionally, according to one or more of the above aspects of the present invention, a plurality of video signals that are output from a plurality of data process devices are displayed on the same screen of a display means. Using an input device that controls a data process device selected from the plurality of data process devices, a data transfer among the plurality of data process devices is controlled on the same screen of the display means. Thus, while observing the display of the display means, data can be transferred among the plurality of data process devices using the input device.

Moreover, according to one or more of the above aspects of the present invention, a plurality of video signals that are output from a plurality of data process devices can be input. The plurality of video signals are combined into one screen corresponding to measured results of synchronous frequencies of the plurality of video signals that have been input and then displayed by a display means. A first control signal that is output from an input device by a user's operation and a second control signal that controls the plurality of data process devices are transmitted to the plurality of data process devices. The second control signal is generated corresponding to the first control signal. Thus, while observing the display of the display means, the plurality of data process devices can be controlled corresponding to an operation of the input device.

The foregoing aspects, features and advantages of the present invention will be further appreciated when considered with reference to the following detailed description and accompanying drawings.

BRIEF DESCRIPTION OF THE DRAWINGS

FIG. 17 is a block diagram showing a more detailed structure of a picture process device.

FIG. 18 is a schematic diagram showing an example of a display of a display portion.

FIG. 23 is a schematic diagram showing more reality of various display methods for display screens of the plurality of computer devices against the display portion.

FIG. 24 is a schematic diagram showing more reality of various display methods for display screens of the plurality of computer devices against the display portion.

DETAILED DESCRIPTION

Best Modes for Carrying Out the Invention

Figure 1:
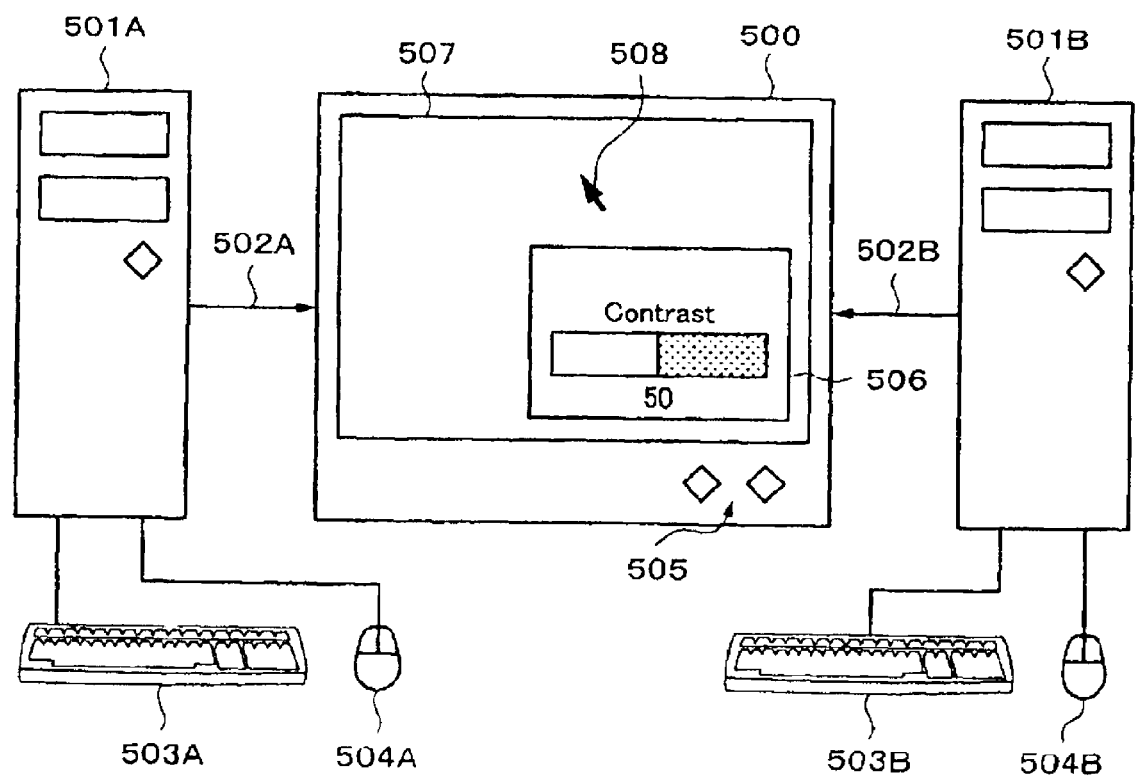
FIG. 1 is a schematic diagram showing an example of which two computer devices are connected to one monitor device according to a related art.
Figure 2:
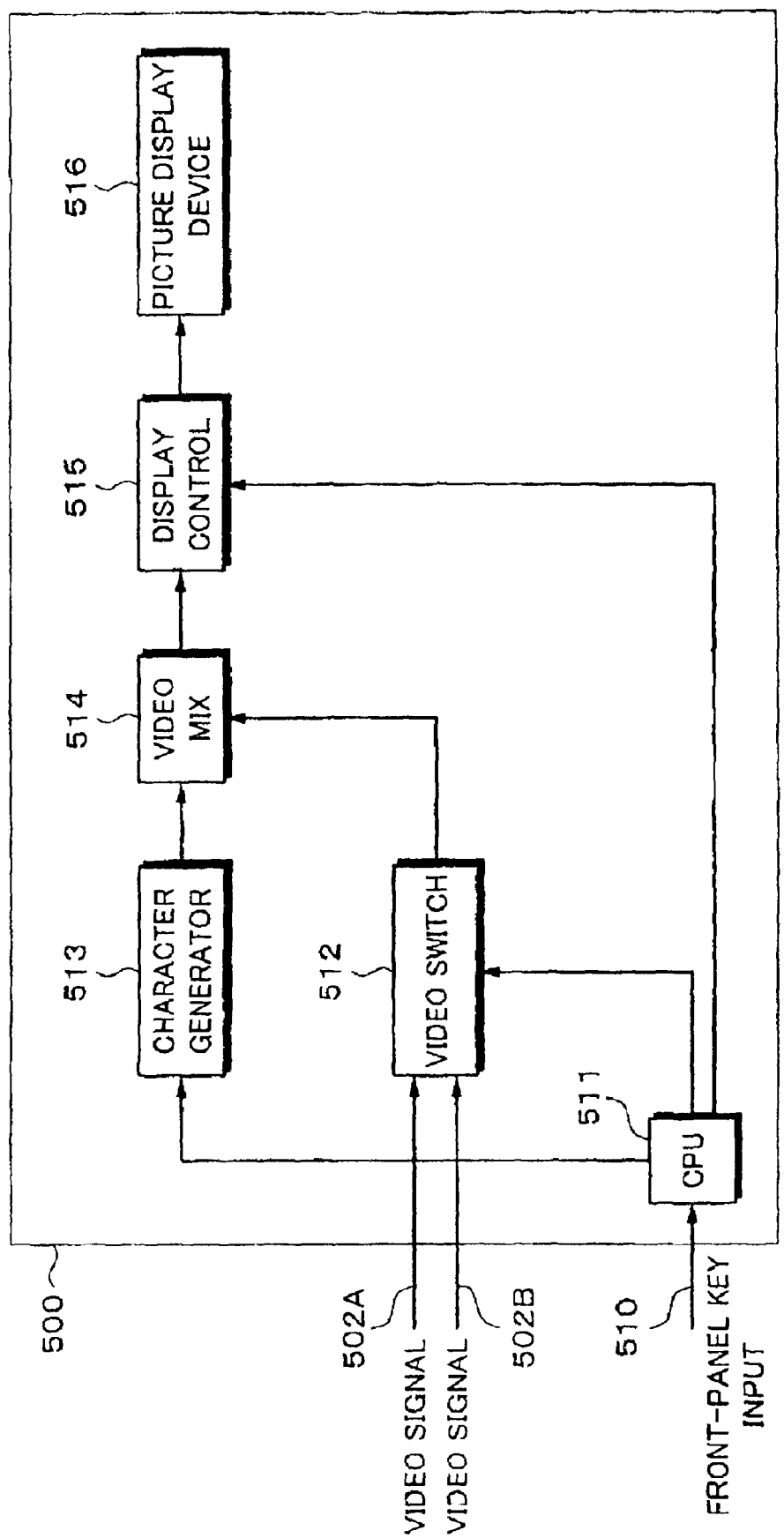
FIG. 2 is a block diagram showing an example of the structure of a monitor device according to the related art.
Figure 3:
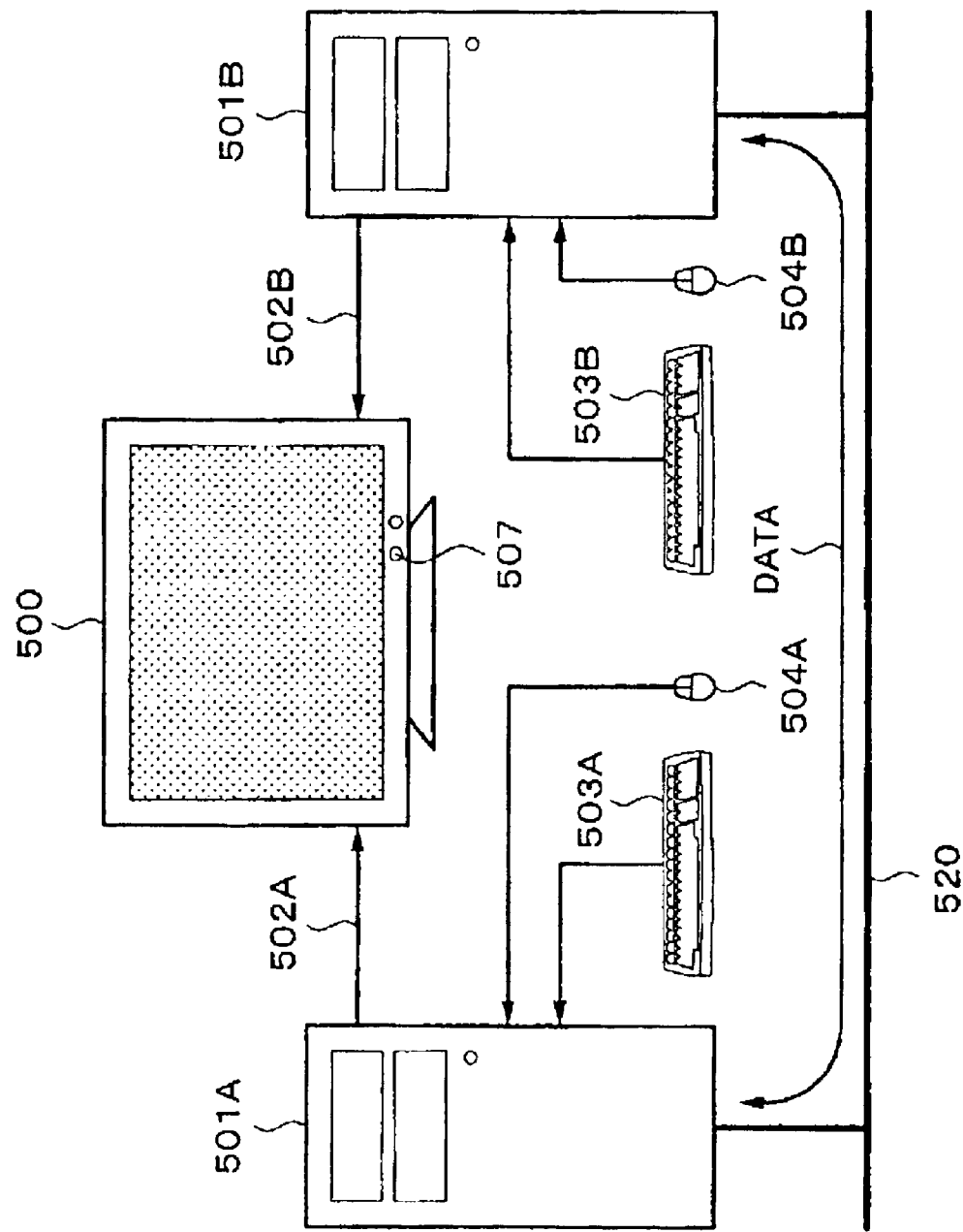
FIG. 3 is a schematic diagram showing an example of the operation of a monitor device having two inputs according to the related art.
Figure 4:
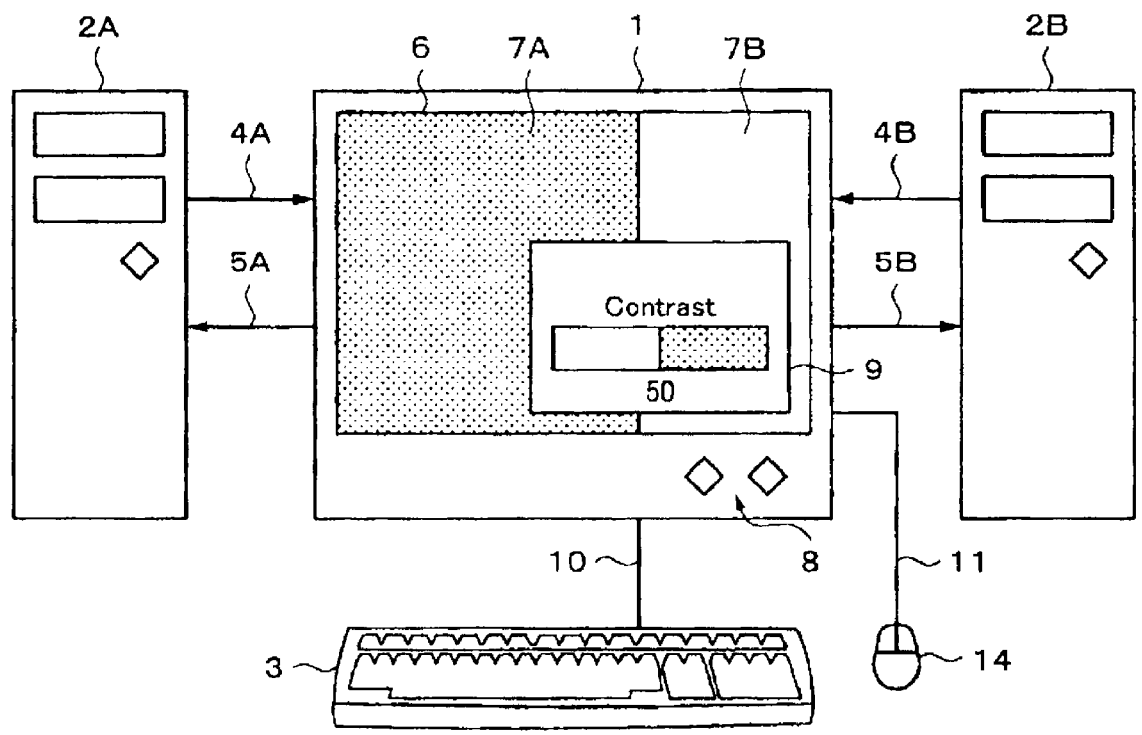
FIG. 4 is a schematic diagram showing the operation of a monitor device 1 according to a first embodiment.

Next, with reference to the accompanying drawings, a first embodiment of the present invention will be described. FIG. 4 schematically shows an example of the operation of a monitor device 1 according to the first embodiment. Referring to FIG. 4, two computer devices 2A and 2B are connected to the monitor device 1. In the following description, it is assumed that the computer devices are personal computers. Video signals 4A and 4B that are output from the personal computers 2A and 2B, respectively, are supplied to the monitor device 1. The monitor device 1 can display the video signals 4A and 4B in display areas 7A and 7B of a display portion 6.

As input devices, a keyboard 3 and a mouse 14 are connected to the monitor device 1. Thus, the keyboard 3 and the mouse 14 are shared by the two personal computers 2A and 2B. Key information 10 is output from the keyboard 3. Mouse movement amounts and button operation information 11 are output from the mouse 14 (hereinafter "mouse movement amounts and button operation information" is simply abbreviated to "mouse information"). The mouse information is supplied as an input operation signal 5A or 5B to one of the personal computers 2A and 2B that has been selected through the monitor device 1.

In addition, the monitor device 1 has an OSD (On Screen Display) function. By operating an operation switch 8 disposed on the front side of the monitor device 1, an OSD screen 9 is displayed. Corresponding to a display of the OSD screen 9, by performing a predetermined operation of the operation switch 8, the settings of the monitor device 1 can be changed. In the example shown in FIG. 4, as the OSD screen 9, a control screen that allows the contrast of a picture on the display portion 6 to be changed is displayed. By performing a predetermined operation of the operation switch 8, the setting values of the contrast are changed. As a result, the contrast of the picture displayed on the display portion 6 is changed and the control screen is updated.

In FIG. 4, the monitor device 1 is connected to the two personal computers 2A and 2B. However, it is possible to connect more personal computers to the monitor device 1.

Figure 5:
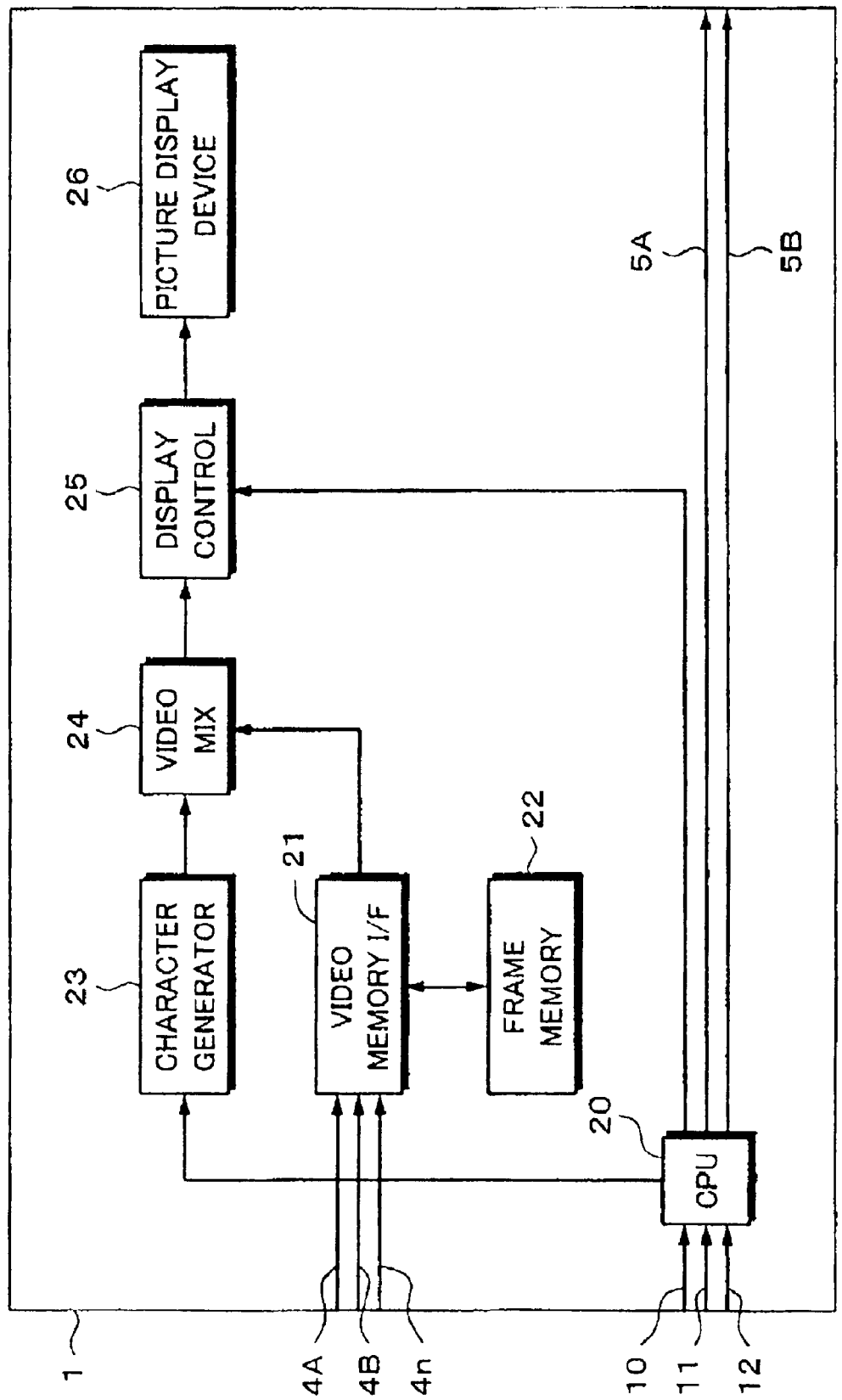
FIG. 5 is a block diagram showing an example of the structure of a monitor device according to an embodiment.

FIG. 5 shows an example of the structure of the monitor device 1 according to the first embodiment. Video signals 4A, 4B, . . . , and 4n that are supplied from a plurality of personal computers 2A, 2B, . . . , and 2n (not shown) are supplied to a video memory interface 21. The video memory interface 21 assigns the supplied video signals 4A, 4B, ..., and 4n to predetermined addresses of a frame memory 22 and stores the video signals 4A, 4B, ..., and 4n to the assigned addresses thereof.

For simplicity, in the following description, it is assumed that two personal computers 2A and 2B are connected to the monitor device 1. In addition, it is assumed that the video signals 4A and 4B are stored to the frame memory 22.

The video memory interface 21 controls a read address of the frame memory 22 corresponding to a command received from a CPU (Central Processing Unit) 20 (that will be described later) and reads a video signal for one screen from the frame memory 22. The read video signal is supplied to a first input terminal of a video mix circuit 24.

On the other hand, the key information 10 and the mouse information 11 that are output from the keyboard 3 and the mouse 14, respectively, are supplied to the CPU 20. The key information 10 and the mouse information 11 are selectively output (as a signal 5A or 5B) to one of the two personal computers 2A and 2B that is determined as an active personal computer by the CPU 20. One of the personal computers 2A and 2B can be selected as an active personal computer by the operation switch 8 disposed on the front panel of the monitor device 1.

A control signal 12 that is output corresponding to the operation of the operation switch 8 is supplied to the CPU 20. Corresponding to the control signal 12, the CPU 20 issues a command that causes the OSD screen 9 to be displayed. The issued command is supplied to an OSD character generator 23. The OSD character generator 23 generates a video signal composed of for example RGB signals so as to display the OSD screen 9 corresponding to the supplied command. The video signal is supplied to a second input terminal of the above-described video mix circuit 24.

The video mix circuit 24 switches the video signals that are supplied to the first and second input terminals at predetermined timings so that the OSD screen 9 is displayed at a predetermined area of the display portion 6. An output of the video mix circuit 24 is supplied to a picture display device 26 that is for example a CRT (Cathode Ray Tube) through a display control circuit 25. Corresponding to the supplied video signal, the picture display device 26 displays a picture on the display portion 6. The display device 26 may be an LCD (Liquid Crystal Display).

Corresponding to the supplied control signal 12, the CPU 20 issues a command that causes the display control circuit 25 to control the picture display device 26. The issued command is supplied to the display control circuit 25. The display control circuit 25 performs a process for the video signal supplied to the picture display device corresponding to the command.

In reality, the CPU 20 is connected to a work memory, a ROM (Read Only Memory), and so forth (not shown). The CPU 20 controls each portion of the monitor device 1 corresponding to a predetermined program that is pre-stored in the ROM.

Figure 6:
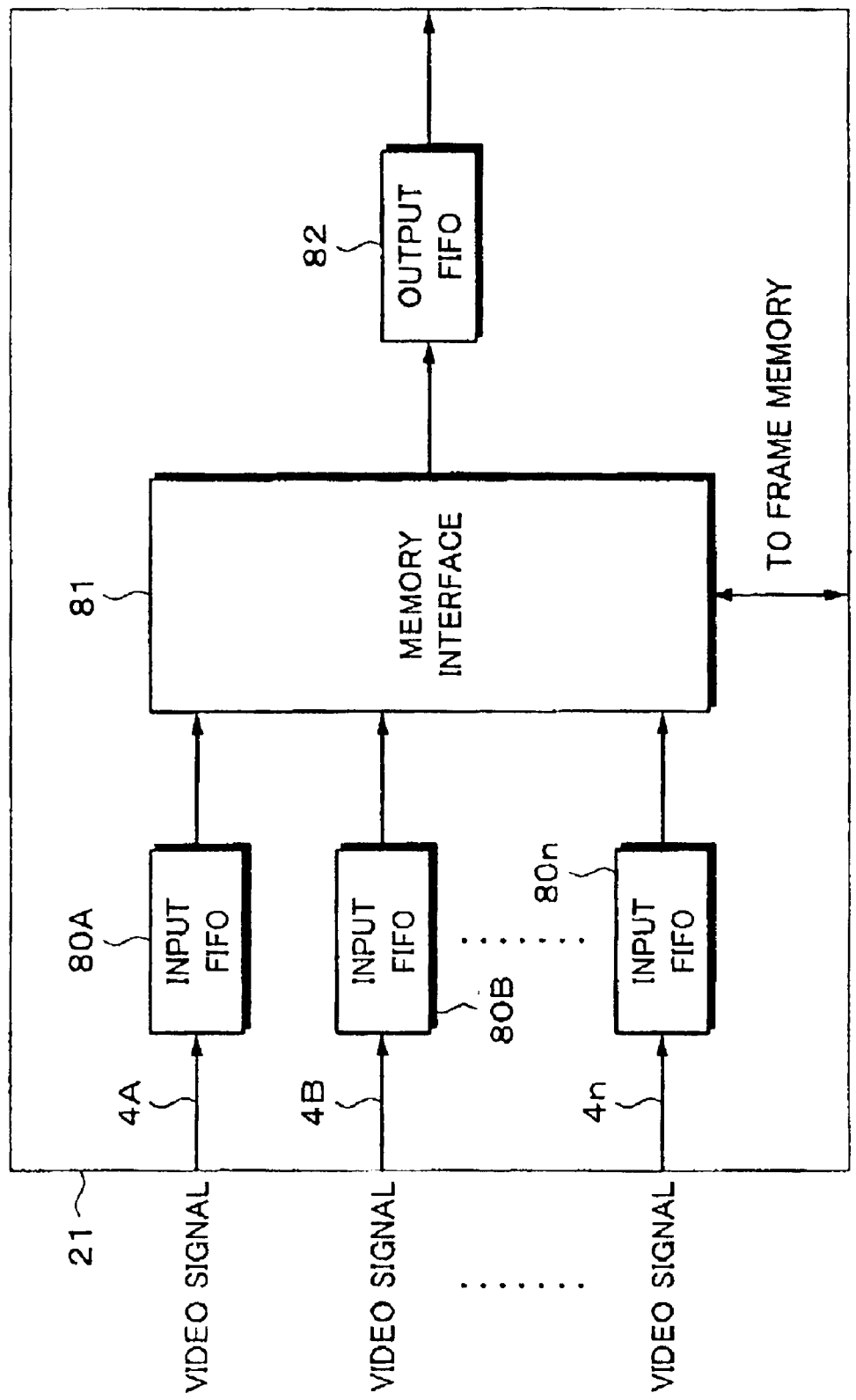
FIG. 6 is a block diagram showing an example of the structure of a video memory interface.

FIG. 6 shows an example of the structure of the video memory interface 21. The video memory interface 21 has a plurality of input FIFO (First-In First-Out) memories 80A, 80B, ..., and 80n corresponding to the number of video signals that can be input to the monitor device 1. In the following description, it is assumed that there are two channels of input video signals and that there are input FIFO memories 80A and 80B. Two channels of video signals 4A and 8B supplied to the video memory interface 21 are temporarily stored to the input FIFO memories 80A and 80B, respectively.

The video signals 4A and 4B are read from the input FIFO memories 80A and 80B, respectively. The video signals 4A and 4B are supplied to a memory interface 81. The video signals 4A and 4B supplied to the memory interface 81 are address-controlled by the memory interface 81 corresponding to a command issued by the CPU 20 and stored to the frame memory 22. Likewise, a video signal for one screen is address-controlled by the memory interface 81 and read from the frame memory 22. The video signal for one screen that is read from the frame memory 22 is temporarily stored to an output FIFO memory 82 and then output therefrom.

Since the FIFO memories 80A, 80B, and 82 are used for an input and an output of the memory interface 81, the input and output can be clock-converted. Thus, the format of an input video signal can be freely converted.

Figure 7:
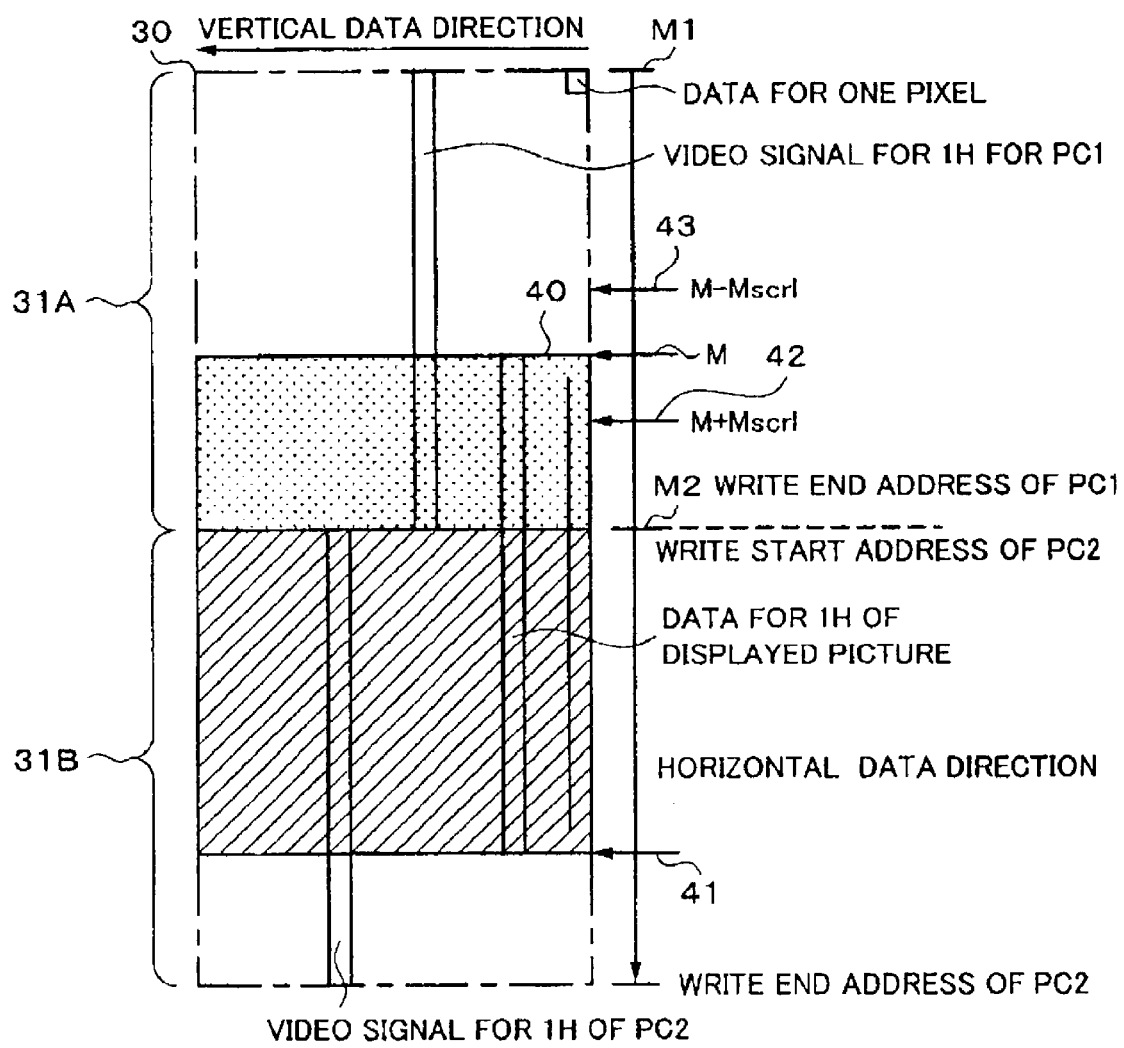
FIG. 7 is a schematic diagram showing an address space of an example of a frame memory.

FIG. 7 shows an example of an address space of the frame memory 22 and an example of an address assignment for reading a video signal from the frame memory 22. The frame memory 22 has a storage capacity necessary for storing a video signal for a plurality of frames. In the example of which the two personal computers 2A and 2B are connected to the monitor device 1, the frame memory 22 has a storage capacity for storing a video signal for at least two frames (namely, two screens).

An address space 30 of the frame memory 22 is formed as for example a two-dimensional array corresponding to a displayed picture. In the example shown in FIG. 7, the vertical direction of the video signal corresponds to the horizontal direction (namely, the column direction) of the two-dimensional array, whereas the horizontal direction of the video signal corresponds to the vertical direction (namely, the line direction) of the two-dimensional array. In addition, in the frame memory 22, a video signal for two screens is arranged in the column direction so that the upper right corner of the memory space shown in FIG. 7 is an address corresponding to the upper left corner of the display screen of the first video signal. Thus, by reading a video signal in the line direction, the first video signal and the second video signal can be successively read.

The video signal 4A that is output from the personal computer 2A and the video signal 4B that is output from the personal computer 2B are stored as the first video signal and the second video signal to the frame memory 22. A video signal 4A is stored in an address space 31A shown in FIG. 7, whereas a video signal 4B is stored in an address space 31B. When an address range for one horizontal period (1H) is designated in the line direction, a video signal for one screen can be read.

By changing the start point of a read address range, a video signal that is output can be quickly changed. FIGS. 8 to 10 show examples displayed on the display portion 6. In FIGS. 8 to 10, the read address range in the address space 30 from which a video signal read from the frame memory 22 is designated in different manners. By changing the start point of the address range in reading a video signal, as shown in FIGS. 8 to 10, display areas 7A and 7B of the display portion 6 are changed.

Figure 8A:
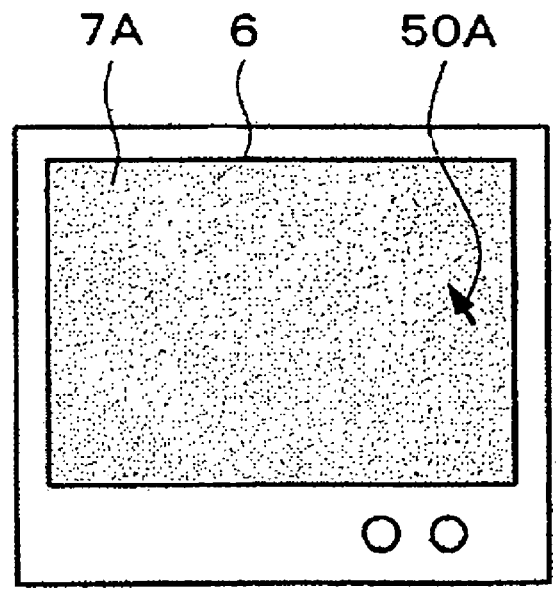
FIG. 8 is a schematic diagram showing an example of a display of a display portion.
Figure 8B:
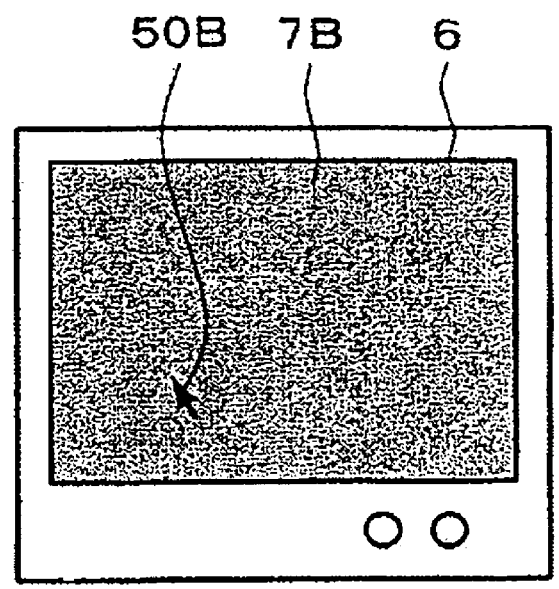

FIG. 8A shows an example of which only a video signal 4A is displayed, whereas FIG. 8B shows an example of which only a video signal 4B is displayed. In the frame memory 22, when the address range in the line direction is designated for 1H in such a manner that an address M1 shown in FIG. 7 is the read start address, a video signal can be read from only the address space 31A. At that point, as shown in FIG. 8A, only a display area 7A of the video signal 4A is displayed on the display portion 6. Likewise, when the address range in the line direction is designated for 1H in such a manner that the address M2 shown in FIG. 7 is the read start address, a video signal can be read from only the address space 31B. As shown in FIG. 8B, only the display area 7B of the video signal 4B is displayed on the display portion 6.

Application software or the like superimpose video signals 2A and 2B that are output from the personal computers 2A and 2B with video signals for displaying cursors at predetermined positions of the coordinates of the video signals 2A and 2B. In FIGS. 8A and 8B, cursors 50A and 50B superimposed with the video signals 4A and 4B that are output from the personal computers 2A and 2B are displayed in their display areas.

Figure 9A:
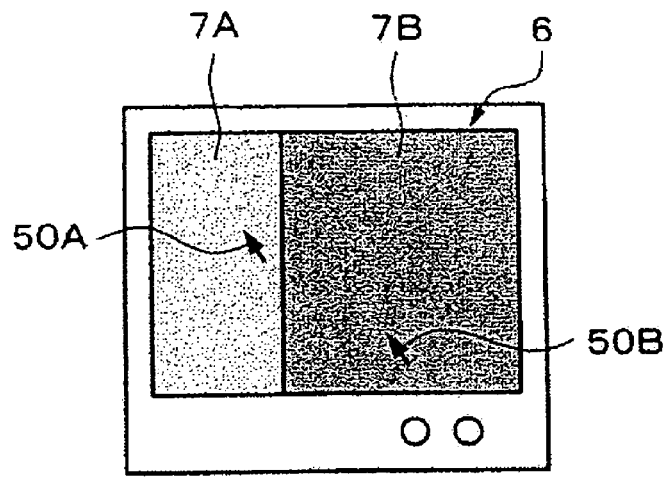
FIG. 9 is a schematic diagram showing an example of a display of the display portion.
Figure 9B:
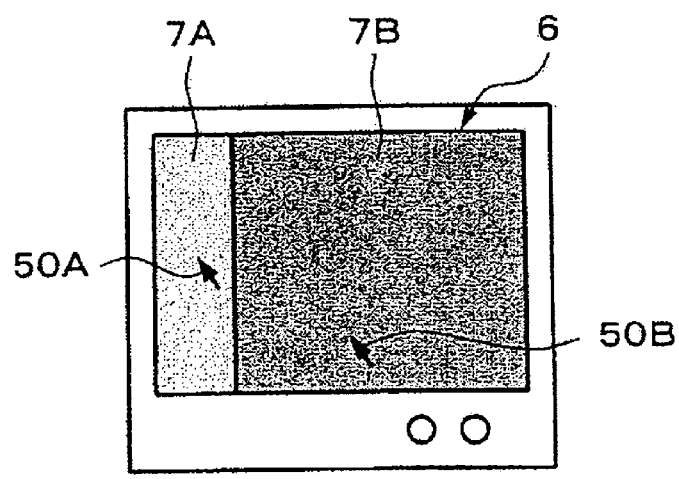
Figure 9C:
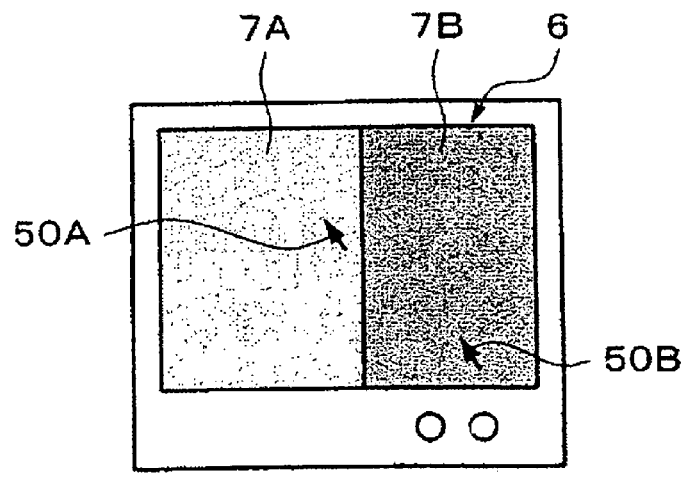
Figure 10:
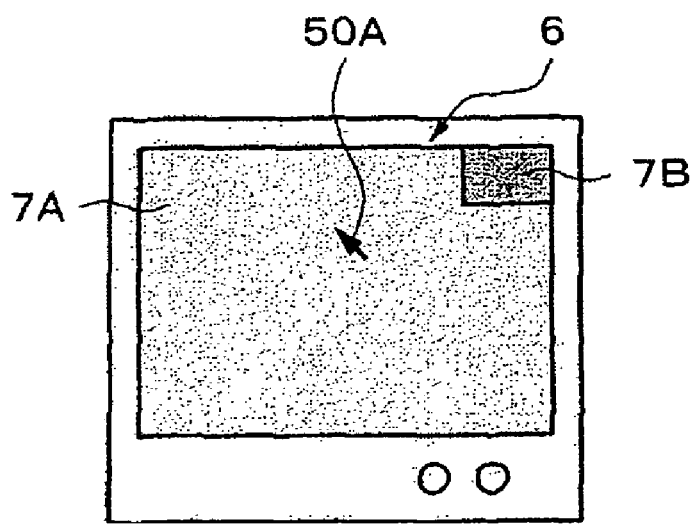
FIG. 10 is a schematic diagram showing an example of a display of the display portion.

FIG. 9 shows an example of which the display area 7A of the video signal 4A and the display area 7B of the video signal 4B are displayed at a time. By designating the address range in the line direction for 1H in such a manner that the read start address is address M in the address space 31A, the video signals 4A and 4B can be read in such a manner that they are mixed with a video signal for one screen. When the address M that is the read start address is moved in the address space 31A, the ratio of the display areas 7A and 7B on the display portion 6 can be changed as shown in FIGS. 9A, 9B, and 9C.

When the read start address M is continuously changed, as shown in FIGS. 9A, 9B, and 9C, displays can be continuously switched. As a result, the boundary of the display area 7A and the display area 7B can be scrolled.

When the two video signals 4A and 4B are displayed on the same screen as shown in FIG. 9, the displays of the video signals 4A and 4B can be fixed. For example, cursors 50A and 50B are displayed relatively at the same positions as those shown with the original video signals 4A and 4B.

Depending on the access method of the address space 30 of the frame memory 22, as an example shown in FIG. 10, one display area (in this example, the display area 7B) can be displayed in another display area (in this example, the display area 7A). At that point, the display area 7B may be a reduced area or a partial area. When address assignments of the address spaces 31A and 31B are changed corresponding to the display ranges of the display areas 7A and 7B, a screen as shown in FIG. 7 is displayed.

Figure 11:
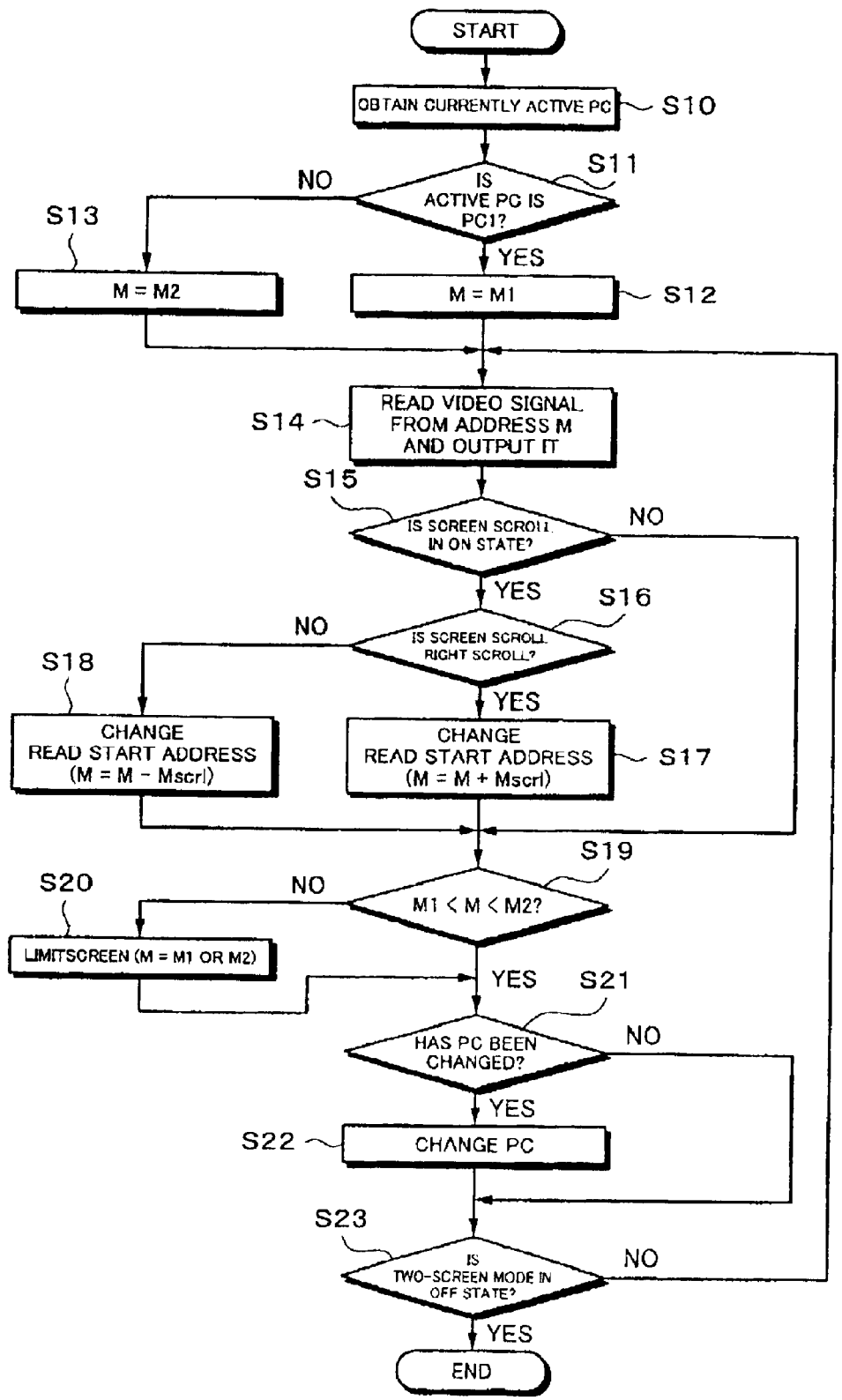
FIG. 11 is a flow chart showing an example of a process of a display control according to the first embodiment.
Figure 12:
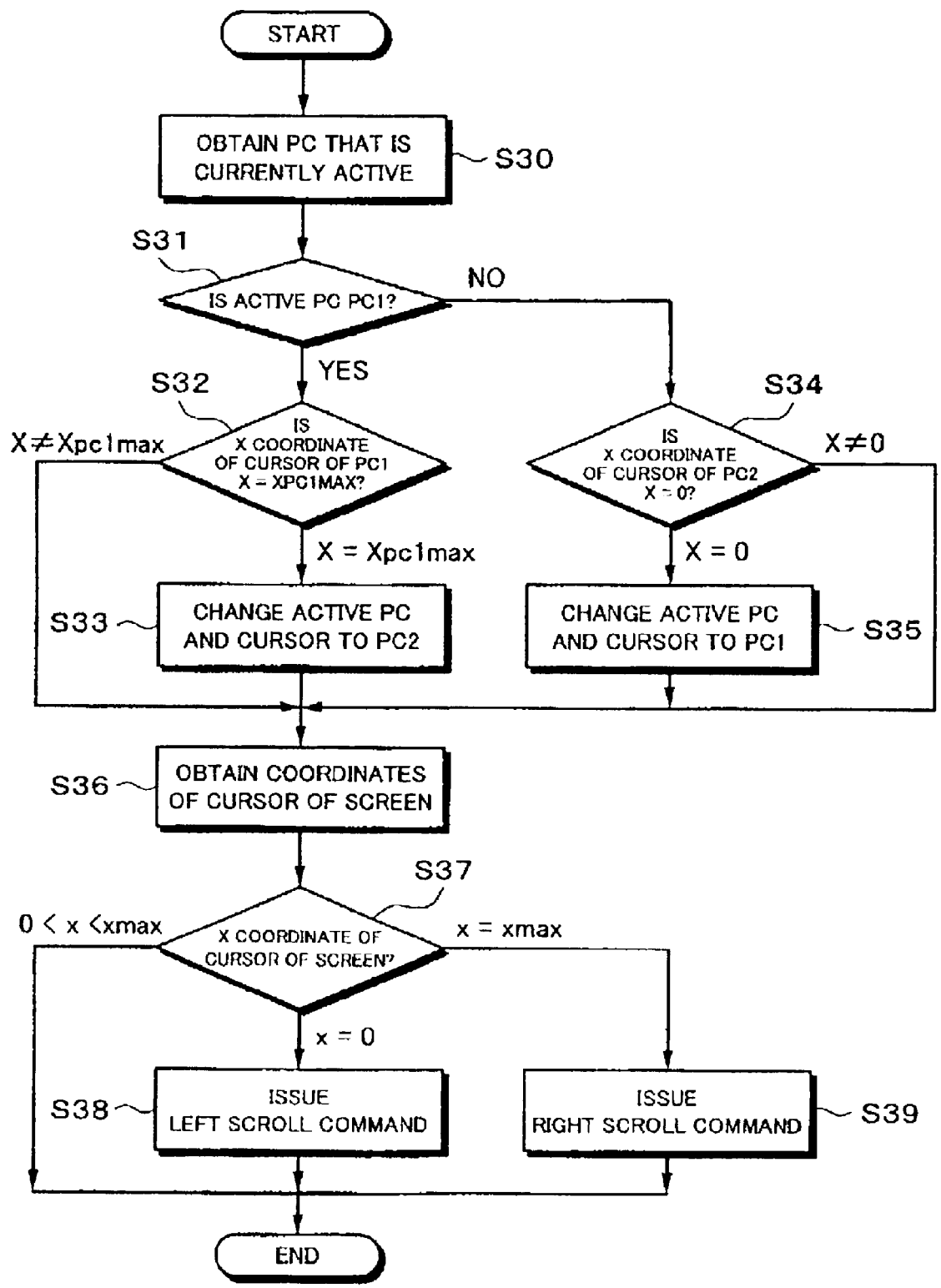
FIG. 12 is a flow chart showing an example of a process of a display control according to a second embodiment.
Figure 13:
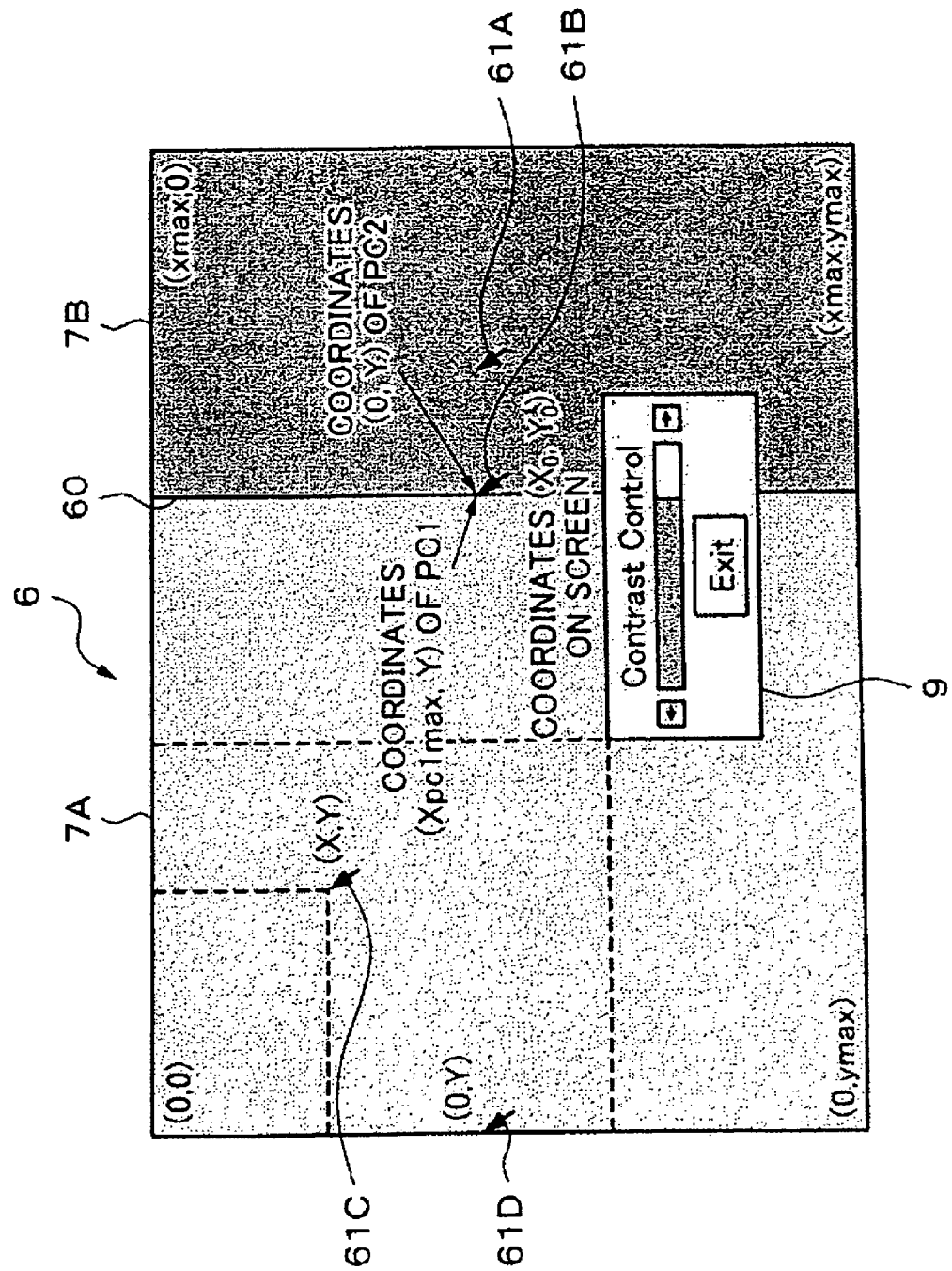
FIG. 13 is a schematic diagram for explaining a process corresponding to X coordinate of a cursor.

FIG. 11 is a flow chart showing an example of the above-described display control process. In FIGS. 11, 12, and 13, the personal computers 2A and 2B are denoted by PC1 and PC2, respectively.

Before executing the process of the flow chart, as an initial state, it is assumed that one of the video signals 4A and 4B is fully displayed on the display portion 6. In the example, the video signal 4A is fully displayed. In addition, it is assumed that the personal computer 2A is in an active state of which the personal computer 2A can be operated using the keyboard 3 and the mouse 14. In the active state, corresponding to the operation of the operation switch 8 of the monitor device 1, a command that causes the display mode of the monitor device 1 to be switched from one-screen mode in which only one video signal is displayed on the display portion 6 to two-screen mode in which the two video signals 4A and 4B are displayed at a time is issued by the CPU 20. When the command is issued, the process of the flow chart shown in FIG. 11 is started.

The command that causes the display mode to be switched to the two-screen mode may be issued corresponding to inputs of the keyboard 3 and the mouse 14.

At step S10 as the first step, it is determined which of the personal computers 2A and 2B connected to the monitor device 1 is currently active. The determination can be performed in such a manner that one of the personal computers 2A and 2B to which the key information 10 of the keyboard 3 and the mouse information of the mouse 14 are supplied is active.

In the example shown in FIG. 11, at step S11 as the next step, it is determined whether or not the personal computer 2A is an active personal computer. When the determined result represents that the personal computer 2A is an active personal computer, the flow of the process advances to step S12. In contrast, when the determined result represents that the personal computer 2A is not active (namely, the personal computer 2B is an active personal computer), the flow of the process advances to step S13.

At steps S12 and S13, the read start address is set to the frame memory 22. At step S12 of which the personal computer 2A is active, the read start address M is set to address M1 shown in FIG. 7. In contrast, at step S13 of which the personal computer 2B is active, the read start address M is set to address M2 shown in FIG. 7.

When the read start address M is set at steps S12 and S13, the flow of the process advances to step S14. At step S14, a video signal for one frame is read from the start address M that has been set in the frame memory 22. When the read start address M has been set to address M1, the address space 30 is read in the column direction from the address M1 to the address immediately followed by the address M2 shown in FIG. 7.

At step S15, it is determined whether or not a scroll command for scrolling the screen is in ON state. When the scroll command is not in ON state, the flow of the process advances to step S19.

When the scroll command is in ON state, the display area 7A of the personal computer 2A and the display area 7B of the personal computer 2B can be adjacently displayed on the left side and the right side, respectively. The ON state/OFF state of the scroll command can be switched using the operation switch 8 disposed on the front panel of the monitor device 1. The scroll control of the screen can be performed using the operation switch 8. Of course, the ON/OFF states of the scroll command can be switched using the keyboard 3 and the mouse 14. In addition, the scroll control for the screen can be performed using the keyboard 3 and the mouse 14.

In contrast, when the determined result at step S15 represents that the scroll command is in ON state, the flow of the process advances to step S16. At step S16, it is determined in which direction the screen is scrolled. When the screen is scrolled in the right direction, the flow of the process advances to step S17. When the screen is scrolled in the left direction, the flow of the process advances to step S18.

At steps S17 and S18, the read start address M is changed corresponding to the scroll direction. When the screen is scrolled in the right direction, at step S17, address Mscr1 corresponding to the scroll amount is added to the address M that has been set. In contrast, when the screen is scrolled in the left direction, at step S18, address Mscr1 corresponding to the scroll amount is subtracted from the address M that has been set.

When the read start address is changed at steps S17 and S18, the flow of the process advances to step S19. At step S19, the relation of the values of the read start address M and the addresses M1 and M2 is determined. When the address M is larger than the address M1 and smaller than the address M2 (namely, M1<M<M2), the flow of the process advances to step S21.

In contrast, when the read start address M is not in the above-described range, the flow of the process advances to step S20. At step S20, the value of the read start address M is limited. In other words, when the value of the changed read start address M is equal to or smaller than the value of the address M1, the value of the read start address M is set to the address M1. In contrast, when the value of the changed read start address M is equal to or larger than the address M2, the value of the read start address M is set to the address M2.

In such a manner, the value of the changed read start address M is limited. When the screen is scrolled to the right end of the display area 7A or the left end of the display area 7B, the screen is prevented from being further scrolled.

At step S21 as the next step, it is determined whether or not the active personal computer that is one of the personal computers 2A and 2B has been changed. When the determined result represents that the active personal computer has been changed, the flow of the process advances to step S22. At step S22, the active personal computer is changed. In other words, the CPU 20 changes the output destinations of the input key information 10 and mouse information 11 to the active personal computer.

At step S23 as the next step, it is determined whether or not the two-screen mode has been turned off. When the two-screen mode has been turned off, a sequence of steps of the process is completed. For example, the read start address M of the frame memory 22 is fixedly set to the address M1 or M2 depending on which of the personal computers is active.

In contrast, when the determined result at step S23 represents that the two-screen mode has been turned on, the flow of the process returns to step S14. Corresponding to the read start address M changed at step S17 or S18, a video signal is read from the frame memory 22. The process from step S14 to step S23 is cyclically performed while the two-screen mode is in ON state in a period of for example one frame.

Next, with reference to FIGS. 7 and 9, the process after step S14 of the above-described flow chart will be described in more detail. It is assumed that the screen scroll has been turned on, that the screen has been scrolled, and that the read start address M is for example address 40 shown in FIG. 7. At step S14, a video signal for one frame is read from the address M. In other words, the read end address is address 41 shown in FIG. 7.

At that point, the display portion 6 displays a screen as shown in FIG. 9A. The read start address M corresponds to the left end of the screen of the display portion 2. The area from the read start address M to the address M2 corresponds to the display area 7A. In the display area 7A, a picture of the video signal 4A of the personal computer 2A is displayed. In addition, the area from the address M2 to the address 41 corresponds to the display area 7B. In the display area 7B, a picture of the video signal 4B of the personal computer 2B is displayed.

Now, it is assumed that the screen scroll has been turned on and that the read start address M has been changed at step S17 or S18. When the screen is scrolled in the right direction and the scroll amount Mscr1 is added to the read start address at step S17, the read start address M becomes address 42 shown in FIG. 7. A video signal for one frame is read from the address 42. Thus, as shown in an example of FIG. 9B, the display area of the display portion 6 is moved in the right direction of the address space 30.

In contrast, when the screen is scrolled in the left direction and the scroll amount Mscr1 is subtracted from the read start address M at step S18, the read start address M becomes address 43 shown in FIG. 7. A video signal for one frame is read from the address 43. Thus, as shown in an example of FIG. 9C, the display area of the display portion 6 is moved in the left direction of the address space 30.

Next, a second embodiment of the present invention will be described. According to the second embodiment, an active personal computer is selected from personal computers 2A and 2B and a scroll command for scrolling two screens of the two personal computers displayed at a time is issued using a mouse 14. The system structure of the second embodiment applies to the system structure of the first embodiment described with reference to FIGS. 4 to 7. For simplicity, in the second embodiment, similar portions to those of the first embodiment are denoted by similar reference numerals and their detailed description will be omitted.

FIG. 12 is a flow chart showing an example of a process according to the second embodiment. It is assumed that a monitor device 1 has been set to two-screen mode corresponding to the operation of an operation switch 8. The two-screen mode may be set by a predetermined software process of the personal computers 2A and 2B. In addition, for simplicity, it is assumed that the screen of the monitor device 1 has been scrolled by a process (that will be described later) and display areas 7A and 7B are displayed in a display portion 6 at a time.

At step S30 as the first step, it is determined which of the personal computers 2A and 2B connected to the monitor device 1 is currently active.

The determination can be performed in such a manner that one of the personal computers 2A and 2B to which the key information 10 of the keyboard 3 and the mouse information of the mouse 14 are supplied is active.

In this example, it is assumed that the personal computer 2A is an active personal computer.

In the example shown in FIG. 12, at step S31 as the next step, it is determined whether or not the personal computer 2A is an active personal computer. When the determined result represents that the personal computer 2A is an active personal computer, the flow of the process advances to step S32. In contrast, when the determined result represents that the personal computer 2A is not active (namely, the personal computer 2B is an active personal computer), the flow of the process advances to step S34.

At steps S32 and S34, the determinations corresponding to the X coordinates of the cursors of the personal computer 2A and the personal computer 2B are performed. At step S32, it is determined whether or not the X coordinate of the cursor is the maximum value Xpc1max of the display area 7A. When the X coordinate of the cursor is X=Xpc1max, the cursor is displayed at the right end of the display area 7A (namely, the cursor is displayed at the boundary between the display areas 7A and 7B).

When the determined result at step S32 represents that the X coordinate of the cursor is X=Xpc1max, the flow of the process advances to step S33. The active personal computer and the cursor control are changed from the personal computer 2A to the personal computer 2B. Thereafter, the flow of the process advances to step S36.

In contrast, when the determined result at step S32 represents that the X coordinate of the cursor is not X=Xpc1max, the current cursor coordinates are the cursor coordinates of the personal computer 2A that is currently active. Thus, the flow of the process advances to step S36.

Likewise, at step S34, it is determined whether or not the X coordinate of the cursor is the minimum value (X=0) of the display area 7B. When the X coordinate of the cursor is X=0, the cursor is displayed at the left end of the display area 7B (namely, the cursor is displayed at the boundary of the display areas 7 and 7A). When the determined result at step S34 represents that the X coordinate of the cursor is X=0, the flow of the process advances to step S35. The active personal computer and the cursor control are changed from the personal computer 2B to the personal computer 2A. Thereafter, the flow of the process advances to step S36.

Next, with reference to FIG. 13, a process corresponding to the X coordinate of the cursor will be described. In FIG. 13, the coordinates of the personal computer 2A (PC1) and the personal computer 2B (PC2) are denoted by coordinates PC1 (X, Y) and coordinates PC2 (X, Y), respectively. In addition, the coordinates of the display portion 6 (namely, the absolute coordinates of the display portion 6) are denoted by coordinates (x, y).

On the display portion 6, the coordinates at the upper left corner and the coordinates at the lower right corner are denoted by coordinates (0, 0) and coordinates (xmax, ymax), respectively. When the display areas 7A and 7B are displayed on the display portion 6 as shown in FIG. 13, the right end of the display area 7A contacts the left end of the display area 7B. The contacted portion is a boundary portion 60. Thus, the coordinates at any point 61B on the boundary portion 60 of the display portion 6 are (Xpc1max, Y) as the coordinates of the personal computer 2A and coordinates (0, Y) as the coordinates of the personal computer 2B.

As an example, it is assumed that in the initial state, the personal computer 2B is active and that the cursor is displayed at an initial position 61A. When the cursor is moved from the initial position 61A to a position 61C, the cursor exceeds the boundary portion 60. Just when the cursor exceeds the boundary portion 60 (at a position 61B) from the display area 7B to the display area 7A, the X coordinate of the cursor of the personal computer 2B that is currently active becomes X=0. Thus, the determined result at step S31 represents that the active personal computer is the personal computer 2B. Thereafter, the flow of the process advances to step S34. At step S34, it is determined that the X coordinate of the cursor is X=0. Thus, at step S35, the active personal computer is changed from the personal computer 2B to the personal computer 2A. In addition, the cursor control is changed from the personal computer 2B to the personal computer 2A. Thus, the coordinates of the cursor are controlled with the coordinates of the personal computer 2A.

When the cursor is moved so that the X coordinate of the cursor exceeds the boundary portion 60, the control can be switched between the personal computers 2A and 2B.

Returning to the description of the flow chart shown in FIG. 12, at step S36, the coordinates (x, y) of the cursor of the display portion 6 are obtained. At step S37 as the next step, the determination is performed corresponding to the x coordinate of the obtained cursor coordinates (x, y). At step S37, when the x coordinate of the cursor coordinates (x, y) is x=0, the flow of the process advance to step S38. The CPU 20 issues a command that causes the screen to be scrolled in the left direction. When the x coordinate is x=xmax, the flow of the process advances to step S39. The CPU 20 issues a command that causes the screen to be scrolled in the right direction.

In the example shown in FIG. 13, when the cursor is at a position 61D, the determined result at step S37 represents that the x coordinate of the cursor on the display portion 6 is X=0. At step S38, a command that causes the screen to be scrolled in the left direction is issued. Corresponding to the command, the read start address M of the frame memory 22 is changed. Thus, the screen displayed on the display portion 6 is moved in the left direction.

The command issued by the CPU 20 is supplied to a video memory interface 21. As with the first embodiment, the read start address M of the frame memory 22 is changed to a predetermined value and thereby the screen is correspondingly scrolled. Thus, when the cursor is positioned at the left end or right end of the display portion 6 by operating for example the mouse 14, the screen can be scrolled in the direction of the cursor.

When the command is issued at steps S38 and S39 and the screen is scrolled, a sequence of steps of the process is completed. In addition, when the coordinates of the cursor are not one of the above-described values at step S37, a sequence of steps of the process is completed.

Figure 14:
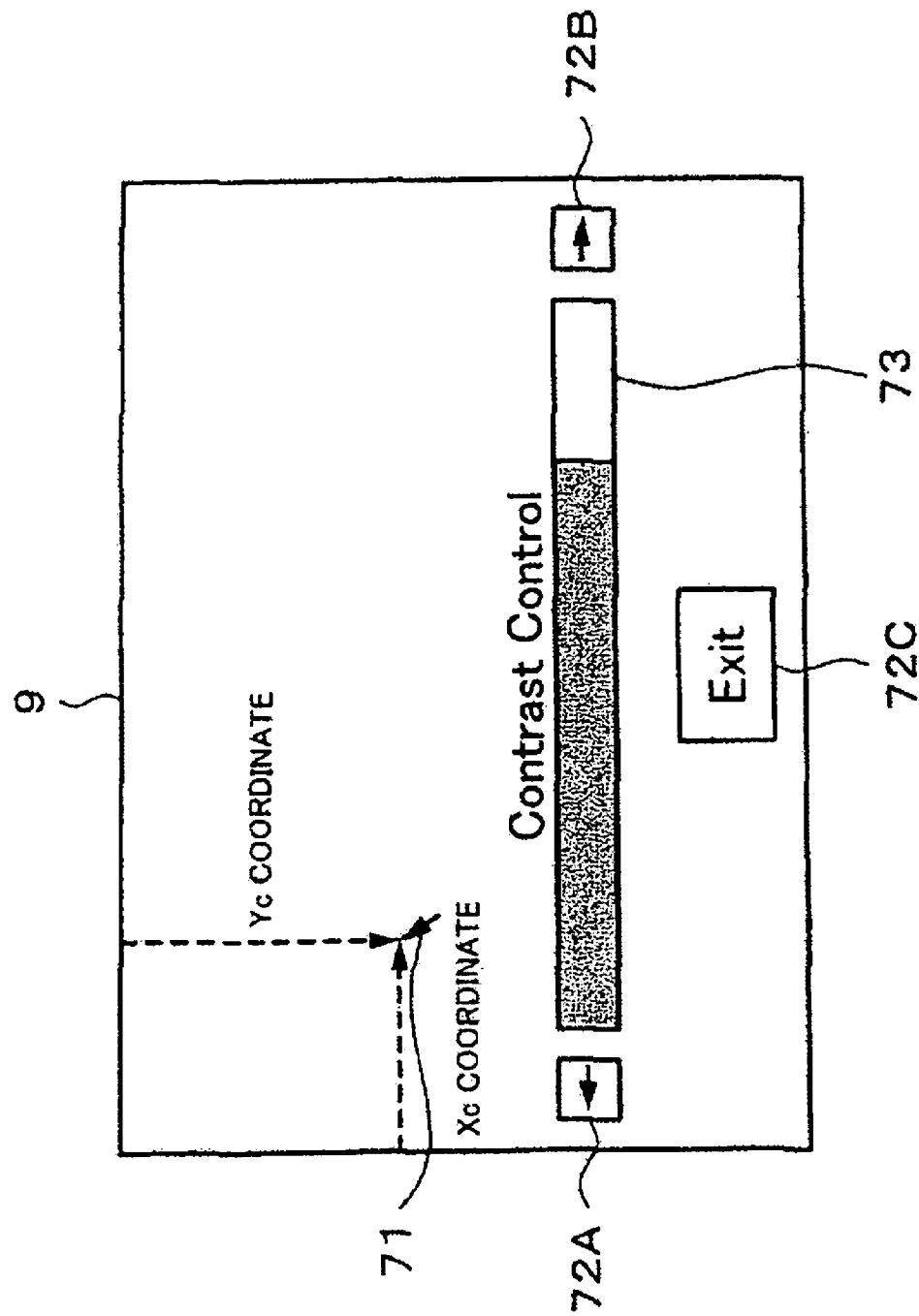
FIG. 14 is a schematic diagram showing an example of a display of an OSD screen.

As was described above, an OSD screen 9 can be displayed on the display portion 6. FIG. 14 shows an example of the OSD screen 9 that is displayed. At that point, a dedicated cursor 71 for the operation of the OSD can be displayed on the OSD screen 9. Corresponding to a command issued by the CPU 20, a video signal for the cursor 71 is generated by a character generator 23 along with a video signal for the OSD screen 9. A video mix circuit 24 superimposes the video signal generated by the character generator 23 with the video signals of the personal computers 2A and 2B. Alternatively, a dedicated character generator that generates the video signal for the cursor 71 may be additionally disposed.

On the OSD screen 9, areas 72A, 72B, and 72C are input valid areas. When the coordinates for the cursor are present in the areas, an input using for example the button operation of the mouse 14 can be performed. In the example of which a contrast adjustment screen is displayed as the OSD screen 9, the CPU 20 issues a command of which while the cursor is present at the area 72A, when the button operation is performed, the contrast of the screen is decreased and of which while the cursor is present in the area 72B, when the button operation is performed, the contrast of the screen is increased. The command is supplied from the CPU 20 to a display control circuit 25 so as to control the display of the picture display device 26. In addition, the contrast values displayed in the display area 73 is updated.

The area 72C is an area for an input that causes the mode for displaying the OSD screen 9 is completed.

In the example shown in FIG. 13, the OSD screen 9 is displayed in an area having a predetermined size corresponding to the coordinates $(x_0, y_0)$ of the display portion 6. When the cursor is present in the area, the coordinates $(x_c, y_c)$ of the area of the cursor are obtained. Corresponding to the obtained coordinates, it is determined whether or not the cursor is in the input valid areas. When the determined result represents that the cursor is in the input valid areas, it is determined whether or not the button operation of the mouse 14 has been performed. Corresponding to the determined result, the CPU 20 issues a command so as to control various settings of the monitor device 1.

In addition to controls for the displays of the video signals 4A and 4B of the personal computers 2A and 2B and the inputs of the keyboard 3 and the mouse 14 for the personal computers 2A and 2B, the functions of the monitor device 1 can be totally controlled by the keyboard 3 and the mouse 14.

In the above description, the cursor is moved and various commands are input using the mouse 14. However, the present invention is not limited to such an example. For example, using the keyboard 3, various commands can be input. When the keyboard 3 is used, cursor movement functions are assigned to predetermined keys of the keyboard 3. In addition, the button operations of the mouse 14 are assigned to the other keys of the keyboard 3. Moreover, functions that can be designated can be assigned to keys of the keyboard 3.

Next, a third embodiment of the present invention will be described. According to the third embodiment, a plurality of computer devices connected to a monitor device can communicate thereamong. Thus, while observing a screen on the monitor device, a data transfer and so forth can be performed among the plurality of computer devices.

Figure 15:
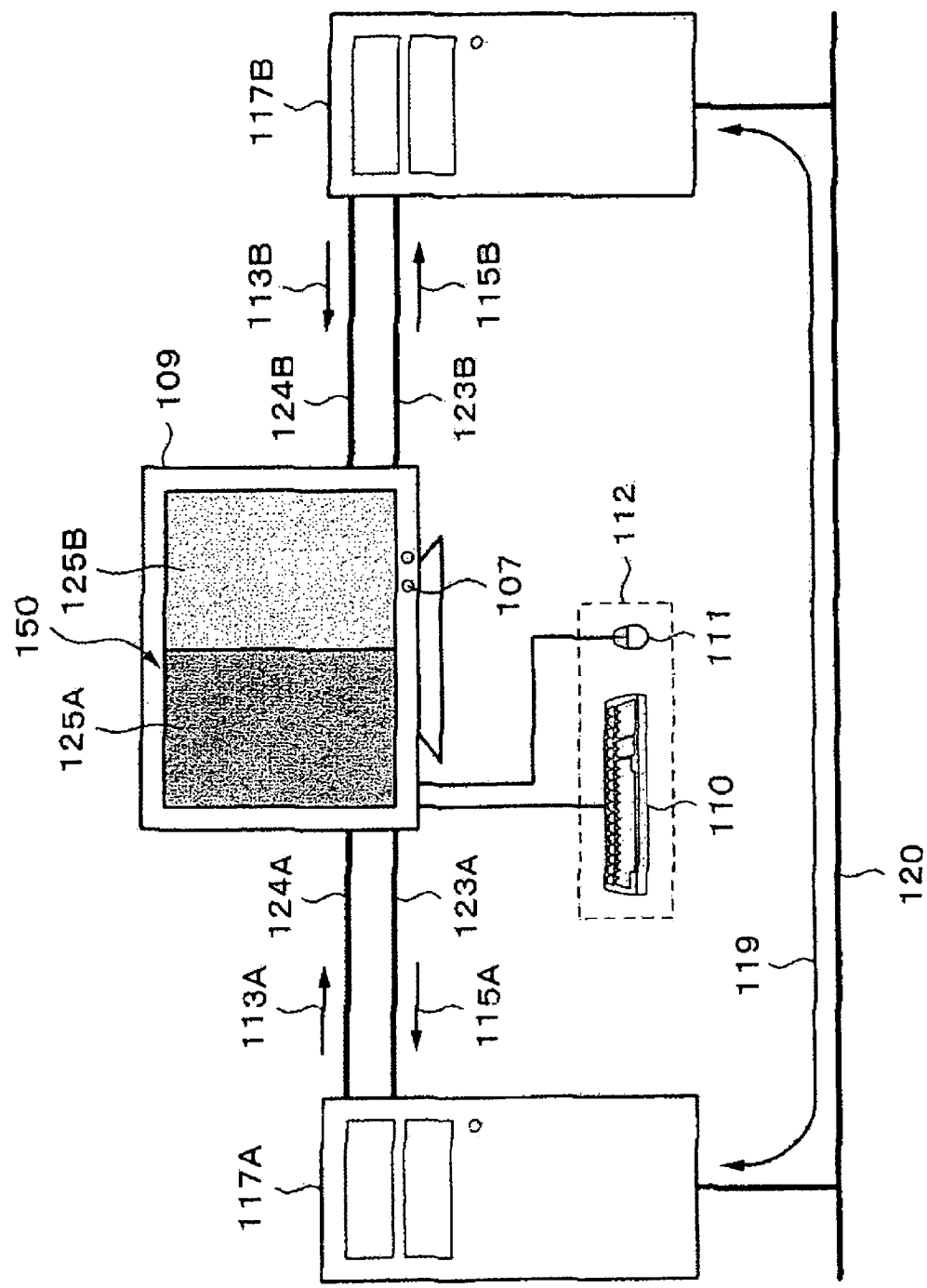
FIG. 15 is a schematic diagram showing the operation of a monitor device according to a third embodiment.

FIG. 15 schematically shows the operation of a monitor device 109 according to the third embodiment. According to the third embodiment, two computer devices 117A and 117B are connected to a monitor device 109. In the following description, it is assumed that the computer devices are personal computers. Video signals 113A and 113B that are output from the personal computers 117A and 117B are supplied to the monitor device 109 through video signal path 124A and 124B, respectively. Pictures of the video signals 113A and 113B can be displayed in display areas 125A and 125B of a display portion 150 of the monitor device 109, respectively.

In addition, the personal computers 117A and 117B and the monitor device 109 are connected through control signal paths 123A and 123B, respectively. The personal computers 117A and 117B communicate with the monitor device 109 through the control signal paths 123A and 123B, respectively, so as to exchange control signals and data therebetween. The control signal paths 123A and 123B can be accomplished by one of various interfaces such as a serial communication using for example, RS-232C, a communication using a parallel port, and USB (Universal Serial Bus). Alternatively, a conventional interface such as PS/2 (Personal System 2) that allows a keyboard and a mouse to be connected to a personal computer can be used as an interface for the control signal paths 123A and 123B.

An input device 112 composed of for example a keyboard 110 and a mouse 111 is connected to the monitor device 109. Beside those, the input device 112 may be a joystick, a remote control commander, a tablet, or the like. The keyboard 110 outputs a control signal corresponding to a key that is pressed (hereinafter, the control signal is together referred to as key information). The mouse 111 outputs the movement amounts thereof as for example (X, Y) coordinate values. In addition, the mouse 111 outputs a control signal corresponding to a pressed button thereof. In the following description, mouse movement amount information and pressed button information that are output from the mouse 111 are together referred to as mouse information. In addition, signals that are output from the input device 112 corresponding to user's operations are together referred to as input operation signal. For example, the key information and mouse information that are output from the input device 112 are together referred to as input operation signal. The input operation signal is supplied to the monitor device 109. In addition, the input operation signal is transmitted as a control signal 115A or 115B to the selected side of the personal computers 117A and 117B.

An operation portion 107 is disposed on the front panel of the monitor device 109. The operation portion 107 is composed of for example a plurality of switches. When the operation portion 107 is operated in a predetermined manner, an OSD can be displayed on the display portion 150. Corresponding to a display of the OSD, the user can operate the operation portion 107 so as to control each function of the monitor device 109. When the operation portion 107 is operated, for example display picture quality of the display portion 150 can be adjusted.

On the other hand, the personal computers 117A and 117B are connected through a data transfer path 120. The personal computers 117A and 117B can communicate data 119 with each other through the data transfer path 120. As an example of the data transfer path 120, a serial interface such as RS-232C may be used. In addition, the personal computers 117A and 117B can be connected using Ethernet or the like to form an LAN (Local Area Network) as the data transfer path 120. Beside those, the data transfer path 120 can be structured with a data communication using an infrared ray signal. The personal computers 117A and 117B can exchange the data 119 therebetween through the data transfer path 120. Of course, commands can be exchanged between the personal computers 117A and 117B through the data transfer path 120.

Figure 16:
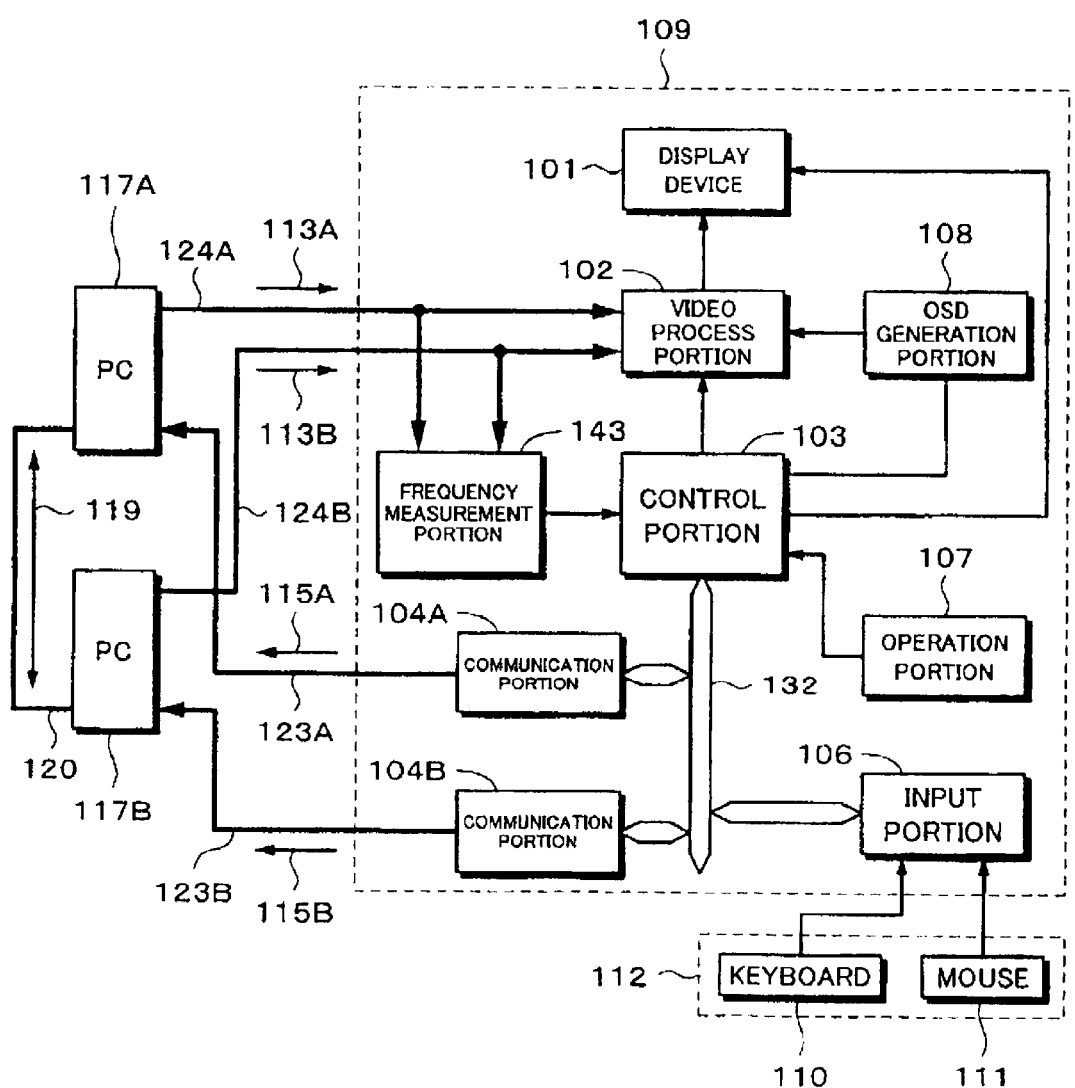
FIG. 16 is a block diagram showing an example of the structure of the monitor device according to the third embodiment.

FIG. 16 shows an example of the structure of the monitor device 109 according to the third embodiment of the present invention. A display device 101 is composed of for example a CRT or an LCD and a corresponding drive circuit. The display device 101 displays a picture on the display portion 150. The video signals 113A and 113B that are output from the personal computers 117A and 117B and supplied through the video signal path 124A and 124B are supplied to a frequency measurement portion 143 and a video process portion 102. The frequency measurement portion 143 measures the frequencies of horizontal synchronous signals and vertical synchronous signals of the supplied video signals 113A and 113B. The measured results of the frequency measurement portion 143 are supplied to a control portion 103.

In the following description, the frequencies of the horizontal synchronous signals and vertical synchronous signals are together referred to as synchronous frequency.

The control portion 103 comprises for example a CPU, a work memory thereof, and a ROM. The control portion 103 controls each portion of the monitor device 109 corresponding to a predetermined program pre-stored in for example the ROM.

The control portion 103 controls the drive circuit and the video process portion 102 of the display device 101 corresponding to the synchronous frequencies of the video signals 113A and 113B supplied from the frequency measurement portion 143 so as to cause the display portion 150 to display pictures corresponding to the synchronous frequencies of the video signals 113A and 113B.

When the operation portion 107 disposed on the front panel of the monitor device 109 is operated, a control signal corresponding to the operation of the operation portion 107 is supplied from the operation portion 107 to the control portion 103. The control portion 103 issues a command that causes an OSD generation portion 108 to generate a video signal that causes the display portion 150 to display an OSD. The video signal generated by the OSD generation portion 108 corresponding to the command is supplied to the video process portion 102. The video process portion 102 combines the video signal for the OSD and the video signals 113A and 113B and supplies the combined signal to the display device 101.

The monitor device 109 has an internal bus 132. The control portion 103, communication portions 104A and 104B, and an input portion 106 are connected to the internal bus 132. The input portion 106 is an interface for an input operation signal supplied from the input device 112 such as the keyboard 110 and the mouse 111. The input operation signal that is output from the input device 112 (for example, the key information that is output from the keyboard 110 and the mouse information that is output from the mouse 111) are received by the input portion 106 and supplied to the control portion 103 through the internal bus 132.

The communication portions 104A and 104B controls communications among the personal computers 117A and 117B and the control portion 103. For example, an input operation signal that is output from for example the input device 112 is received by the input portion 106 and supplied to the control portion 103 through the internal bus 132. The control portion 103 supplies the input operation signal through the internal bus 132 to the communication portion 104A or 104B connected to the personal computer 117A or 117B that has been selected.

For example, when the personal computer 117A has been selected, the input operation signal supplied from the control portion 103 to the communication portion 104A through the internal bus 132 is supplied as a control signal 115A from the communication portion 104A to the personal computer 117A through the control signal path 123A. Likewise, when the personal computer 117B has been selected, the input operation signal is supplied as a control signal 115B from the communication portion 4B to the personal computer 117B through the control signal path 123B.

In the above-described example, the input operation signal that is output from the input device 112 is supplied to the communication portions 104A and 104B through the control portion 103. However, the present invention is not limited to such an example. Instead, the input operation signal may be directly supplied from the input portion 106 to the communication portions 104A and 104B through the internal bus 132. The control for which the input operation signal is supplied to one of the communication portions 104A and 104B is performed by the control portion 103.

In the above description, the control portion 103, the communication portions 104A and 104B, and the input portion 106 are connected through the internal bus 132. However, the present invention is not limited to such an example. Instead, the communication portions 104A and 104B and the input portion 106 may be directly connected to the control portion 103 not through the internal bus 132. In the case, signals are exchanged between the communication portions 104A and 104B and the input portion 106 temporarily through the control portion 103.

FIG. 17 shows a detailed structure of the video process portion 102. In the example, two channels of video signals can be input. The video process portion 102 has two video signal input portions 160A and 160B. Each of the video signal input portions 160A and 160B comprises a video signal interface (such as an A/D conversion portion) and an input buffer. Video signals 113A and 113B are supplied to the video signal input portions 160A and 160B, respectively. The video signal input portions 160A and 160B convert the video signals 113A and 113B into predetermined digital video signals 113A' and 113B', respectively. The converted digital video signals 113A' and 113B' are supplied to a memory write control portion 162. The digital video signals 113A' and 113B' are address-controlled by the memory write control portion 162 corresponding to a control signal supplied from the control portion 103 and then written to a memory 163.

The memory 163 is a frame memory that can store a video signal for at least one frame. While switching part of the digital video signal 113A' and part of the digital video signal 113B' in the horizontal direction, the memory write control portion 162 writes them to the memory 163. Thus, as shown in FIG. 15, a display area 125A of the video signal 113A and a display area 125B of the video signal 113B arranged in the horizontal direction are displayed on the display portion 150. The digital video signal written to the memory 163 is controlled and output to an output portion 164 and then supplied to the display device 101.

The memory write control portion 162 controls the switching timings of part of the video signal 113A' and part of the video signal 113B' in the horizontal direction. Thus, the ratio of the display areas 125A and 125B can be changed. In addition, when part of the digital video signal 113A' and part of the digital video signal 113B' are switched in the vertical direction, the display portion 150 can be vertically divided so as to display the display areas 125A and 125B. The memory 163 may be structured as shown in FIG. 7.

The video signal generated by the OSD generation portion 108 is address-controlled by the memory write control portion 162 under the control of for example the control portion 103 and written to a predetermined address of the memory 163. Thus, the display portion 150 combines the pictures of the video signals 113A and 113B and the picture of OSD and displays the combined picture.

In the above-described structure, according to the third embodiment, two personal computers 117A and 117B are controlled by one input device 112. In addition, data can be seamlessly exchanged between the personal computers 117A and 117B corresponding to a display of the display portion 150.

FIG. 18 shows an example of a display of the display portion 150 according to the third embodiment. Next, the data operation method according to the third embodiment will be described in brief. The example of the display shown in FIG. 18 is in common with the display of a fourth embodiment, a fifth embodiment, and a sixth embodiment that will be described later. In the example shown in FIG. 18, the display area 125A displays the right side of the screen of the personal computer 117A. The display area 125B is horizontally adjacent to the display area 125A. The display area 125B displays the left side of the screen of the personal computer 117B. Data (files), programs, and folders (directories) (that hierarchically store files and programs) of the personal computers 117A and 117B are represented by identification pictures referred to as icons on the display portion 150.

Now, a process for moving file "Sample.doc" that is present in the personal computer 117A to the personal computer 117B is considered. The phrase "present in the personal computer 117A" means that the file is present in a storage medium such as a hard disk or a memory of the personal computer 117A. In addition, it is assumed that the personal computer 117A has been initially selected as an operative object and that an input operation signal that is input from the input device 112 such as the keyboard 110 and the mouse 111 is supplied to the personal computer 117A. In the display area 125A of the video signal 113A of the selected personal computer 117A, a mouse cursor 171 is displayed at a position corresponding to coordinate information received from the mouse 111.

The display area 125A shown in FIG. 18 displays an icon 170 that represents file "sample.doc". The user operates the mouse 111 so that the mouse cursor 171 overlays the icon 170 for the file to be moved. When the mouse cursor 171 overlays the icon 170, if the user presses the button of the mouse 111, the button information is supplied to the personal computer 117A. Thus, the file represented by the icon 170 is selected in the personal computer 117A. While the user is pressing the button of the mouse 111, he or she moves the mouse 111 so that the mouse cursor 171 is moved from the display area 125A to the display area 125B.

When the mouse cursor 171 is moved from the display area 125A to the display area 125B, the personal computer that is selected as an operative object is switched from the personal computer 117A to the personal computer 117B. Thus, the input operation signal that is input from the input device 112 is supplied to the personal computer 117B. The icon 170 is displayed in the display area 125B. The user moves the icon 170 to a desired position and then releases the button of the mouse 111. As a result, the file represented by the icon 170 is transferred from the personal computer 117A to the personal computer 117B. In addition, a command that causes the file to be deleted from the personal computer 117A is issued. Thus, the user can seamlessly move a file from the personal computer 117A to the personal computer 117B using one mouse 111.

In the above description, the operation of which while the mouse cursor 171 is overlaid with the icon 170, the selected icon 170 is moved with the mouse 111 is referred to as drag. On the other hand, the operation of which the button of the mouse 111 is released at the destination of the icon 170 and thereby the icon 170 is released from the operation of the mouse 111 is referred to as drop. A sequence of these operations is referred to as drag and drop.

Figure 19B:
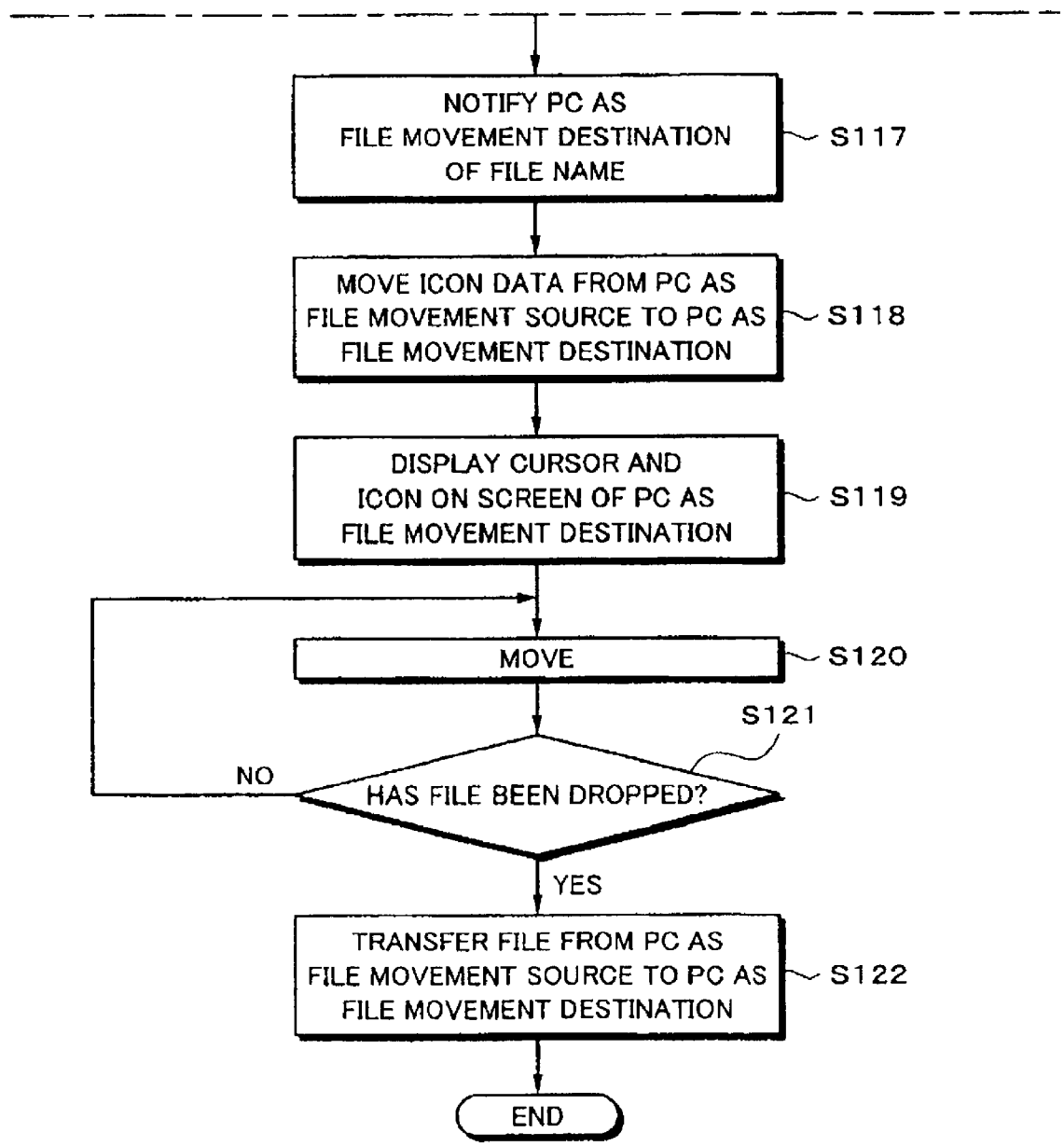
FIG. 19 is a flow chart showing an example of a move process of a file between personal computers.

FIG. 19 is a flow chart showing an example of a process for moving a file from the personal computer 117A to the personal computer 117B. Before the process of the flow chart is performed, the sizes of pictures of the personal computers 117A and 117B are obtained by the control portion 103. The sizes of the pictures can be obtained corresponding to the frequencies in the horizontal direction and vertical direction of the video signals 113A and 113B that are measured by the frequency measurement portion 143 and that are output from the personal computers 117A and 117B. The sizes of the pictures can be obtained as the numbers of dots in the horizontal direction and vertical direction, respectively.

The display position of the mouse cursor 171 in the power on state of the monitor device 109 is pre-set so that it matches the display position of the mouse cursor 171 in the power state of the personal computer side. The user may be able to freely set information such as the sizes of the pictures of the personal computers 117A and 117B and the display position of the mouse cursor in the power on state. It is assumed that the display area 125A of the video signal 113A of the personal computer 117A is assigned to the left side of the display portion 150 and that the display area 125B of the video signal 113B of the personal computer 117B is assigned to the right side of the display portion 150.

At step S110 as the first step, a file to be moved is selected in a personal computer from which the file is moved as the file movement source (in this example, the personal computer 117A). As was described above, the file is selected by overlaying the mouse cursor 171 with the icon 170 that represents the file to be selected using the mouse 111 and pressing the button of the mouse 111. Button information of the mouse 111 is received by the input portion 106 and supplied to the communication portion 104A through the control portion 103. The button information is sent from the communication portion 104A to the personal computer 117A through the control signal path 123A.

Alternatively, the button information of the mouse 111 received by the input portion 106 may be directly supplied to the communication portion 104A through the internal bus 132. The route of the internal bus 132 is controlled by the control portion 103.

After the file has been selected, at step S111 as the next step, the drag operation is performed so as to move the selected file on the screen. In other words, while the button of the mouse 111 is being pressed, the mouse 111 is moved so that the mouse cursor 171 is displayed at a desired position.

At step S112, corresponding to information of the mouse movement amounts that are output from the mouse 111, the control portion 103 determines whether or not the moved mouse cursor 171 reaches the right end of the display area 125A of the video signal 113A that is output from the personal computer 117A. When the determined result represents that the mouse cursor 171 reaches the right end of the display area 125A, at step S113 as the next step, it is determined whether or not the mouse cursor 171 has been further moved to the right side. When the determined result at step S113 represents that the mouse cursor 171 has been moved to the right side beyond the right end of the display area 125A, the flow of the process advances to step S114.

At step S114, the coordinates of the mouse cursor 171 that has been moved to the right side beyond the right end of the display area 125A and the movement amounts of the mouse 111 beyond the right end of the display area 125A are stored in for example a memory means of the display area 125A. These information may be stored in the personal computer 117A.

At step S115 as the next step, under the control of the control portion 103, the output destination of the input device 112 is switched from the personal computer 117A to the personal computer 117B. Thus, data of the mouse movement amounts generated corresponding to the movement of the mouse 111 is received by the input portion 106. The communication portion 104B is notified of the data of the mouse movement amounts through the control portion 103. Thereafter, the data of the mouse movement amounts is sent to the personal computer 117B. In addition, the control portion 103 controls the output of the input device 112 so that it is not sent to the personal computer 117A. Thus, the user's operation is switched from the personal computer 117A to the personal computer 117B.

At step S116 as the next step, the control signal 115A is sent from the control portion 103 of the monitor device 109 to the personal computer 117A through the control signal path 123A. From the screen of the personal computer 117A from which the file is moved as the file movement source (namely, from the display area 125A), the mouse cursor 171 and the icon 170 that represents the file to be moved are erased.

When a control signal that represents that the mouse 111 has not been moved should be sent to the personal computer 117A, after step S115, the control signal is sent from the control portion 103 to the personal computer 117A. When necessary, the control portion 103 may store information that allows a personal computer that becomes inactive to be distinguished form a personal computer that becomes active.

At step S117, the personal computer 117A informs the personal computer 117B of the file name of the file to be moved. In addition, the name assigned to the personal computer 117A from which the file is moved as the file movement source is sent to the personal computer 117B. The file name and the name of the personal computer are transferred through the data transfer path 120. When the icon 170 that represents the file selected by the personal computer 117A should be sent to the personal computer 117B, at step S118 as the next step, data of the icon 170 is sent from the personal computer 117A to the personal computer 117B through the data transfer path 120. When the personal computer 117B has an icon that represents a file moved from the personal computer 117A, the process can be omitted.

According to the third embodiment, the notification of the file name from the personal computer 117A to the personal computer 117B is performed through the data transfer path 120.

At step S119 as the next step, the mouse cursor 171 and the icon 170 that represents the file to be moved are displayed in the display area 125B as a display screen of the personal computer 117B. A command that causes the mouse cursor 171 and the icon 170 to be displayed at predetermined positions is sent from the control portion 103 to the personal computer 117B through the control signal path 123B.

The display positions can be obtained corresponding to the cursor coordinates and the mouse movement amounts stored at step S114. For example, by performing an addition and a subtraction for the mouse movement amounts against the Y coordinate at the right end of the display area 125A of the mouse cursor 171 and the Y coordinate at the left end of the display area 125B, the coordinates of the mouse cursor 171 in the display area 125B can be obtained. The icon 170 can be superimposed with the mouse cursor 171 so that they are displayed at the same coordinates.

In the above description, the mouse cursor 171 and the icon 170 are displayed corresponding to a command that is sent from the control portion 103 to the personal computer 117B. However, the present invention is not limited to such an example. Instead, after step S117, the personal computer 117B may cause the mouse cursor 171 and the icon 170 to be displayed.

At step S119, the mouse cursor 171 and icon 170 are displayed in the display area 125B of the personal computer 117B to which the file is moved as the file movement destination. At step S120 as the next step, the icon 170 that represents the file to be moved is moved in the display area 125B. This operation is performed by the drag operation of which while the button of the mouse 111 is being pressed, the mouse 111 is moved. At step S121, it is determined whether or not the button of the mouse 111 has been released and thereby the icon 170 has been dropped.

When the determined result at step S121 represents that the drop operation has been performed, the flow of the process advances to step S122. At step S122, the file is moved from the personal computer 117A as the file movement source to the personal computer 117B as the file movement destination through the data transfer path 120. For example, corresponding to the file name of which the personal computer 117A has informed the personal computer 117B at step S117, the personal computer 117B requests the personal computer 117A to transfer the file thereto through the data transfer path 120. Corresponding to the request, the personal computer 117A transfers the requested file to the personal computer 117B through the data transfer path 120.

Alternatively, the control portion 103 may send a file transfer command that represents the file transfer destination and so forth to the personal computer 117A through the control signal path 123A.

In the flow chart shown in FIG. 19, the order of steps S114 to S119 of the process is not fixed. In other words, as long as a desired operation can be performed, the order of the steps of the process may be changed. In addition, in the above description, a file selection operation, a file movement operation, and a file movement confirmation operation are performed by the drag and drop operations of the mouse 111. However, those operations may be performed in different manners. For example, with key operations of the keyboard 110, the file movement can be designated. In addition, with the operation of the operation portion 107, a command that causes a file to be moved can be issued.

Figure 20:
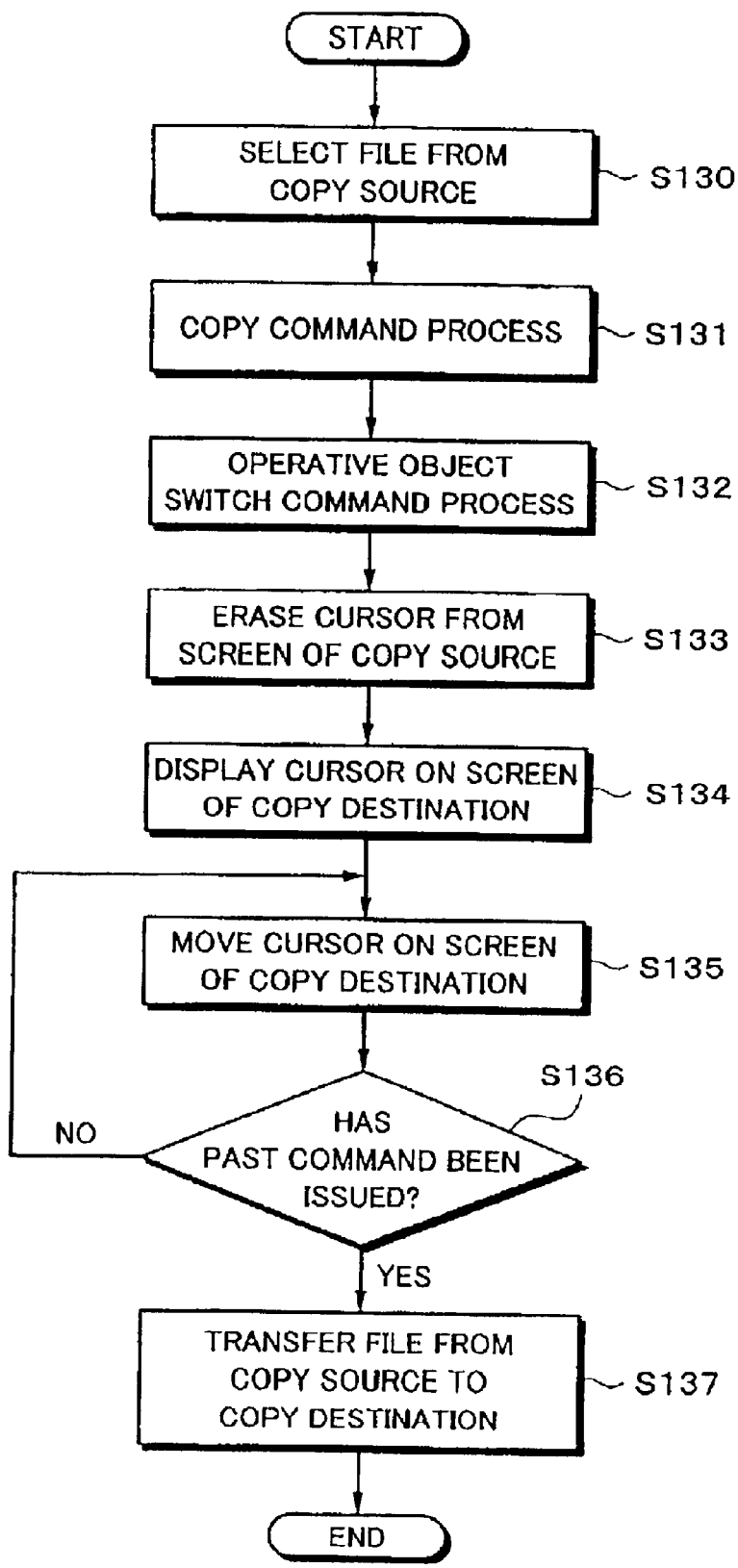
FIG. 20 is a flow chart showing an example of a process in the case that a file is copied between personal computers.

FIG. 20 is a flow chart showing an example of a process for copying a file from the personal computer 117A to the personal computer 117B using the keyboard 110 and the mouse 111. At step S130 as the first step, a file to be copied is selected in a personal computer as the file copy source (in this example, the personal computer 117A). As with the file movement process, when a file is selected, the mouse cursor 171 is overlaid with the icon 170 that represents the file to be selected using the mouse 111 and the button of the mouse 111 is pressed. The button information of the mouse 111 is received by the input portion 106 and supplied to the communication portion 104A through the control portion 103. The button information is sent from the communication portion 104A to the personal computer 117A through the control signal path 123A.

Alternatively, the button information of the mouse 111 received by the input portion 106 may be directly supplied to the communication portion 104A through the internal bus 132. The transmission path of the internal bus 132 is controlled by the control portion 103.

After the file to be copied has been selected, at step S131 as the next step, a copy command is issued by a use's operation. For example, a signal corresponding to a particular input that represents a copy operation to the keyboard 110 is received by the input portion 106 and supplied to the control portion 103. The control portion 103 recognizes the signal as a copy command. The recognized copy command is supplied to the communication portion 104A through the internal bus 132 under the control of the control portion 103. The copy command that has been supplied to the communication portion 104A is sent to the personal computer 117A through the control signal path 123A. Thus, the selected file is stored as a copy source file to the personal computer 117A.

Alternatively, key information corresponding to a key input to the keyboard 110 may be directly supplied to the communication portion 104A and sent to the personal computer 117A not through the control portion 103. The personal computer 117A recognizes the copy command corresponding to the key information that has been sent. At that point, although the control portion 103 recognizes the copy command, it is not necessary to send a control signal from the control portion 103 to the personal computer 117A.

At step S132 as the next step, the personal computer as the operative object is switched from the personal computer 117A to the personal computer 117B. For example, by inputting a predetermined key to the keyboard 110, a command that causes the personal computer as an operative object to be switched is issued. The switch command is received by the input portion 106 and then supplied to the control portion 103. The control portion 103 controls the internal bus 132 and the communication portions 104A and 104B corresponding to the switch command so as to switch the transmission destination of the input operation signal that is output from the input device 112 from the personal computer 117A to the personal computer 117B. Thus, after step S132, the personal computer that is operated by the user is switched from the personal computer 117A to the personal computer 117B.

The switch command issued at step S132 may be sent from the control portion 103 to the personal computer 117A through the communication portion 104A so that the personal computer 117A can recognize the switch command. In addition, when it is necessary to send the control signal to the personal computer 117A so as to represent that the mouse 111 has not been moved, after step S132, a control signal that represents that the mouse 111 has not been moved is sent from the control portion 103 to the personal computer 117A through the communication portion 104A. In addition, when necessary, the control portion 103 can store information that allows a personal computer that is active to be distinguished from a personal computer that is inactive.

At step S133, when the personal computer as the operative object is switched at step S132, the mouse cursor 171 displayed in the display area 125A is erased. As the switch process corresponding to the switch command supplied from the input portion 106 is performed, a cursor erase command is supplied from the control portion 103 to the communication portion 104A. The mouse cursor erase command is sent from the communication portion 104A to the personal computer 117A. Corresponding to the command, the personal computer 117A stops displaying the mouse cursor 171.

When the personal computer 117A has recognized the switch command at step S132, the personal computer 117A may erase the mouse cursor 171. In this case, it is not necessary to send the mouse cursor erase command from the control portion 103 to the personal computer 117A.

In addition, the personal computer 117A or the control portion 103 may store the coordinates of the mouse cursor 171 that is erased. In this case, when the personal computer as the operative object is switched to the personal computer 117A, the mouse cursor 171 can be displayed at the same position as before. At that point, when the coordinates are stored to the control portion 103, the coordinates of the mouse cursor 171 are calculated and stored as absolute coordinates of the display portion 150 corresponding to the synchronous frequency of the video signal 113A.

At step S134 as the next step, the mouse cursor 171 is displayed in the display area 125B of the personal computer 117B to which the file is copied as the file copy destination. In addition, the icon 170 that represents the file selected at step S130 is displayed at a position corresponding to the display coordinates of the mouse cursor 171 of the display area 125B. For example, the display coordinates of the mouse cursor 171 in the display area 125B are supplied from the control portion 103 to the communication portion 104B and then sent to the personal computer 117B. Alternatively, using the coordinates pre-stored in the personal computer 117B, the mouse cursor 171 may be displayed.

So far, the personal computer as the operative object is switched to the personal computer 117B to which the file is copied as the file copy destination. Thus, the personal computer 117B can be operated using the keyboard 110 and the mouse 111. At step S135, corresponding to the operation of the mouse 111, the mouse cursor 171 is moved to the display area 125B. In other words, the drag operation of which while the button of the mouse 111 is being pressed, the mouse 111 is moved is performed. Information that represents the movement amounts of the mouse 111 is received by the input portion 106, supplied to the communication portion 104B through the control portion 103, and sent from the communication portion 104B to the personal computer 117B.

At step S136, it is determined whether or not a paste command that causes the copied file to be pasted to the copy destination (namely, a command that causes the copied file to be stored to a storage medium such as a memory or a hard disk of the personal computer to which the copied file is stored) has been issued. When the determined result represents that the paste command has been issued, the flow of the process advances to step S137 as the next step. As a result, the file that has been selected is transferred from the personal computer as the copy source to the personal computer as the copy destination.

The paste command is issued by performing a particular input to the keyboard 110. A signal corresponding to the particular input that represents the paste operation is received by the input portion 106. The signal is supplied to the control portion 103 and recognized as the paste command. The recognized paste command is supplied to the communication portion 104B through the internal bus 132 under the control of the control portion 103. The paste command supplied to the communication portion 104B is sent to the personal computer 117B through the control signal path 24. Thus, a desired position of the display area 125B of the personal computer 117B is stored as the display position of the copy destination of the icon 170 that represents the file to be copied to the personal computer 117B.

Alternatively, key information corresponding to a key input to the keyboard 110 may be directly supplied to the communication portion 4B not through the control portion 103 and then sent to the personal computer 117B. The personal computer 117B recognizes the copy command corresponding to the key information that has been sent. At that point, although the control portion 103 recognizes the copy command, it is not necessary to cause the control portion 103 to send the control signal to the personal computer 117B.

When the determined result at step S136 represents that the control portion 103 has recognized the paste command, the control portion 103 notifies the personal computer 117A through the control signal path 123A that the transfer destination of the selected file is the personal computer 117B. In addition, the control portion 103 notifies the personal computer 117B through the control signal path 123B that the transfer source of the file as an object of the paste command is the personal computer 117A.

In addition, the above-described paste command can be supplied to the personal computer 117B so that the personal computer 117B directly controls the paste process. At that point, for example, the personal computer 117B requests the personal computer 117A to transfer the selected file through the data transfer path 20. Corresponding to the request, the personal computer 117A transfers the selected file to the personal computer 117B.

In the above description, various commands such as copy command, paste command, and personal computer switch command are issued by inputting predetermined keys to the keyboard 110. However, the present invention is not limited to such an example. Instead, the operation portion 107 of the monitor device 109 may issue such commands. Alternatively, predetermined button operations of the mouse 111 may allow such commands to be issued.

In the above example, file copy operation, file paste operation, and personal computer switch operation between the personal computer 117A and the personal computer 117B were described. However, the present invention is not limited to such an example. For example, on the conventional OS, when the icon 170 that represents data corresponding to an application is overlaid with an icon 170' that represents the application by the drag operation, the application can be executed in the state that the data has been read.

When the above-described process is performed on such an OS, an application of for example the personal computer 117B can be executed with data read from the personal computer 117A. In other words, the icon 170 that represents data and that is displayed in the display area 125A is dragged from the display area 125A to the display area 125B. As the icon 170 is moved from the display area 125A to the display area 125B, the personal computer as the operative object is switched from the personal computer 117A to the personal computer 117B.

When the icon 170 that represents data overlaid with the icon 170' that represents an objective application in the display area 125B, the button of the mouse 111 is released and the icon 170 that represents the data is dropped to the icon 170' that represents the application. When the drop operation is performed, the data represented by the icon 170 is transferred from the personal computer 117A to the personal computer 117B. Thus, the data is passed to the application of the personal computer 117B. As a result, the application is started in the state that data has been read.

In FIG. 18, the display areas 125A and 125B of the personal computers 117A and 117B are displayed in such a manner that the display portion 150 of the monitor device 109 is horizontally divided. However, the present invention is not limited to such an example. Instead, the display areas 125A and 125B may be displayed in such a manner that the display portion 150 is vertically divided. As was described in the first embodiment, the ratio of the divided display areas 125A and 125B may be changed by a predetermined operation using for example the mouse 111. Alternatively, by reducing the display areas 125A and 125B in predetermined sizes, they can be fully arranged on the display portion 150.

On the other hand, as shown in FIG. 16, the monitor device 109 has the OSD generation portion 108. A display of the display portion 150 can be superimposed with a display of the OSD. Using the OSD, the control states of the personal computers 117A and 117B, the monitor device 109, and the input device 112 can be displayed.

Figure 21:
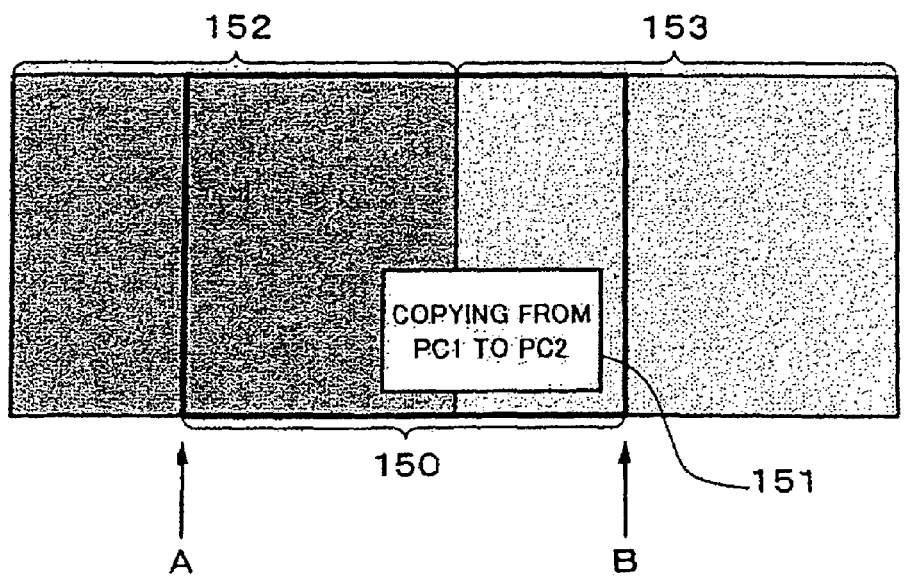
FIG. 21 is a schematic diagram showing various display methods for display screens of a plurality of computer devices against a display portion.

Next, with reference to FIGS. 21 to 24, various display methods of the display areas 125A and 125B on the display portion 150 will be described in more reality. FIG. 21 shows an example of which the display portion 150 is divided in the horizontal direction and that the display areas 125A and 125B are formed. In the example, an OSD screen 151 generated by the OSD generation portion 108 is displayed at a predetermined position on the display portion 150. The OSD screen 151 shows an outline of the operations of the computer devices 117A and 117B. In the example shown in FIG. 21, the OSD screen 151 shows that a file is being copied from the personal computer 117A to the personal computer 117B.

In FIG. 21, a full picture 152 of the video signal 113A of the personal computer 117A and a full display area of the video signal 113B of the personal computer 117B are arranged in the horizontal direction. The write control portion 132 writes the video signal 113A at timings from position A to the right end of the picture 152 in the horizontal direction to the memory 163. In addition, the write control portion 132 writes the video signal at timings from the left end of the picture 153 to position B in the horizontal direction to the memory 163. Thus, the display areas 125A and 125B can be displayed on the display portion 150 with a predetermined ratio in the horizontal direction.

When the timings of the position A and the position B are changed corresponding to for example the coordinates of the mouse 111, the ratio of the display areas 125A and 125B on the display portion 150 can be changed. Thus, the screen displayed on the display portion 150 can be scrolled. For example, when the mouse cursor 171 is moved in the right direction beyond the right end of the display area 125B, the ratio of the display area 125B becomes large. When the mouse cursor 171 is moved in the left direction beyond the left end of the display area 125A, the ratio of the display area 125A becomes large.

Alternatively, the ratio of the display areas 125A and 125B may be changed using the above-described OSD screen 151 and the operation portion 107 disposed on the front panel of the monitor device 109.

Figure 22:
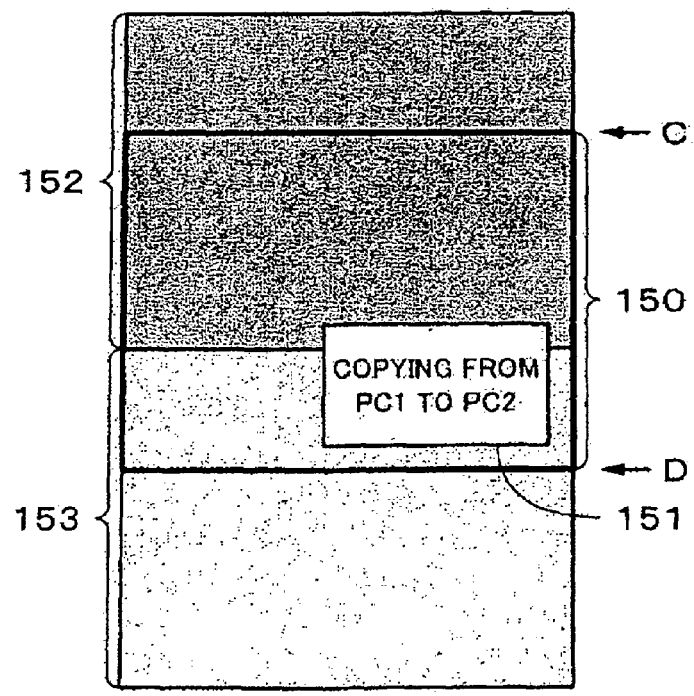
FIG. 22 is a schematic diagram showing more reality of various display methods for display screens of the plurality of computer devices against the display portion.

FIG. 22 shows an example of which the display portion 150 is divided in the vertical direction. In this example, the picture 152 and the picture 153 are arranged in the vertical direction. The write control portion 132 writes the video signal 113A at timings from position C to the lower end of the picture 152 in the vertical direction to the memory 163. In addition, the write control portion 132 writes the video signal 113B at timings from the upper end of the picture 153 to position D in the vertical direction to the memory 163. Thus, the display areas 125A and 125B can be displayed on the display portion 150 with a predetermined ratio in the vertical direction.

As with the example shown in FIG. 21, in the example shown in FIG. 22, for example, by moving the mouse 111, the ratio of the display areas 125A and 125B on the display portion 125 can be changed. In this case, when the mouse cursor 171 is moved in the upper direction beyond the upper end of the display portion 150, the ratio of the display area 125A becomes large. When the mouse cursor 171 is moved in the lower direction beyond the lower end of the display portion 150, the ratio of the display area 125B becomes large.

FIG. 23 shows an example of which a picture 152' as a reduced picture of the full picture 152 of the video signal 113A' of the personal computer 117A and a picture 153' as a reduced picture of the full picture 153 of the video signal 113B of the personal computer 117B are fully arranged on the display portion 150. The write control portion 132 reduces the supplied digital video signals 113A' and 113B' in predetermined sizes, maps them to predetermined addresses of the memory 163, and writes them to the addresses of the memory 163 so as to accomplish such a display. For example, the write control portion 132 thins out pixels of the digital video signals 113A' and 113B' in a predetermined manner so as to reduce the digital video signals 113A' and 113B' in the predetermined sizes.

When the pictures 152' and 153' are arranged on the display portion 150, they can be displayed in such a manner that parts thereof are overlapped. In this case, when the personal computer 117A is an operative object, the picture 152' of the personal computer 117A is displayed so that the picture 152' is overlapped above the picture 153'. In contrast, when the personal computer 117B is an operative object, the picture 153' of the personal computer 117B is displayed so that the picture 153'*s* is overlapped above the picture 152'.

In the case, the picture 152' and 153' can be displayed in such a manner that their sizes are different. In this case, a picture of one personal computer as an operative object may be larger than a picture of another personal computer on the display portion 150. In addition, when the display area of the display portion 150 is sufficiently large, the pictures 152' and 153' can be displayed as they are without reducing them.

FIGS. 24A and 24B show examples of which pictures 152 and 153 of the computer devices 117A and 117B are fully displayed on the display portion 150. In this case, the write control portion 132 writes the digital video signal 113A' of the personal computer 117A or the digital video signal 113B' of the personal computer 117B that is an operative object to the memory 163. Corresponding to a predetermined operation of the keyboard 110, the mouse 111, and so forth, the personal computer as an operative object is switched. In the example shown in FIG. 24, the OSD screen 151 shows full screen mode and a personal computer that has been selected as an operative object.

Assuming that the memory 163 has a storage capacity for the digital video signals 113A' and 113B' for two frames, the display control shown in FIGS. 21 to 24 may be performed in the same manner shown in FIG. 7 as the first embodiment.

Figure 25:
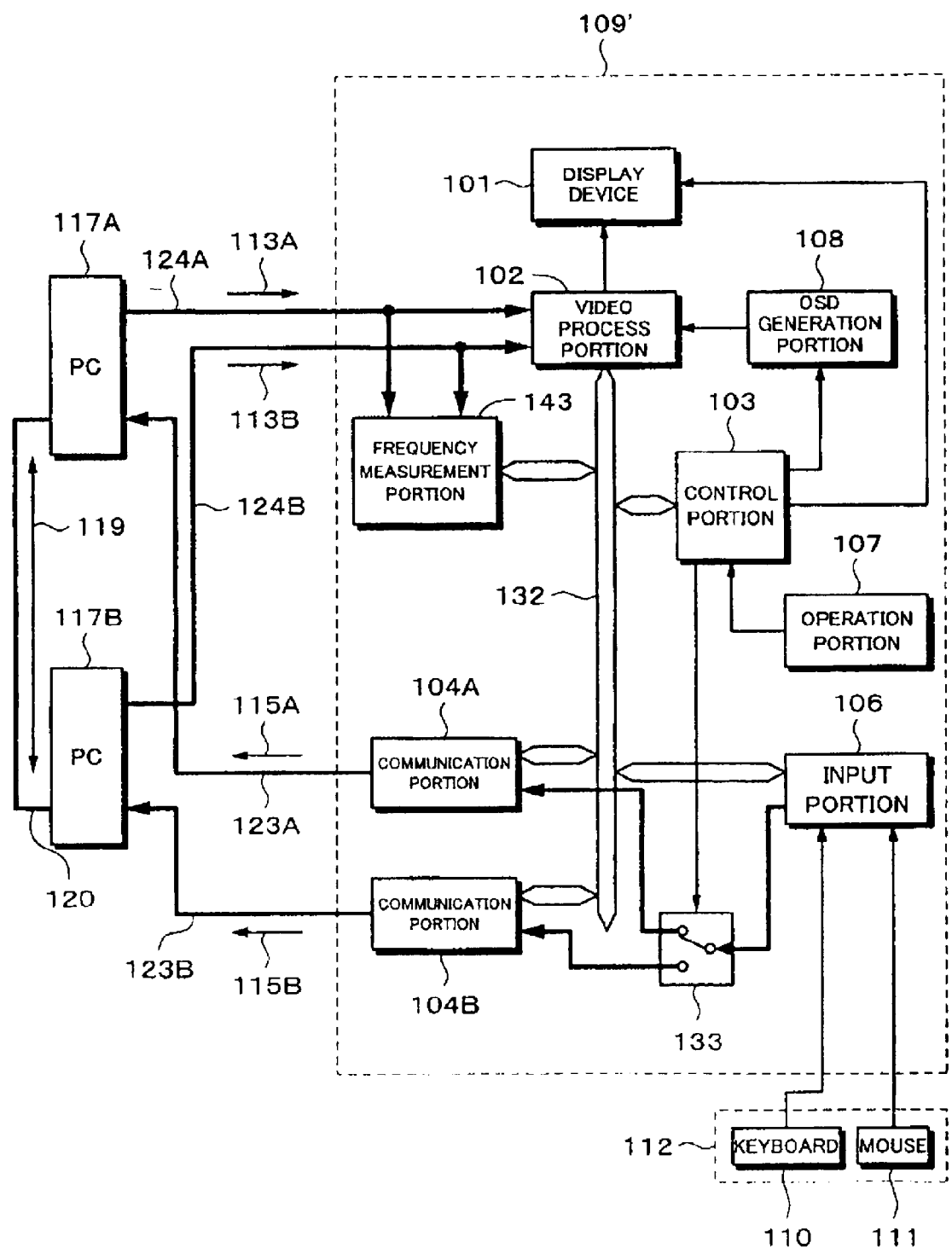
FIG. 25 is a block diagram showing an example of the structure of a monitor device according to a first modification of the third embodiment.

Next, a first modification of the third embodiment of the present invention will be described. FIG. 25 shows an example of the structure of a monitor device 109' according to the first modification of the third embodiment. In FIG. 25, similar portions to those in FIG. 16 are denoted by similar reference numerals and their detailed description will be omitted.

According to the first modification of the third embodiment, an input operation signal that is sent from an input device 112 to an input portion 106 is supplied to communication portions 104A and 104B through a selector 133. Corresponding to a control signal received from a control portion 103, the selector 133 selects one of the communication portions 104A and 104B to which the input operation signal is supplied. On the other hand, the input operation signal that is output from the input portion 106 is supplied to the selector 133 and the control portion 103. Thus, the selector 133 is switched under the control of the control portion 103 corresponding to the input operation signal.

In addition, according to the first modification of the third embodiment, besides the control portion 103 and the communication portions 104A and 104B, a video process portion 102 and a frequency measurement portion 143 are connected to an internal bus 132. As with the above-described third embodiment, while the control portion 103 and the communication portions 104A and 104B are connected to the internal bus 132, the control portion 103 and the video process portion 102 may be directly connected. Likewise, a bus structure of the first modification may be applied to the above-described third embodiment. The bus structure of the first modification can be applied to a second modification of the third embodiment, a fourth embodiment, a fifth embodiment, a sixth embodiment, and modifications thereof (that will be described later).

In such a structure, only signals that are received by the input portion 106 and that need to be passed through the control portion 103 (namely, only signal for file operations such as file movement operation and file copy operation) are supplied to the control portion 103 through the internal bus 132. The other signals that do not need to be passed through the control portion 103 can be directly supplied to the communication portions 104A and 104B. Thus, signals that do not need to be passed through the control portion 103 (for example, most of operation commands of the input device 112) can be sent to the outside not through the internal bus 132. Thus, the traffic of the internal bus 132 can be remarkably reduced.

Figure 26:
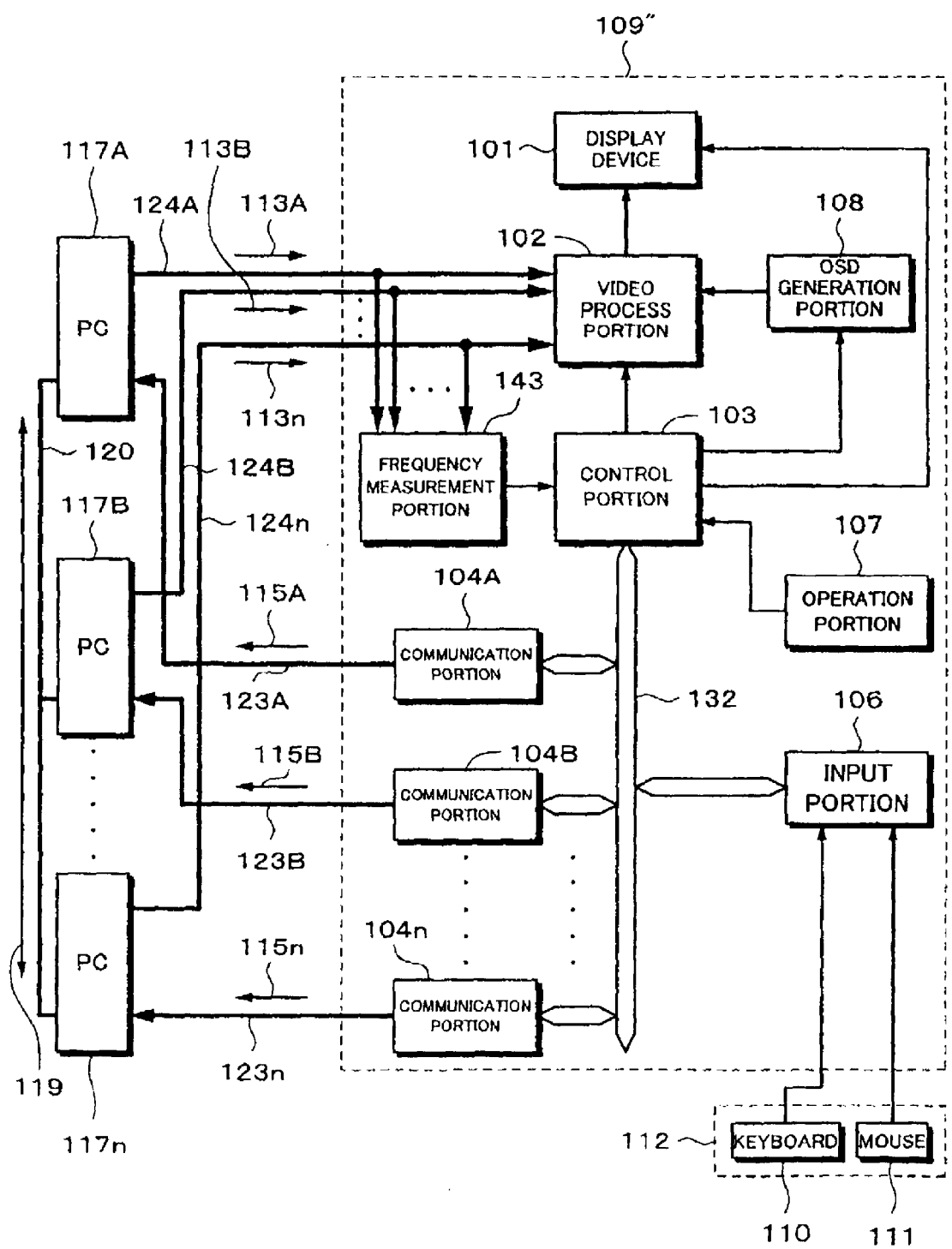
FIG. 26 is a block diagram showing an example of the structure of a monitor device according to a second modification of the third embodiment.

Next, the second modification of the third embodiment will be described. FIG. 26 shows an example of the structure of a monitor device 109" of the second modification of the third embodiment. According to the second modification, the third embodiment is extended so that three, four, or more personal computers can be connected.

Communication portions 104A, 104B, . . . , and 104n that are interfaces that control communications between respective personal computers and a control portion 103 are connected to an internal bus 132. Personal computers 117A, 117B, . . . , and 117n are connected to the communication portions 104A, 104B, . . . , and 104n through control signal paths 124A, 124B, . . . , and 124n, respectively. An input operation signal that is output from a keyboard 110, a mouse 111, a joystick, a remote control commander, or the like is received by an input portion 106. The route of the internal bus 132 for the input operation signal received by the input portion 106 is controlled by the control portion 103. As a result, control signals 115A, 115B, . . . , and 115n are supplied to the personal computers 117A, 117B, . . . , and 117n as selected destinations, respectively.

On the other hand, a video process portion 102 and a frequency measurement portion 143 can process video signals 113A, 113B, . . . , and 113n supplied from the many personal computers 117A, 117B, . . . , and 117n, respectively. The video process portion 102 has video input portions 160A, 160B, . . . , and 160n (not shown) corresponding to the video signals 113A, 113B, . . . , and 113n, respectively. The memory write control portion 162 switches digital video signals 113A', 113B', . . . , and 113n' supplied from the video input portions 160A, 160B, . . . , and 160n at predetermined timings in the horizontal direction and writes the switched signals to a memory 163. Alternatively, the memory write control portion 162 may thin out the digital video signals 113A', 113B', . . . , and 113n' in a predetermined manner, map the resultant signals to the memory 163, and display the digital video signals 113A', 113B', . . . , and 113n' on a display portion 150 so that they are arranged thereon.

The digital video signals 113A', 113B', . . . , and 113n' written to the memory 163 are read to an output portion 54 and supplied to a display device 101. The digital video signals 113A', 113B', . . . , and 113n' are displayed as display areas 125A, 125B, . . . , and 125n on the display portion 150 of the display device 101.

The personal computers 117A, 117B, . . . , and 117n are connected to each other through a data transfer path 120 so that they communicate to each other.

Even if three, four, or more personal computers can be connected, for example, corresponding to the flow chart shown in FIG. 19, a personal computer as a controllable object is switched with the coordinates of a mouse cursor 171, mouse movement amounts, and the relation of the positions of the display areas 125A, 125B, . . . , and 125n so as to perform a file copy operation, a file move operation, and so forth through the data transfer path 120.

Figure 27:
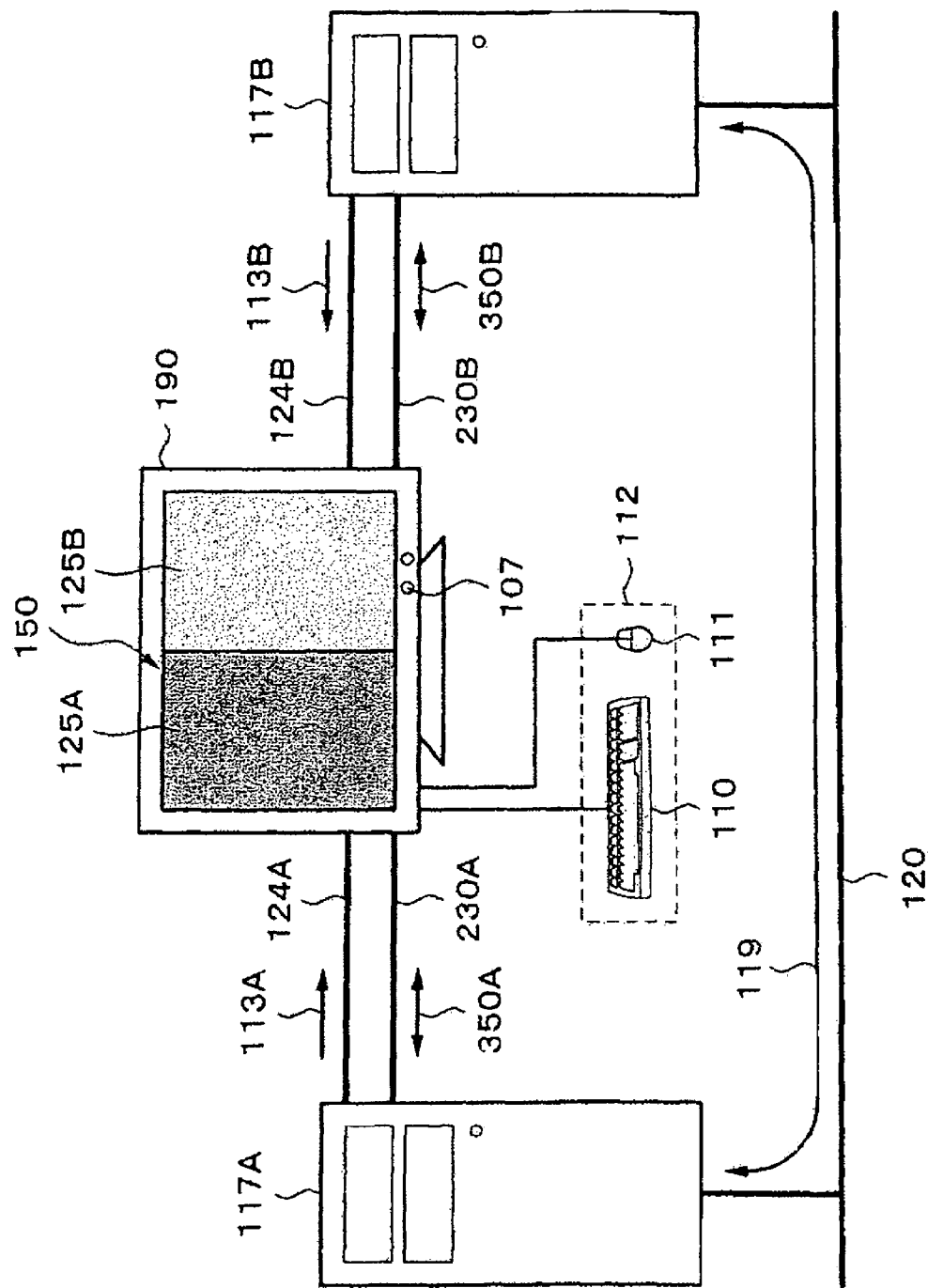
FIG. 27 is a schematic diagram showing the operation of a monitor device according to a fourth embodiment.

Next, the fourth embodiment of the present invention will be described. FIG. 27 shows an outline of the operation of a monitor device 190 according to the fourth embodiment. In FIG. 27, similar portion to those in FIG. 15 are denoted by similar reference numerals and their detailed description will be omitted.

According to the fourth embodiment, personal computers 117A and 117B are connected to a monitor device 190 through control signal paths 230A and 230B that can bi-directionally communicate instead of the control signal paths 123A and 123B of the third embodiment shown in FIG. 15. In other words, according to the fourth embodiment, communication portions 400A and 400B (that will be described later) are disposed in the monitor device 190. The communication portions 400A and 400B can bi-directionally communicate with the outside. Thus, the monitor device 190 can directly obtain synchronous frequency information of a video signal 113A of the personal computer 117A and synchronous frequency information of a video signal 113B of the personal computer 117B from control signals 350A and 350B that are output from the personal computers 117A and 117B, respectively. Thus, in the monitor device 190, the frequency measurement portion 143 can be omitted from the monitor device 109.

As the interfaces of the control signal paths 230A and 230B, as long as the personal computers 117A and 117B can bi-directionally communicate with each other, one of various types of interfaces such as USB and IEEE 1394 can be used as the interfaces of the control signal paths 230A and 230B. Alternatively, a serial interface such as RS-232C or a parallel port can be used as such the interfaces. Further alternatively, PS/2 or IrDA (Infrared Data Association) may be used as such interfaces.

Figure 28:
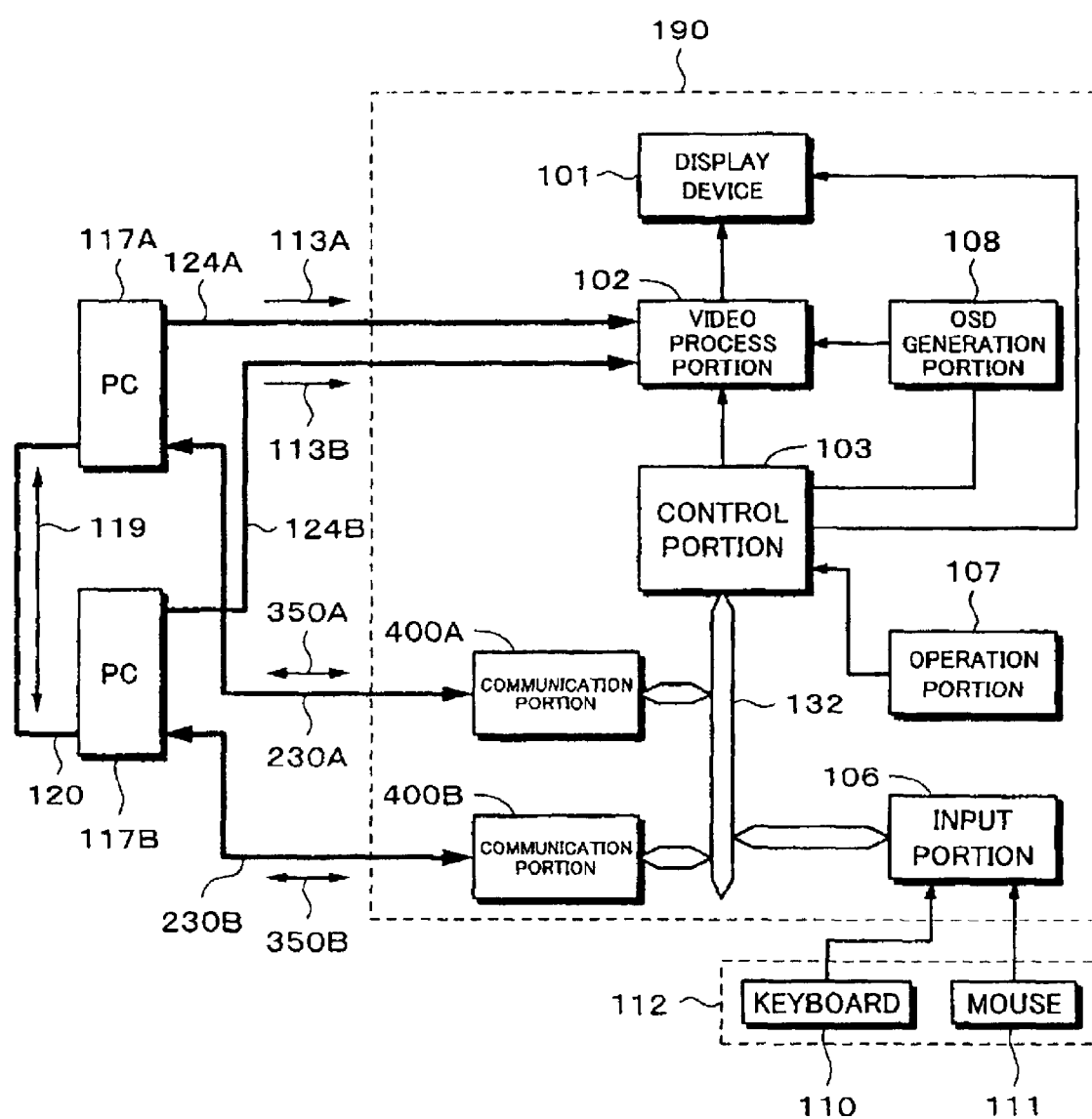
FIG. 28 is a block diagram showing an example of the structure of the monitor device according to the fourth embodiment.

FIG. 28 shows an example of the structure of a monitor device 190 according to the fourth embodiment. In FIG. 28, similar portions to those in FIG. 16 are denoted by similar reference numerals and their detailed description will be omitted. Referring to FIG. 28, a control portion 103 and an input portion 106 are connected to an internal bus 132. Communication portions 400A and 400B are connected to the internal bus 132. The communication portions 400A and 400B bi-directionally communicate with the outside.

Control signals are sent from personal computers 117A and 117B. The control signals are supplied to the communication portions 400A and 400B through control signal paths 230A and 230B, respectively. The control signals that have been supplied to the communication portions 400A and 400B are supplied to a control portion 103 through an internal bus 132. For example, synchronous frequency information is sent as control signals 350A and 350B from the personal computers 117A and 117B. The communication portions 400A and 400B receive the control signals 350A and 350B and supply the received signals to the control portion 103, respectively.

The control portion 103 extracts synchronous frequency information from the supplied signals and controls a video process portion 102 so that a picture of a video signal 113A of the personal computer 117A and a picture of a video signal 113B of the personal computer 117B are properly displayed on a display portion 150 corresponding to the extracted synchronous frequency information.

Since the communication portions 400A and 400B bi-directionally communicate through the control signal paths 230A and 230B, as shown in FIG. 27, two video signals can be properly displayed on a display portion 150 without need to dispose a means for measuring synchronous frequencies of the video signals 113A and 113B of the personal computers 117A and 117B.

In the above description, the control portion 103, the communication portions 400A and 400B, and the input portion 106 are connected through the internal bus 132. However, the present invention is not limited to such an example. Instead, the communication portions 400A and 400B and the input portion 106 may be directly connected to the control portion 103 without need to use the internal bus 132. In the case, signals are exchanged between the communication portions 400A and 400B and the input portion 106 temporarily through the control portion 103.

Figure 29:
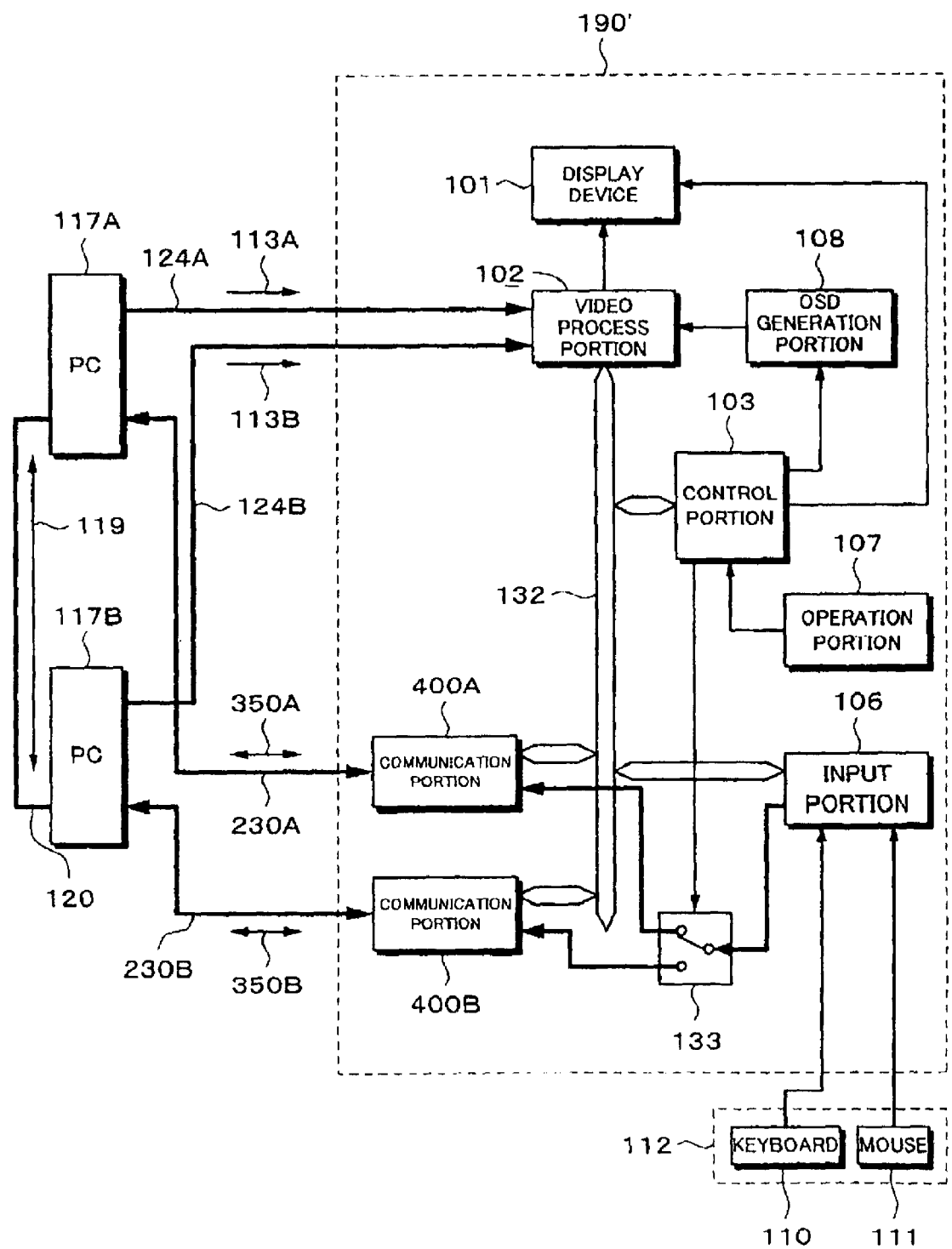
FIG. 29 is a block diagram showing an example of the structure of a monitor device according to a first modification of the fourth embodiment.

FIG. 29 shows an example of the structure of a monitor device 190' according to a first modification of the fourth embodiment. The structure shown in FIG. 29 corresponds to the structure (see FIG. 25) of the first modification of the third embodiment. An input operation signal that is output from an input portion 106 is supplied to communication portions 400A and 400B through a selector 133. In FIG. 29, similar portions to those in FIG. 25 are denoted by similar reference numerals and their detailed description will be omitted.

As was described above, the selector 133 selects one of the communication portions 400A and 400B to which the input operation signal is supplied corresponding to a control signal received from a control portion 103. On the other hand, an input operation signal that is output from the input portion 106 is supplied to the selector 133. In addition, the input operation signal is supplied to the control portion 103. The selector 133 is switched under the control of the control portion 103 corresponding to the input operation signal.

On the other hand, control signals 350A and 350B that are sent from the personal computers 117A and 117B are received by the communication portions 400A and 400B and supplied to the control portion 103 through an internal bus 103.

As with the above description, in the structure of the first modification of the fourth embodiment, only signals that are received by the input portion 106 and that need to be passed through the control portion 103 (namely, only signal for file operations such as file movement operation and file copy operation) are supplied to the control portion 103 through the internal bus 132. The other signals that do not need to be passed through the control portion 103 can be directly supplied to the communication portions 400A and 400B. Thus, signals that do not need to be passed through the control portion 2 (for example, most of operation commands that are input from an input device 112 by the user) can be sent to the outside not through the internal bus 132. Thus, the traffic of the internal bus 132 can be remarkably reduced.

Figure 30:
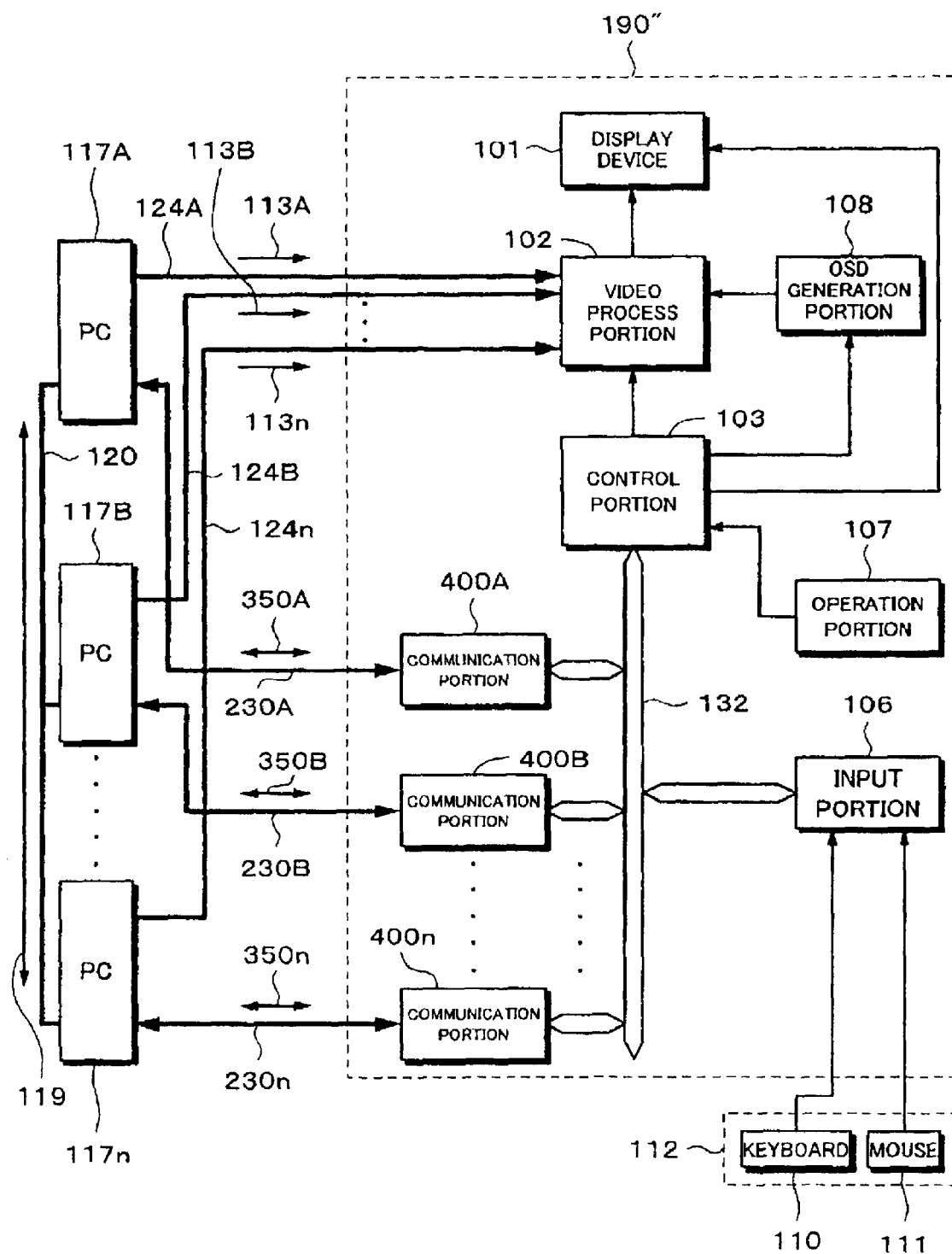
FIG. 30 is a block diagram showing an example of the structure of a monitor device according to a second modification of the fourth embodiment.

FIG. 30 shows an example of the structure of a monitor device 190" according to a second modification of the fourth embodiment. The structure shown in FIG. 30 corresponds to the structure (see FIG. 26) of the second modification of the third embodiment. In other words, according to the second modification of the fourth embodiment shown in FIG. 30, the fourth embodiment is extended so that three, four, or more personal computer can be connected to the monitor device 190". In FIG. 30, similar portions to those shown in FIG. 26 are denoted by similar reference numerals and their detailed description will be omitted.

Communication portions 400A, 400B, . . . , and 400n are connected to an internal bus 132. The communication portions 400A, 400B, . . . , and 400n are interfaces that control communications between the personal computers and a control portion 103. The communication portions 400A, 400B, . . . , and 400n can bi-directionally communicate with external devices connected thereto. Personal computers 117A, 117B, . . . , and 117n are connected to the communication portions 400A, 400B, . . . , and 400n through control signal paths 230A, 230B, . . . , and 230n, respectively. An input operation signal that is output from an input device 112 such as a keyboard 110, a mouse 111, a joystick, a remote control commander, or the like is received by an input portion 106. The route of the internal bus 132 for the input operation signal received by the input portion 106 is controlled by the control portion 103 and supplied as control signal 350A, 350B, . . . , and 350n corresponding to the destinations selected from the personal computers 117A, 117B, . . . , and 117n, respectively.

On the other hand, a video process portion 102 can process video signals 113A, 113B, . . . , and 113n supplied from the many personal computers 117A, 117B, . . . , and 117n through video signal paths 124A, 124B, . . . , and 124n, respectively. The video process portion 102 has for example video input portions 160A, 160B, . . . , and 160n (not shown) corresponding to the video signals 113A, 113B, . . . , and 113n, respectively.

In addition, synchronous frequency information is sent from the personal computers 117A, 117B, . . . , and 117n through the control signal paths 230A, 230B, . . . , and 230n, respectively. The synchronous frequency information is received by the communication portions 400A, 400B, . . . , and 400n and sent to the control portion 103 through the internal bus 132. The control portion 103 supplies control signals to the video process portion 102 corresponding to the supplied synchronous frequency information. A memory write control portion 162 switches digital video signals 113A', 113B', . . . , and 113n' supplied from the video input portions 160A, 160B, . . . , and 160n at predetermined timings in the horizontal direction and writes them to a memory 163. Alternatively, the memory write control portion 162 may thin out the digital video signals 113A', 113B', . . . , and 113n' in a predetermined manner, map them to the memory 163, and then arrange displays of the digital video signals 113A', 113B', . . . , and 113n' on the display portion 150.

The digital video signals 113A', 113B', . . . , and 113n' written to the memory 163 are read by an output portion 54 and supplied to a display device 101. The digital video signals 113A', 113B', . . . , and 113n' are displayed as display areas 125A, 125B, . . . , and 125n on the display portion 150 of the display device 101, respectively.

Thus, even if three, four, or more personal computers are connected to the monitor device 190, bi-directional communications are performed through the control signal paths 230A, 230B, . . . , and 230n, respectively. Since each of the personal computers 117A, 117B, . . . , and 117n sends synchronous frequency information, it is not necessary to dispose a frequency measuring means in the monitor device 190".

Displays on the display screen 150 of the personal computers 117A and 117B according to the fourth embodiment and the first and second modifications thereof correspond to those according to the third embodiment shown in FIGS. 21 to 24. Likewise, the file copy process and file movement process performed between the personal computers 117A and 117B according to the fourth embodiment correspond to those according to the third embodiment.

Figure 31:
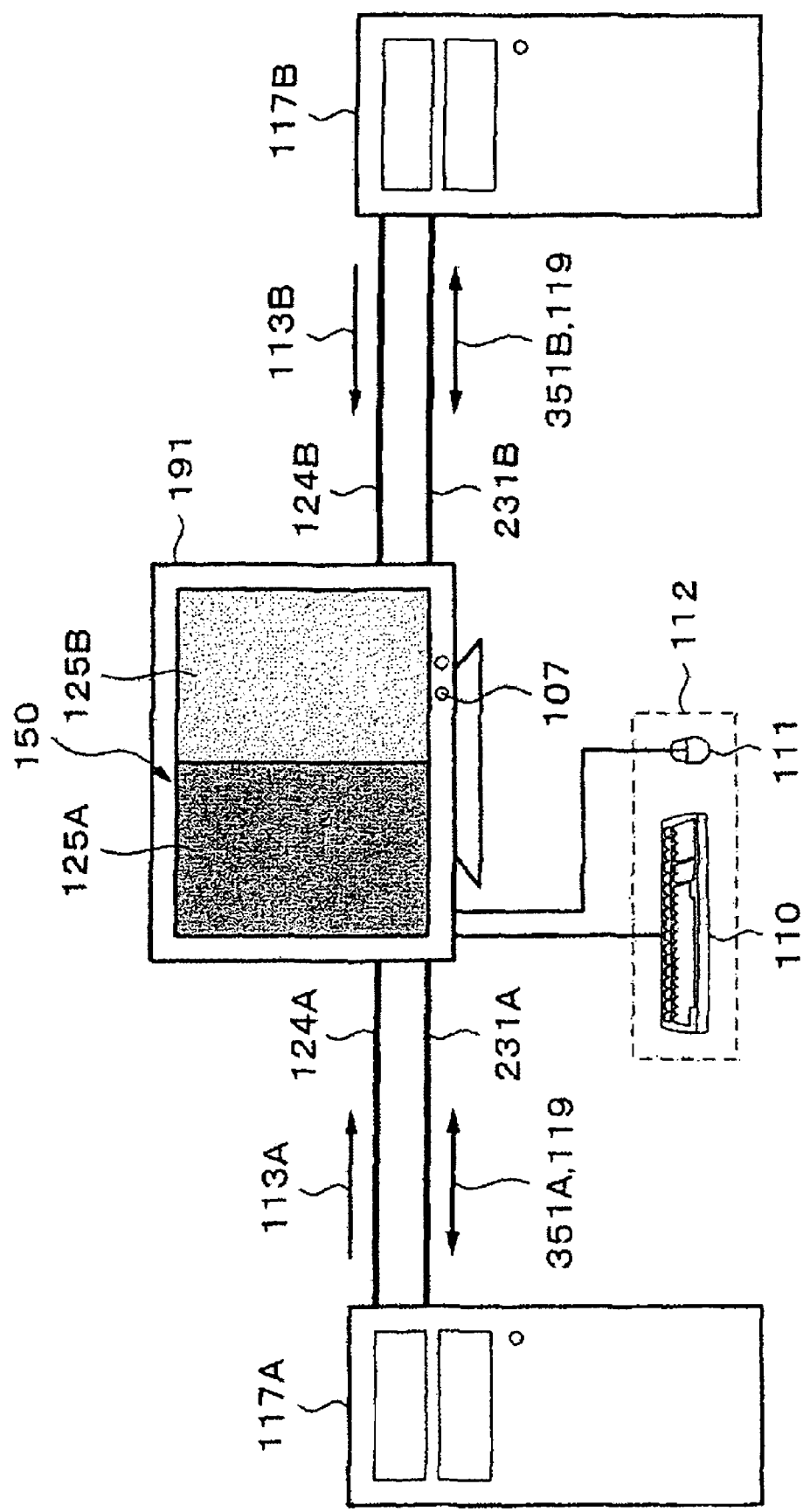
FIG. 31 is a schematic diagram showing the operation of a monitor device according to a fifth embodiment.

Next, the fifth embodiment of the present invention will be described. FIG. 31 shows an outline of the operation of a monitor device 191 according to the fifth embodiment. In FIG. 31, similar portions to those in FIG. 15 are denoted by similar portion and their detailed description will be omitted.

According to the fifth embodiment, using control signal paths 231A and 231B that connect personal computers 117A and 117B and a monitor device 191, an input operation signal that is output from an input portion 106 is supplied to one of the personal computers 117A and 117B as an operative object. In addition, control signals 351A and 351A are exchanged. Moreover, using the control signal paths 231A and 231B, data 119 is exchanged between the personal computers 117A and 17B. In other words, the data 119 that is transferred from the personal computer 117A to the personal computer 117B is supplied to the monitor device 191 through the control signal path 231A. In addition, the data 119 is sent from the monitor device 191 to the personal computer 117B through the control signal path 231B.

Figure 32:
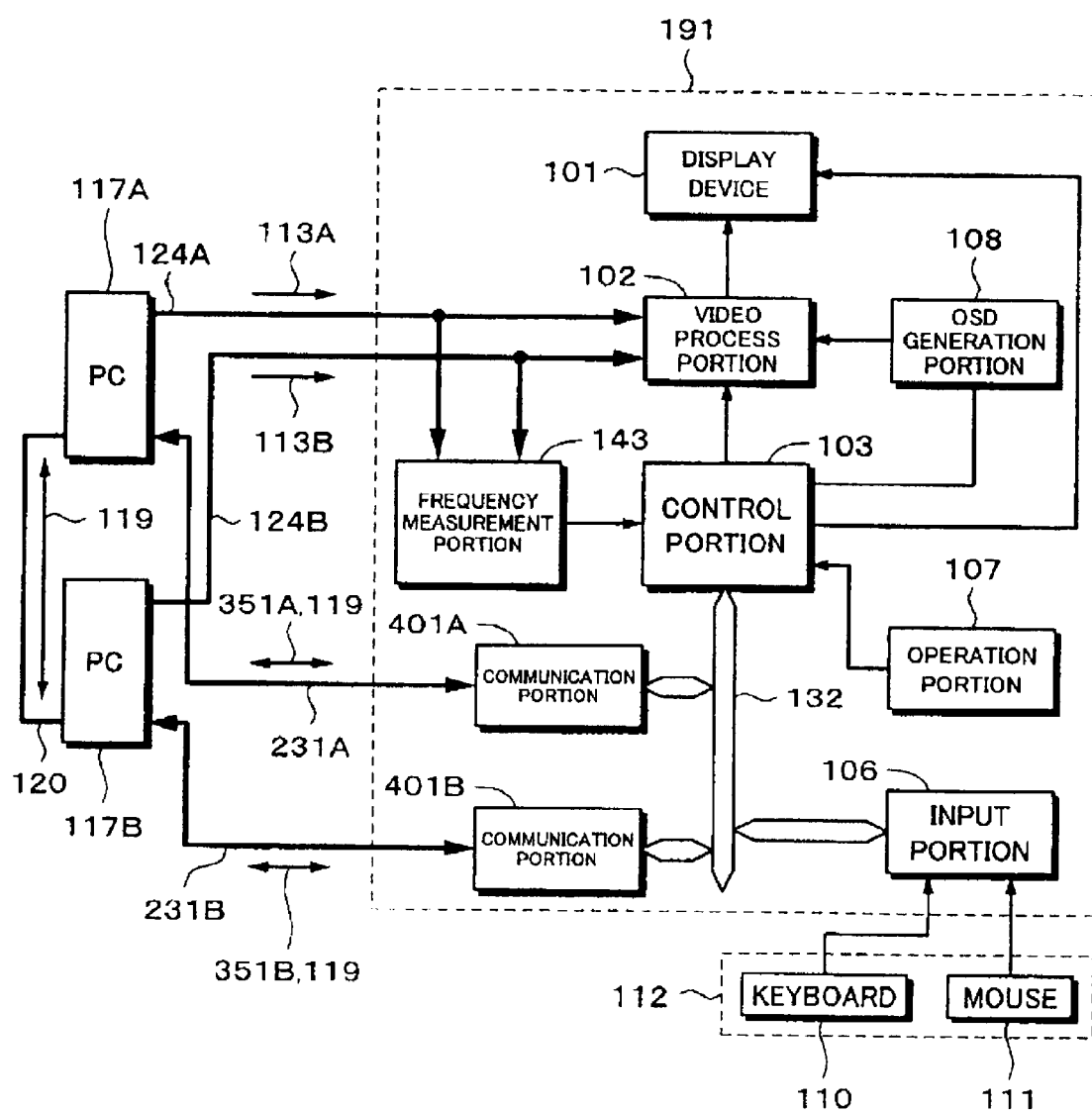
FIG. 32 is a block diagram showing an example of the structure of a monitor device according to the fifth embodiment.

FIG. 32 shows an example of the structure of a monitor device 191 according to the fifth embodiment. In FIG. 32, similar portions to those in FIG. 16 are denoted by similar reference numerals and their detailed description will be omitted. Communication portions 401a and 401b are communication interfaces that can bi-directionally communicate with the outside. A personal computer 117A and the communication portion 401A are connected through a control signal path 231A. Likewise, a personal computer 117B and the communication portion 401B are connected through a control signal path 231B.

An input operation signal that is output from an input device 112 is received by an input portion 106 and supplied to a control portion 103 through an internal bus 132. For example, corresponding to position information of a mouse cursor obtained from mouse information of the input operation signal, one of the personal computers 117A and 117B is determined as an operative object. In this example, it is assumed that the personal computer 117A is an operative object. Corresponding to the determined result, the input operation signal is supplied to the communication portion 401A through the internal bus 132 and sent to the personal computer 117A as an operative object through the control signal path 231A.

On the other hand, the data 119 sent from the personal computer 117A is received by the communication portion 401A through the control signal path 231A and supplied to the control portion 103 through the internal bus 132. When the determined result represents that the supplied data 119 is data to be sent to the personal computer 117B, the control portion 103 supplies the data 119 to the communication portion 401B through the internal bus 132. The data 119 supplied to the communication portion 401B is sent to the personal computer 117B through the control signal path 231B. Likewise, data communications are performed from the personal computer 117B to the personal computer 117A.

In the structure shown in FIG. 32, when synchronous frequency information is output from each of the personal computers 117A and 117B and the synchronous frequency information is received by the communication portions 401A and 401B through the control signal paths 213A and 213B, a frequency measurement portion 143 can be omitted. For example, the monitor device 191 requests the personal computers 117A and 117B for system information thereof through the control signal paths 231A and 231B. As a result, synchronous frequency information can be obtained corresponding to the system information sent from the personal computers 117A and 117B. This applies to first and second modifications of the fifth embodiment (that will be described later).

In such a manner, when data communications are performed between the personal computers 117A and 117B through the monitor device 191 using the control signal paths 231A and 231B that connect the personal computers 117A and 117B and the monitor device 191, the file movement process and the file copy process can be performed between the personal computers 117A and 117B as with the third embodiment.

For example, the file name of a file to be moved is sent from the personal computer 117A to the communication portion 401A through the control signal path 231A and supplied to the control portion 103 through the internal bus 132. Corresponding to an input operation signal that is supplied from the input device 112 through the input portion 106, when the determined result represents that a command that causes the file to be moved to the personal computer 117B has been issued due to the drop operation for the file in a display area 25B of the personal computer 117B, the control portion 103 causes the personal computer 117A to send the file to the personal computer 117B corresponding to the file name supplied from the personal computer 117A. The file sent from the personal computer 117A to the monitor device 191 corresponding to the command is received by the communication portion 401A and supplied to the control portion 103 through the internal bus 132. The file supplied to the control portion 103 is supplied to the communication portion 401B through the internal bus 132 and sent from the communication portion 401B to the personal computer 117B.

In other words, as with the data 119 shown in FIG. 32, the file to be moved is exchanged between the personal computers 117A and 117B through the control signal paths 231A and 231B and the monitor device 191.

In the above description, the file received by the communication portion 401A is temporarily supplied to the control portion 103 through the internal bus 132. However, the present invention is not limited to such an example. Instead, when the control portion 103 controls the internal bus 132 in a predetermined manner, the file received by the communication portion 401A may be directly supplied to the communication portion 401B through the internal bus 132 and then sent to the personal computer 117B.

As long as the control signal paths 231A and 231B are communication interfaces that can bi-directionally communicate, various types of interfaces can be used. For example, USB or IEEE 1394 can be used as the interfaces of the control signal paths 231A and 231B. Alternatively, a serial interface such as RS-232C or a parallel port can be used as the interfaces of the control signal paths 231A and 231B. Further alternatively, PS/2 or IrDA can be used as the interfaces of the control signal paths 231A and 231B.

In the above description, the control portion 103, the communication portions 401A and 401B, and the input portion 106 are connected through the internal bus 132. However, the present invention is not limited to such an example. Instead, the communication portions 401A and 401B and the input portion 106 can be directly connected to the control portion 103 without need to use the internal bus 132. In the case, signals are exchanged between the communication portions 401A and 401B and the input portion 106 temporarily through the control portion 103.

Figure 33:
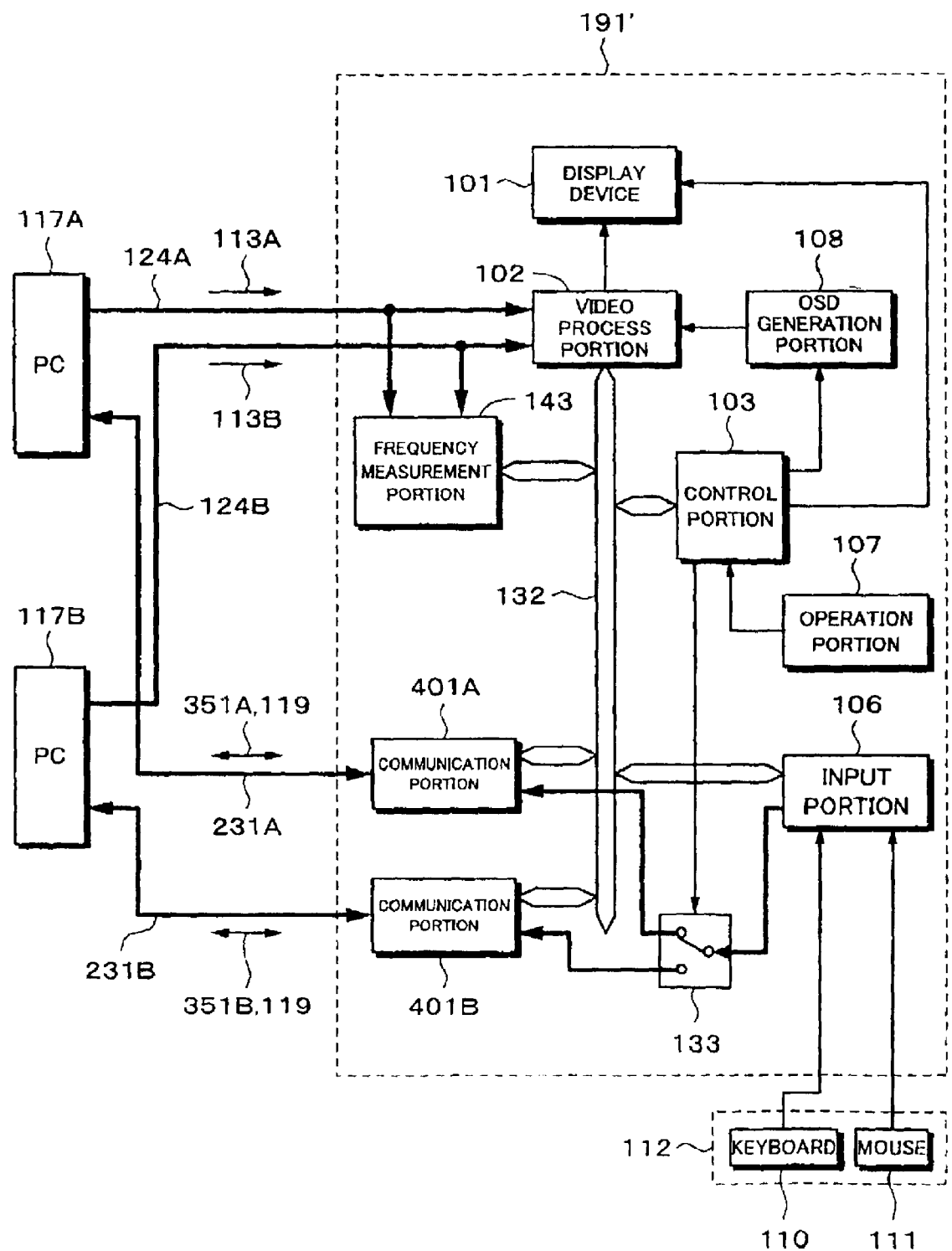
FIG. 33 is a block diagram showing an example of the structure of a monitor device according to a first modification of the fifth embodiment.

FIG. 33 shows an example of the structure of a monitor device 191' according to a first modification of the fifth embodiment. The structure shown in FIG. 33 corresponds to the structure (see FIG. 25) of the first modification of the third embodiment. An input operation signal that is output from an input portion 106 is supplied to communication portions 401A and 401B through a selector 133. In FIG. 33, similar portions to those in FIG. 16 are denoted by similar portion and their detailed description will be omitted.

According to the first modification of the fifth embodiment, an input operation signal that is sent from an input device 112 to the input portion 106 is supplied to the communication portions 401A and 401B through the selector 133. The selector 133 selects one of the communication portions 401A and 401B to which the input operation signal is supplied corresponding to a control signal received from an control portion 103. On the other hand, the input operation signal that is output from the input portion 106 is supplied to the selector 133. In addition, the input operation signal is supplied to the control portion 103. Thus, the selector 133 is switched under the control of the control portion 103 corresponding to the input operation signal.

The input operation signal that is output from the input device 112 and that is received by the input portion 106 is supplied to the control portion 103 through an internal bus 132. In addition, the input operation signal is supplied to the selector 133. The control portion 103 determines one of personal computers 117A and 117B as an operative object corresponding to the input operation signal (for example position information of a mouse cursor 171) supplied through the internal bus 132. Corresponding to the determined result, the control portion 103 controls the selector 133. The input operation signal supplied to the selector 133 is supplied to the communication portion 401A or 401B that is connected to the personal computer as the operative object. The input operation signal is supplied from the communication portion 401A to the personal computer 117A through a control signal path 231A or from the communication portion 401B to the personal computer 117B through a control signal path 231B.

On the other hand, data 119 that is communicated between the personal computer 117A and the personal computer 117B is sent from for example the personal computer 117A and received by the communication portion 401A. Thereafter, the data 119 is supplied to the control portion 103 through the internal bus 132. The data 119 received by the control portion 103 is supplied from the control portion 103 to the communication portion 401B through the internal bus 132 and sent from the communication portion 401B to the personal computer 117B. Alternatively, the data 119 may be directly supplied from the communication portion 401A to the communication portion 401B through the internal bus 132 under the control of the internal bus 132 of the control portion 103, not sent to the control portion 103.

In the structure, only signals that are received by the input portion 106 and that need to be passed through the control portion 103 (namely, the signals for file operations such as file movement operation and file copy operation) are supplied to the control portion 103 through the internal bus 132. The other signals that do not need to be passed through the control portion 103 are directly supplied to the communication portions 401A and 401B. Thus, signals that do not need to be passed through the control portion 103 (for example, most of operation commands that are input from an input device 112 by the user) can be sent to the outside not through the internal bus 132. Thus, the traffic of the internal bus 132 can be remarkably reduced.

Figure 34:
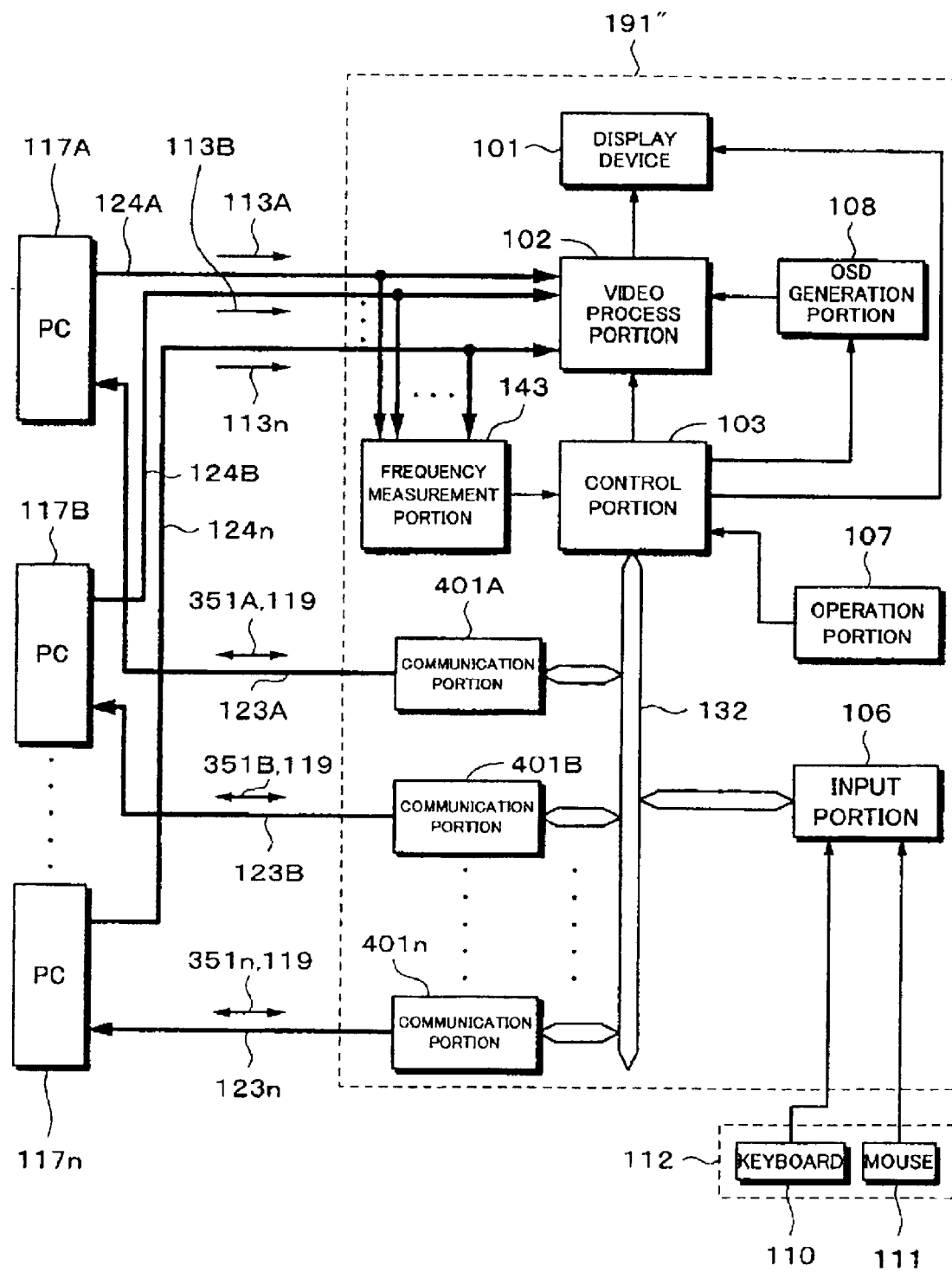
FIG. 34 is a block diagram showing an example of the structure of a monitor device according to a second modification of the fifth embodiment.

Next, a second modification of the fifth embodiment will be described. FIG. 34 shows an example of the structure of a monitor device 191" according to the second embodiment of the fifth embodiment. The structure of the second modification corresponds to the structure (see FIG. 26) of the second modification of the third embodiment. According to the second modification of the fifth embodiment shown in FIG. 34, the fifth embodiment is extended so that the monitor device 191" is connected to three, four, or more personal computers. In FIG. 34, similar portions to those in FIG. 26 are denoted by similar reference numerals and their detailed description will be omitted.

A video process portion 102 and a frequency measurement portion 143 can process video signals 113A, 113B, . . . , and 113n supplied from many personal computers 117A, 117B, . . . , and 117n. The video process portion 102 has for example video input portions 160A, 160B, . . . , and 160n (not shown) corresponding to the video signals 113A, 113B, . . . , and 113n. A memory write control portion 162 switches digital video signals 113A', 113B', . . . , and 113n' supplied from the video input portions 160A, 160B, . . . , and 160n at predetermined timings in for example the horizontal direction and writes them to a memory 163. Alternatively, the memory write control portion 162 may thin out the digital video signals 113A', 113B', . . . , and 113n', map them to the memory 163, and then arrange displays of the digital video signals 113A', 113B', . . . , and 113n' on the display portion 150.

The digital video signals 113A', 113B', . . . , and 113n' written to the memory 163 are read by an output portion 54 and supplied to a display device 101. The digital video signals 113A', 113B', . . . , and 113n' are displayed as display areas 125A, 125B, . . . , and 125n on the display portion 150 of the display device 101.

On the other hand, communication portions 401A, 401B, . . . , and 401n that can bi-directionally communicate with the outside are connected to an internal bus 132. The personal computers 117A, 117B, . . . , and 117n are connected to the communication portions 401A, 401B, . . . , and 401n though control signal paths 231A, 231B, . . . , and 231n, respectively.

An input operation signal that is output from an input device 112 such as a keyboard 110, a mouse 111, a joystick, a remote control commander, or the like is received by an input portion 106 and supplied to an control portion 103 through the internal bus 132. The control portion 103 determines a personal computer as an operative object corresponding to the supplied input operation signal and controls the route of the internal bus 132 so that the input operation signal that is output from the input portion 106 is supplied to the communication portion 401A, 401B, . . . , or 401n corresponding to the personal computer as the operative object.

When a file transfer such as file movement or file copy is performed between personal computers, likewise, the control portion 103 controls the route of the internal bus 132. For example, when a file is moved from the personal computer 117A to the personal computer 117B, the route of the internal bus 132 is controlled so that the file is transferred from the personal computer 117A as the file movement source to the personal computer 117B as the file movement destination.

Thus, even if three, four, or more personal computers can be connected, for example, corresponding to the flow chart shown in FIG. 19, a personal computer as a controllable object is switched corresponding to the coordinates of a mouse cursor 171, the mouse movement amounts, and the relation of the positions of the display areas 125A, 125B, . . . , and 125*n* so that a file copy operation, a file movement operation, or the like can be performed between different personal computers.

According to the fifth embodiment, it is assumed that connection lines for video signals that are output from personal computers are independent from connection lines for communications between the personal computers and the monitor device. However, the present invention is not limited to such an example. Instead, the connection lines for the video signals and the connection lines for communications can be integrally structured.

Displays on a display screen 50 of the personal computers 117A and 117B according to the first and second modifications of the fifth embodiment correspond to those according to the third embodiment shown in FIGS. 21 to 24. Likewise, the file copy process and the file movement process performed between the personal computers 117A and 117B according to the fourth embodiment correspond to those according to the third embodiment shown in FIGS. 19 and 20.

Next, a sixth embodiment of the present invention will be described. According to the sixth embodiment, paths for supplying video signals from personal computers to a monitor device and paths for communications between the personal computers and the monitor device are integrated in the structure according to the fifth embodiment. In other words, a video signal that is output from a personal computer and a control signal and data that are communicated therebetween are sent through an integrated path.

Figure 35:
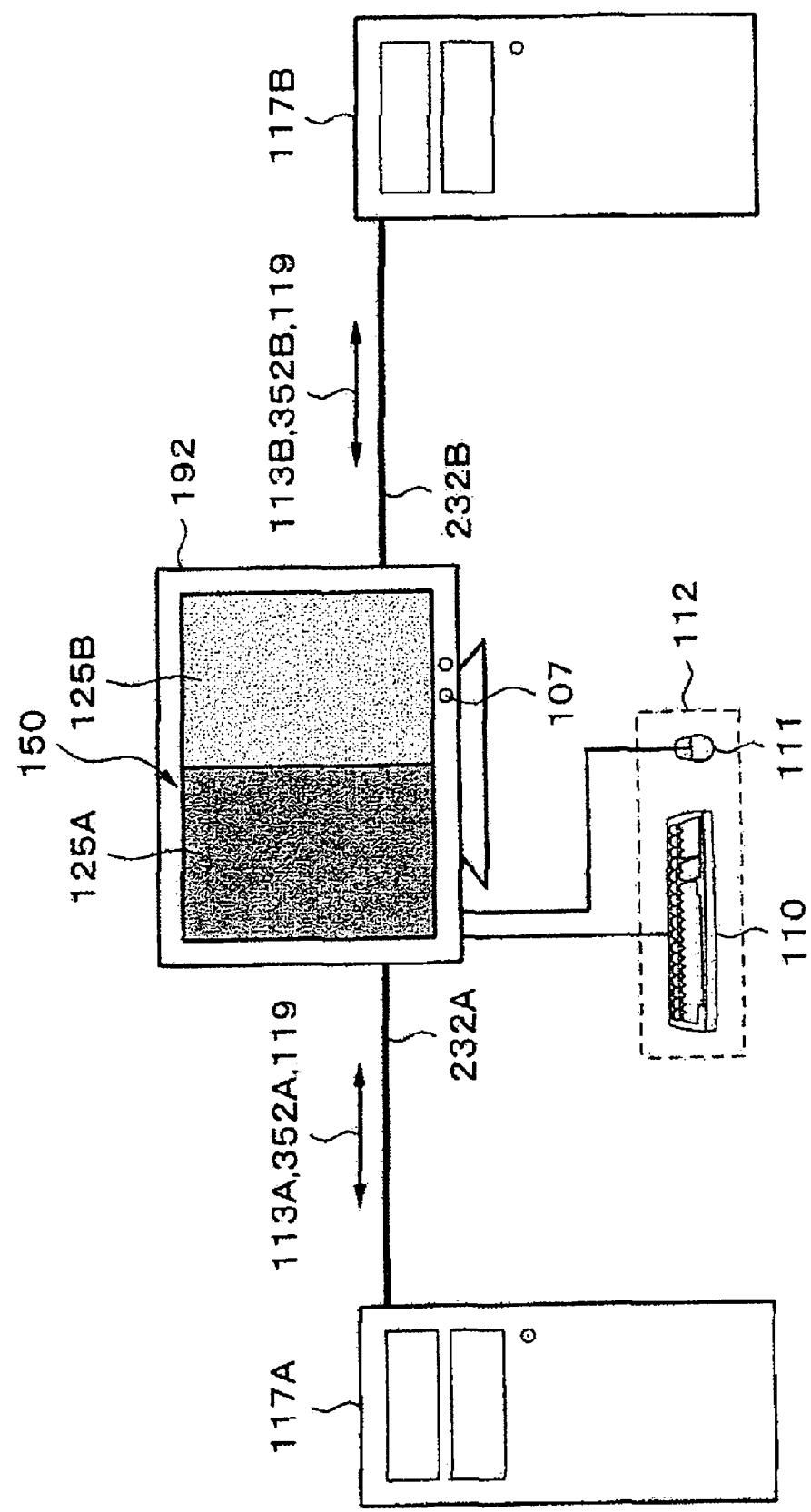
FIG. 35 is a schematic diagram showing the operation of a monitor device according to a sixth embodiment.

FIG. 35 shows an outline of the operation of a monitor device 192 according to the sixth embodiment. In FIG. 35, similar portions to those in FIG. 15 are denoted by similar reference numerals and their detailed description will be omitted. According to the sixth embodiment, a personal computer 117A and a monitor device 192 are connected with one signal path 232A. Likewise, a personal computer 117B and the monitor device 192 are connected with one signal path 232B.

Video signals 113A and 113B that are output from the personal computers 117A and 117B are supplied to the monitor device 192 through the signal paths 232A and 232A, respectively. On the other hand, an input operation signal that is output from an input device 112 such as a keyboard 110, a mouse 111, a joystick, a remote control commander, or the like is supplied to the monitor device 192. The input operation signal supplied to the monitor device 192 is supplied to one of the personal computers 117A and 117B determined as an operative object through the signal path 232A or 232B.

When a command for data transfer such as file movement for example from the personal computer 117A to the personal computer 117B is issued, data 119 that is transferred is supplied from the personal computer 117A to the monitor device 192 through the signal path 232A and sent from the monitor device 192 to the personal computer 117B through the signal path 232B.

The signal paths 232A and 232B may be for example an interface referred to as P & D (Plug & Display) standard established by VESA (Video Electronics Standard Association). According to the standard, the interface has a 35-pin connector and one cable that deals with digital RGB signals, DDC (Display Data Channel), USB, and IEEE 1394. Alternatively, the signal paths 232A and 232B may be an interface referred to as DISM (Digital Interface Standard for Monitor) standard established by JEIDA (Japan Electronic Industry Development Association). According to the standard, the interface has a connector having 13 to 40 pins and one cable that deals with digital RGB signals, DDC, and USB.

When the interface has a sufficiently high data transfer rate, a video signal, a control signal, and data can be sent with one path.

Figure 36:
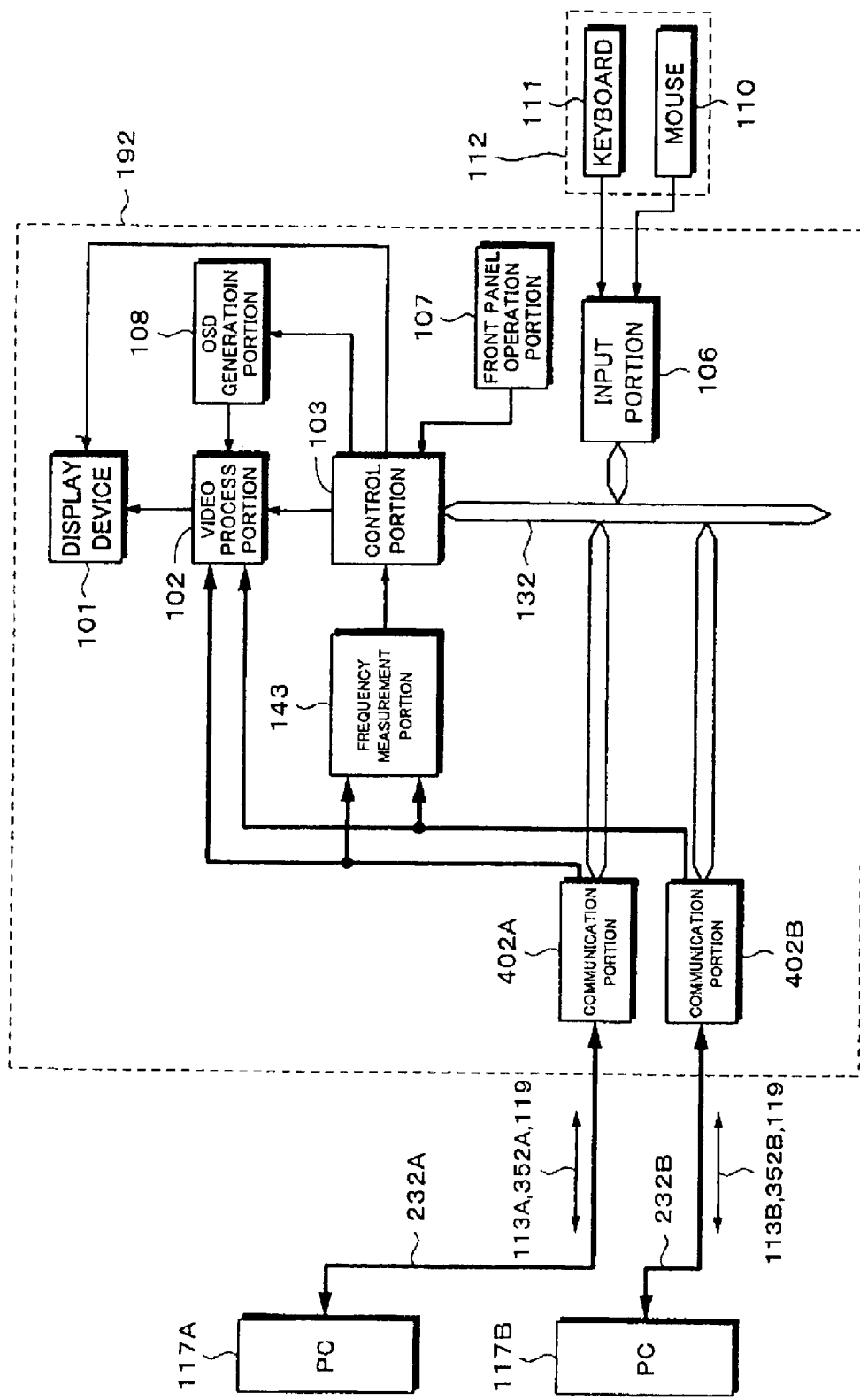
FIG. 36 is a block diagram showing an example of the structure of a monitor device according to the sixth embodiment.

FIG. 36 is a schematic diagram showing an example of the structure of a monitor device 192 according to a sixth embodiment. In FIG. 36, similar portions to those in FIG. 16 are denoted by similar reference numerals and their detailed description will be omitted.

A personal computer 117A and a communication portion 402A are connected with a signal path 232A. A video signal that is output from the personal computer 117A is sent to the signal path 232A. In addition, a control signal 352A and data 119 that are output from the personal computer 117A are sent to the signal path 232A. The signals that are sent through the signal path 232A are received by the communication portion 402A. The communication portion 402A extracts the video signal 113A, the control signal 352A, and the data 119 from the received signals. Likewise, a video signal, a control signal 352B, and data 119 that are sent from the personal computer 117B to a signal path 232B are received by a communication portion 402B. The communication portion 402B extracts the video signal 113B and the control signal 352B from the received signals.

The video signal 113A extracted by the communication portion 402A and the video signal 113B extracted by the communication portion 402B are supplied to a video process portion 102. The synchronous frequencies of the video signals 113A and 113B are measured by a frequency measurement portion 143. The measured synchronous frequencies are supplied to a control portion 103 through an internal bus 132. The control portion 103 obtains synchronous frequency information. The video process portion 102 performs a predetermined process for the supplied video signals 113A and 113B under the control of the control portion 103. The resultant signals are supplied to a display device 101. The display device 101 displays the received signals on for example display areas 125A and 125B.

On the other hand, the control signals 352A and 352B and the data 119 extracted by the communication portions 402A and 402B are supplied to the control portion 103 through the internal bus 132. The control portion 103 controls the route of the internal bus 132 so that the supplied control signals 352A and 352B and data 119 are transferred to a proper transfer destination.

When a predetermined file of the personal computer 117A is moved to the personal computer 117B, the data 119 as the file is sent from the personal computer 117A and received by the communication portion 402A. The received data 119 is supplied to the control portion 103 through the internal bus 132. The control portion 103 supplies the data 119 to the communication portion 402B through the internal bus 132. The data 119 that is supplied to the communication portion 402B is sent to the personal computer 117B through the signal path 232B.

An input operation signal is output from an input device 112 and supplied to an input portion 106. The input operation signal is supplied to the control portion 103 through the internal bus 132. The control portion 103 determines which of the personal computers 117A and 117B is an operative object corresponding to for example the display position of a mouse cursor 171 corresponding to mouse information contained in the input operation signal. For example, when the determined result represents that the personal computer 117A is an operative object, the supplied input operation signal is supplied to the communication portion 402A through the internal bus 132. The communication portion 402A sends the supplied input operation signal to the personal computer 117A through the signal path 232A.

In the above description, the control signals 352A and 352B and the data 119 that are supplied from the personal computers 117A and 117B and the input operation signal that is supplied from the input device 112 are temporarily supplied to the control portion 103 through the internal bus 132. However, the present invention is not limited to such an example. Instead, the control portion 103 may control the route of the internal bus 132 so that data 119 is directly exchanged between the communication portions 402A and 402B. Likewise, under the control of the internal bus 132, the input operation signal may be directly supplied to the communication portions 402A and 402B not through the control portion 103.

Moreover, in the above description, the frequency measurement portion 143 measures the synchronous frequencies of the video signals 113A and 113B extracted by the communication portions 402A and 402B so as to obtain synchronous frequency information. However, the present invention is not limited to such an example. Instead, when the synchronous frequency information is superimposed with the control signals 352A and 352B that are output from the personal computers 117A and 117B and the superimposed signals are sent, the frequency measurement portion 143 can be omitted. In other words, the synchronous frequency information that is superimposed with the control signals 352A and 352B is extracted by the communication portions 402A and 402B, respectively. The extracted synchronous frequency information is supplied to the control portion 103 through the internal bus 132. The control portion 103 extracts the synchronous frequency information from the supplied control signals 352A and 352B. Corresponding to the extracted synchronous frequency information, the control portion 103 controls the process of the video process portion 102 for the video signals 113A and 113B. This operation applies to first and second modifications of the sixth embodiment (that will be described later).

In the above description, the control portion 103, the communication portions 402A and 402B, and the input portion 106 are connected with the internal bus 132. However, the present invention is not limited to such an example. Instead, the communication portions 402A and 402B and the input portion 106 can be directly connected to the control portion 103 not through the internal bus 132. In this case, all signals are exchanged between the communication portions 402A and 402B and the input portion 106 through the control portion 103.

Figure 37:
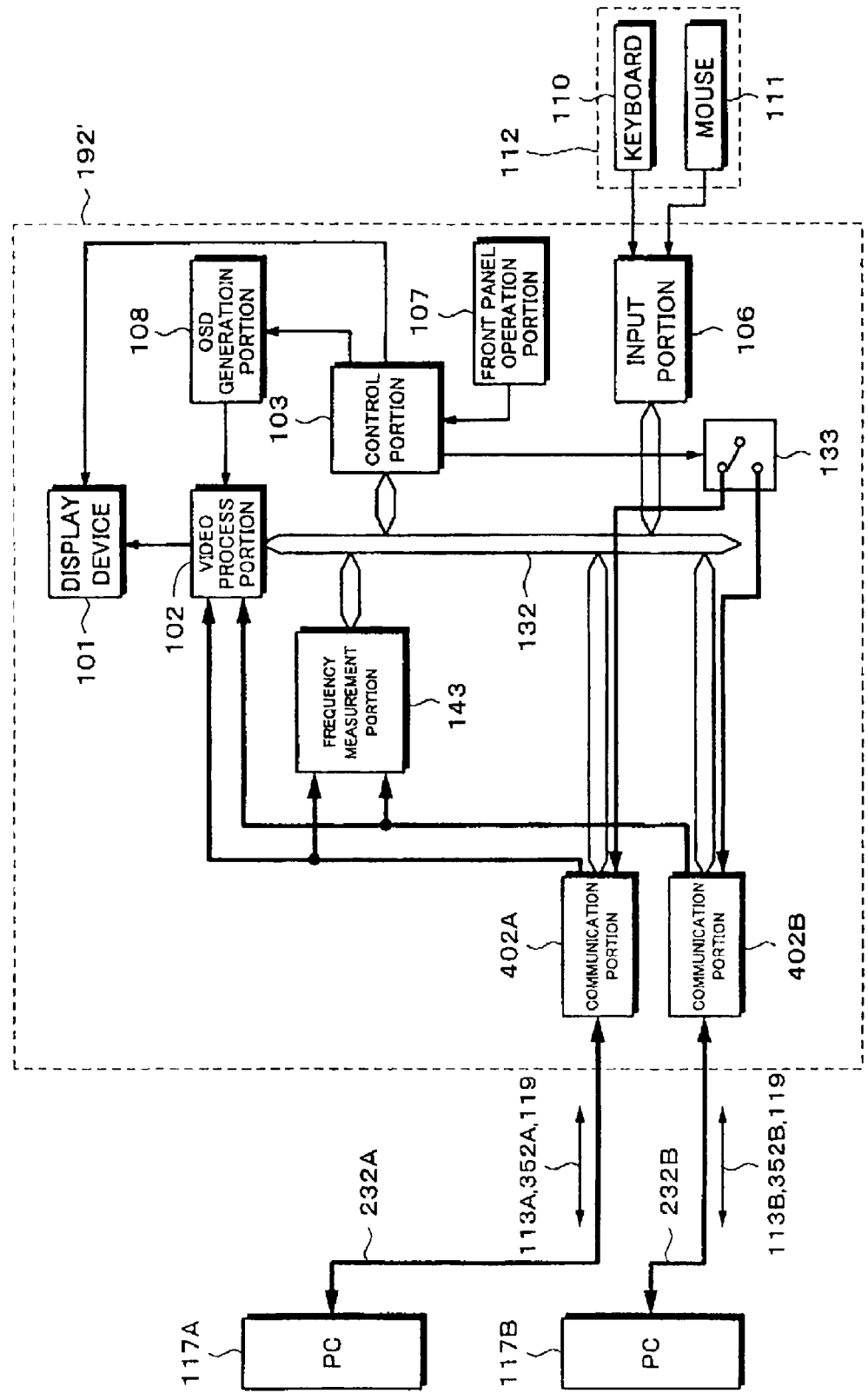
FIG. 37 is a block diagram showing an example of the structure of a monitor device according to a first modification of the sixth embodiment.

FIG. 37 shows an example of the structure of a monitor device 192' according to a first modification of the sixth embodiment. The structure shown in FIG. 37 corresponds to the structure (see FIG. 25) according to the first modification of the third embodiment. An input operation signal that is output from an input portion 106 is supplied to communication portions 402A and 402B through a selector 133. In FIG. 37, similar portions to those in FIG. 16 are denoted by similar reference numerals and their detailed description will be omitted.

According to the first modification, an input operation signal that is sent from an input device 112 to the input portion 106 is supplied to the communication portions 402A and 402B through the selector 133. Corresponding to a control signal that is output from a control portion 103, the selector 133 selects one of the communication portions 402A and 402B to which the input operation signal is supplied. On the other hand, the input operation signal that is output from the input portion 106 is supplied to the selector 133. In addition, the input operation signal is supplied to the control portion 103. Thus, the selector 133 is switched under the control of the control portion 103 corresponding to the input operation signal.

The input operation signal that is output from the input device 112 and received by the input portion 106 is supplied to the control portion 103 through an internal bus 132. In addition, the input operation signal is supplied to the selector 133. The control portion 103 selects one of the personal computers 117A and 117B as an operative object corresponding to for example position information of a mouse cursor 171 of the input operation signal supplied through the internal bus 132. Corresponding to the selected result, the control portion 103 controls the selector 133 so that the input operation signal supplied to the selector 133 is supplied to one of the communication portions 402A and 402B selected as an operative object. The input operation signal is supplied from the communication portion 402A to the personal computer 117A or from the communication portion 402B to the personal computer 117B.

On the other hand, when data 119 is exchanged between the personal computers 117A and 117B, the data 119 that is transferred is output from the personal computer along with the video signal 113A and sent to a signal path 232A. The signal is received by the communication portion 402A. The communication portion 402A extracts the data 119 from the received signal. The extracted data 119 is supplied to the control portion 103 through the internal bus 132. The data 119 supplied to the control portion 103 is supplied to the communication portion 402B from the control portion 103 to the communication portion 402B through the internal bus 132. Thereafter, the data 119 is sent from the communication portion 402B to the personal computer 117B. Alternatively, the data 119 extracted from the signal received by the communication portion 402A may be directly supplied from the communication portion 402A to the communication portion 402B through the internal bus 132 under the control of the control portion 103 for the internal bus 132, not supplied to the control portion 103.

In the structure, only signals that are received by the input portion 106 and that need to be passed through the control portion 103 (namely, signals for file operations such as file movement operation and copy operation) are supplied to the control portion 103 through the internal bus 132. The other signals that do not need to be passed through the control portion 103 can be directly supplied to the communication portions 402A and 402B. Thus, signals that do not need to be passed through the control portion 103 (for example, most of operation commands that are input from the input device 112 by the user) can be sent to the outside not through the internal bus 132. Thus, the traffic of the internal bus 132 can be remarkably decreased.

Figure 38:
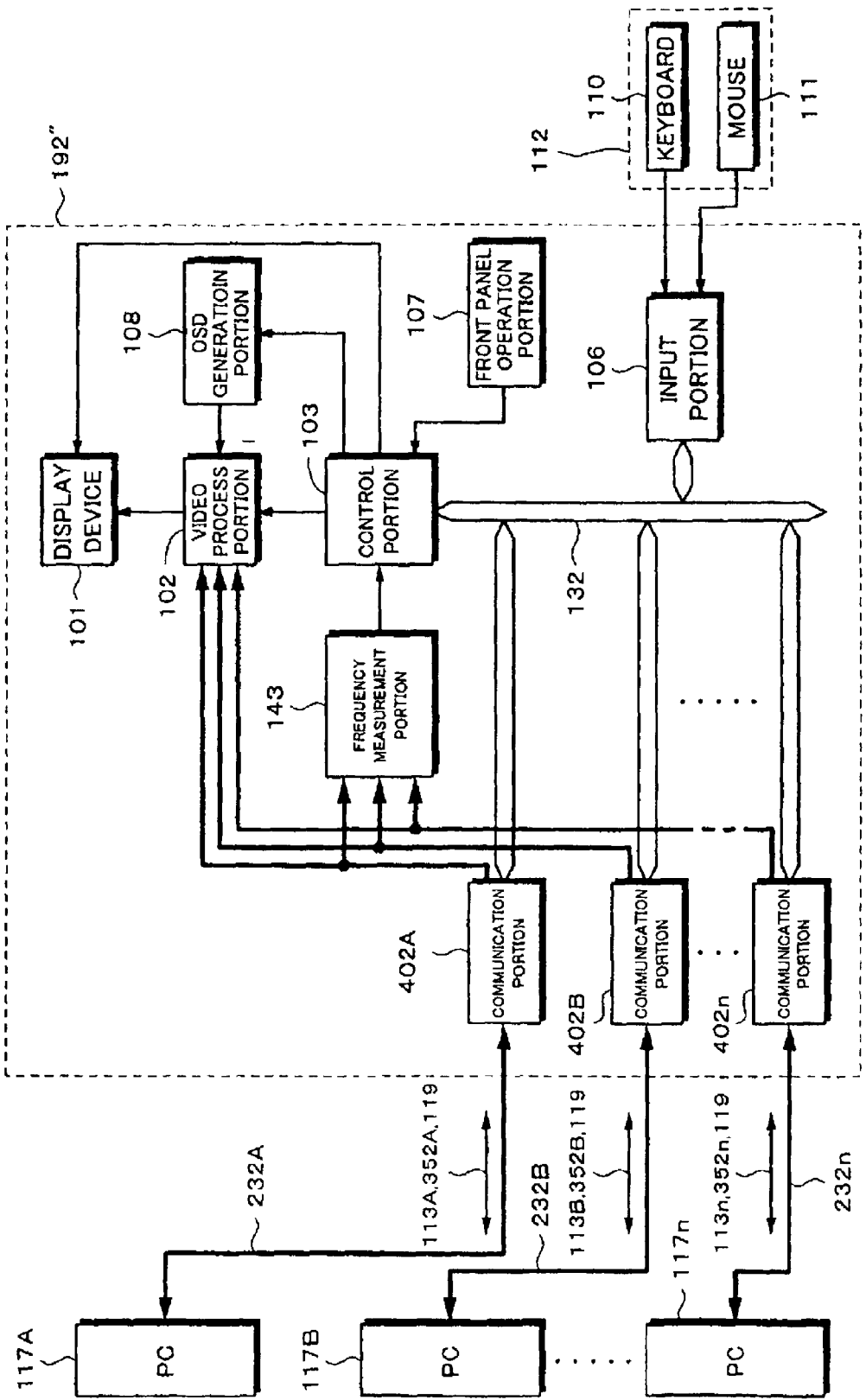
FIG. 38 is a block diagram showing an example of the structure of a monitor device according to a second modification of the sixth embodiment.

Next, a second modification of the sixth embodiment will be described. FIG. 38 shows an example of the structure of a monitor device 192" according to the second modification of the sixth embodiment. The structure shown in FIG. 38 corresponds to the structure (see FIG. 26) of the second modification of the third embodiment. According to the second modification of the sixth embodiment shown in FIG. 38, the sixth embodiment is extended so that the monitor device 191" is connected to three, four, or more personal computers. In FIG. 38, similar portions to those in FIG. 26 are denoted by similar reference numerals and their detailed description will be omitted.

Personal computers 117A, 117B, . . . , and 117n are connected to communication portions 402A, 402B, . . . , and 402n of the monitor device 192 through signal paths 232AA, 232AB, . . . , and 232A*n*, respectively. The communication portions 402A, 402B, . . . , and 402*n* can bi-directionally communicate with the outside.

Video signals 113A, 113B, . . . , and 113*n* that are output from the personal computers 117A, 117B, . . . , and 117*n* are sent to the signal paths 232A, 232B, . . . , and 232*n* and received by the communication portions 402A, 402B, . . . , and 402*n*, respectively. The communication portions 402A, 402B, . . . , and 402*n* extract the video signals 113A, 113B, . . . , and 113*n* from the signals received through the signal paths 232A, 232B, . . . , and 232*n*, respectively. The video signals 113A, 113B, . . . , and 113*n* extracted from the signals received by the communication portions 402A, 402B, . . . , and 402*n* are supplied to a video process portion 102. In addition, the video signals 113A, 113B, . . . , and 113*n* are supplied to a frequency measurement portion 143.

The video process portion 102 and the frequency measurement portion 143 can process the video signals 113A, 113B, . . . , and 113*n* supplied from the many personal computers 117A, 117B, . . . , and 117*n*, respectively. The video process portion 102 has for example video input portions 160A, 160B, . . . , and 160*n* (not shown) corresponding to the video signals 113A, 113B, . . . , and 113*n*, respectively. A memory write control portion 162 switches digital video signals 113A', 113B', . . . , and 113*n*' supplied from the video input portions 160A, 160B, . . . , and 160*n* at predetermined timings in the horizontal direction and writes them to a memory 163. Alternatively, the memory write control portion 162 may thin out the digital video signals 113A', 113B', . . . , and 113*n*' in a predetermined manner, map them to the memory 163, and arranges displays of the video signals 113A', 113B', . . . , and 113*n*' on the display portion 150.

The digital video signals 113A', 113B', . . . , and 113*n*' written to the memory 163 are read to an output portion 54 and supplied to a display device 101. The digital video signals 113A', 113B', . . . , and 113*n*' are displayed as display areas 125A, 125B, . . . , and 125*n* on the display portion 150 of the display device 101.

On the other hand, an input operation signal that is output from an input device 112 such as a keyboard 110, a mouse 111, a joystick, a remote control commander, or the like is received by an input portion 106 and supplied to a control portion 103 through an internal bus 132. The control portion 103 selects a personal computer as an operative object corresponding to the supplied input operation signal and controls the route of the internal bus 132 so that the input operation signal that is input from the input portion 106 is supplied to the communication portion 402A, 402B, . . . , or 402*n* corresponding to the personal computer as the operative object.

When a file transfer such as file movement or file copy is performed between personal computers, likewise, the control portion 103 controls the route of the internal bus 132. For example, when a file is moved from the personal computer 117A to the personal computer 117B, the control portion 103 controls the route of the internal bus 132 so that the file is transferred from the personal computer 117A as the file movement source to the personal computer 117B as the file movement destination.

Thus, when three, four, or more personal computers can be connected, for example, corresponding to the flow chart shown in FIG. 19, a personal computer as a controllable object is switched corresponding to the coordinates of a mouse cursor 171, the mouse movement amounts, and the relation of the positions of the display areas 125A, 125B, . . . , and 125*n* so that file copy, file movement, and so forth can be performed between different personal computers.

Displays on the display screen 50 of the personal computers 117A and 117B according to the sixth embodiment and the first and second modifications thereof correspond to those according to the third embodiment shown in FIGS. 21 to 24. Likewise, the file copy process and the file movement process between the personal computers 117A and 117B according to the fourth embodiment correspond to those according to the third embodiment shown in FIGS. 19 and 20.

In the above description, a plurality of computer devices are connected to a monitor device of the present invention. However, the present invention is not limited to such an example. Instead, a computer device and an STB (Set Top Box) may be connected to the monitor device of the present invention. The STB comprises a control portion (having a CPU, a memory, and so forth), a communication portion (that controls a communication with the outside), and a display control portion (that controls a display). The STB is connected to for example a television receiver or the like. The STB provides various functions such as a receiving function for digital broadcast and picture broadcast and data communication function for the connected television receiver.

When a computer device and an STB are connected to the monitor device of the present invention, a display of the computer device and a display of the STB can be displayed on the monitor device at a time. Using one set of input devices, data transfer can be controlled between those devices.

In other words, so far, music distribution and data distribution using digital broadcast have been proposed. For example, the STB receives digital broadcast. Distributed music data and so forth are input to the STB. An icon that represents the distributed and input music data is displayed in an STB screen area of the monitor device of the present invention. When the icon is moved from the STB screen area to the screen area of the computer device on the screen of the monitor device of the present invention by the drag & drop operation, the distributed music data is transferred from the STB to the computer device. Thus, the data that is received by the STB can be downloaded to the computer device.

According to the present invention, the device connected to the monitor device is not limited to an STB. For example, devices such as a digital video recorder, a DVD (Digital Versatile Disk) player, and a DVD-ROM (Random Access Memory) recorder can be connected to the monitor device of the present invention along with the computer device. A predetermined display screen supplied from a device connected to the monitor device is displayed along with a display screen of the computer device. Data can be transferred between the connected device and computer device.

In the above description, the input device 112 and the input portion 106 communicate in one direction. However, the present invention is not limited to such an example. Instead, the input device 112 and the input portion 106 may bi-directionally communicate with each other. In this case, for example, the keyboard 110 as the input device 112 may have a display device such as an LED (Light Emitting Diode) or a simple LCD so that the control states of the personal computers 117A and 117B and so forth by the monitor device are displayed on the display device.

As was described above, according to the first embodiment of the present invention, a frame memory is disposed in the monitor device 1. In addition, an input and an output of the frame memory are performed through an FIFO. Thus, inputs of video signals whose formats such as frequencies, resolutions, and so forth are different can be displayed as a plurality of screens at a time.

When video signals for a plurality of screens are stored in the frame memory and the read start address of the frame memory is changed, a plurality of screens that are displayed can be scrolled.

In addition, according to the second embodiment of the present invention, the monitor device has an input interface for a keyboard and a mouse. Thus, key information of the keyboard, mouse movement amounts and button operation information of the mouse, and so forth are supplied to the monitor device. In addition, those information is sent to a plurality of personal computers connected through the monitor device. Thus, the keyboard and the mouse can be shared by the plurality of personal computers.

Thus, when a plurality of personal computers are used at a time, it is not necessary to prepare an input means for each of the personal computers. As a result, the installation space can be remarkably reduced.

In addition, according to the second embodiment of the present invention, since the monitor device can obtain key information of the keyboard and the mouse movement amounts and button operation information of the mouse, two-screen display mode can be selected and an active personal computer can be switched using a cursor.

In addition, according to the third embodiment of the present invention, a plurality of computer devices can be connected to the monitor device. In addition, input devices such as a keyboard and a mouse can be connected to the monitor device. On the monitor device, display screens of the connected computer devices are displayed at a time. In addition, the monitor device selects one computer device as an operative object from a plurality of computer devices that are connected and supplies an output of an input device to the selected computer device. Moreover, corresponding to an output of the input device, data transfer is performed among the computer devices.

Thus, when the monitor device according to the third embodiment is used, the user can switch a plurality of computer devices using one set of input devices without a deliberate operation. In addition, while observing the operation states of the plurality of computer devices, the user can perform an operation thereamong.

In addition, on one screen, display screens of a plurality of computer devices are displayed at a time. Using one set of input devices, an icon operation and so forth can be freely performed among display screens of the computer devices. Thus, the user can seamlessly perform an operation among the plurality of computer devices. Thus, since the user does not need to perform a switch operation for the computer devices, the operability is improved.

In addition, display screens of a plurality of computer devices are displayed on one screen at a time. Using one set of input devices, an icon operation and so forth can be freely performed among the display screens of the computer devices. Thus, the user can operate the plurality of computer devices as if he or she operates one computer device.

What is claimed is:

1. A picture display device for displaying a video signal supplied from a data processing device, said picture display device comprising:

display means for displaying a video signal;

video memory interface means for assigning, to each one of a plurality of video signals, memory addresses corresponding to that video signal, the plurality of video signals being respectively associated with a plurality of data processing devices such that a given one of the plurality of video signals is supplied from its associated data processing device;

display control means for controlling said display means to concurrently display the plurality of video signals read from each of the memory addresses associated with the plurality of video signals;

input device connection means for receiving a first control signal corresponding to a user operation on an input device; and control signal output means for outputting the first control signal supplied from said input device to the plurality of data processing devices.

2. The picture display device as set forth in claim 1, wherein said display control means includes:

memory means for storing the plurality of video signals supplied from the plurality of data processing devices; and control means for reading a video signal for one screen of said display means from said memory means.

3. The picture display device as set forth in claim 2, wherein said video memory interface means controls said memory means to store the plurality of video signals at successive addresses, and said control means controls said memory means to designate a range of the successive addresses that corresponds to a video signal for display on one screen of said display means and reads the video signal from said memory means to cause said display means to concurrently display the plurality of video signals.

4. The picture display device as set forth in claim 1, further comprising: operation means for outputting a second control signal that corresponds to a further user operation, the control of said display means being based on the second control signal that is outputted from said operation means.

5. The picture display device as set forth in claim 1, wherein the control of said display control means is based on the first control signal supplied from said input device.

6. The picture display device as set forth in claim 5, wherein said input device is a pointing device for designating a position corresponding to a display of said display means, and when the position designated by said input device is detected, it is determined which of the plurality of video signals displayed on said display means corresponds to position information that represents the detected position, the first control signal being further based on the result of the determination, the first control signal supplied from said input device being selectively supplied to a data processing device corresponding to the video signal designated by the input device.

7. The picture display device as set forth in claim 6, wherein, when the position designated by said input device is moved outside a boundary of a region displaying a first video signal and into a region displaying a second video signal of the plurality of video signals, the second video signal being concurrently displayed on said display means adjacent to the first video signal, a display that represents the position designated by said input device is successively moved from the first video signal to the second video signal.

8. The picture display device as set forth in claim 1, further comprising:

display information display means for generating an information display signal that causes said display means to display information and for combining the generated information display signal with the video signal displayed on said display means; and cursor display means for superimposing the generated cursor display signal with the information display signal corresponding to the position designated by said input device so as to display a cursor, wherein, when the designation of the position by said input device is moved from a display area on said display information display means of a video signal supplied from a data processing device to another display area of said display information display means, the cursor being displayed on the display area of said display information display means.

9. A picture display method for displaying a video signal supplied from a data processing device, said method comprising:
- displaying a video signal;
- assigning, to each one of a plurality of video signals, memory addresses corresponding to that video signal, the plurality of video signals being respectively associated with a plurality of data processing devices such that a given one of the plurality of video signals is supplied from its associated data processing device;
- concurrently controlling displays of a plurality of video signals read from each of the memory addresses associated with the plurality of video signals; and
- outputting a first control signal to the plurality of data process devices, the first control signal being supplied from an input device connected to an input device connection means, the first control signal corresponding to a user operation.

10. A picture display device for displaying a video signal supplied from a data process device, the picture display device comprising:
- communication means for bi-directionally communicating with each of a plurality of data process devices to receive associated control information for each of a plurality of received video signals;
- frequency measurement means for measuring, for each one of the plurality of received video signals, the frequency of the horizontal synchronous signal and the frequency of the vertical synchronous signal associated with that video signal;
- video process means for combining the plurality of received video signals into a combined video signal for display on one screen according to associated picture size information for each of the plurality of video signals, the picture size information associated with a given one of the plurality of video signals being based on the measured frequency of the horizontal synchronous signal and the measured frequency of the vertical synchronous signal associated with that video signal;
- display means for displaying the combined video signal that is outputted from said video signal process means;
- input device connection means for connecting to an input device and for receiving, from the input device, a first control signal based on a user input operation;
- transmission means for generating a second control signal for controlling the plurality of data process devices, the second control signal being based on the first control signal outputted from said input device connection means, and for causing said communication means to transmit the first control signal and the second control signal to the plurality of data process devices; and
- communication control means for controlling said communication means to communicate with each of the plurality of data process devices.

11. The picture display device as set forth in claim 10, wherein said communications means supplies the first control signal to a selected data process device of the plurality of data process devices and notifies the other data process devices that the user input operation has not been performed.

12. The picture display device as set forth in claim 10, wherein a screen of said display means is comprised of a plurality of display areas corresponding to the plurality of data process devices, the plurality of data process devices are controlled so that a control pointer that is displayable in the display areas of the data process devices is moved among specific ones of the display areas according to an operation of the input device, and a data process device corresponding to a display area in which the display pointer is displayed is selected as a controllable object using the first control signal.

13. The picture display device as set forth in claim 12, wherein the communications between said communication means and the plurality of data process devices are controlled on the screen of said display means using the input device.

14. The picture display device as set forth in claim 10, further comprising:
- means for issuing an operation command intended for the plurality of data process devices, the operation command being transmitted to the plurality of data process devices by said communication means.

15. The picture display device as set forth in claim 10, further comprising:
- operation means for outputting a third control signal corresponding to a further user control operation, wherein control of said video process means is based on the third control signal.

16. The picture display device as set forth in claim 15, further comprising:
- means for issuing an operation command for the plurality of data process devices,
- the issuance of the operation command being controlled according to the third control signal.

17. The picture display device as set forth in claim 10, further comprising:
- picture generation means for generating a picture portion that represents a display state of a picture displayed by said display means, control states of each of the plurality of data process devices, and a control state of the picture display device.

18. The picture display device as set forth in claim 17, wherein said picture generation means generates a picture portion that represents display states of pictures formed of the combined video signals displayed by said display means and that represents communication states among the plurality of data process devices.

19. A method of displaying a video signal supplied from a data process device, said method comprising:
- bi-directionally communicating with each one of a plurality of data process devices to receive associated control information for each of a plurality of received video signals;
- measuring, for each one of the plurality of received video signals, the frequency of the horizontal synchronous signal and the frequency of the vertical synchronous signal associated with that video signal;
- combining the plurality of received video signals into a combined video signal for display on one screen according to associated picture size information for each of the plurality of video signals, the picture size information associated with a given one of the plurality of video signals being based on the measured frequency of the horizontal synchronous frequency of the vertical synchronous signal associated with that video signal;
- displaying the combined video signal;
- receiving, from an input device, a first control signal based on a user input operation;
- generating a second control signal for controlling the plurality of data process devices, the second control signal being based on the first control signal;
- transmitting the first control signal and the second control signal to the plurality of data process devices; and
- controlling communications with the plurality of data process devices such that the plurality of data process devices bi-directionally communicates with each other.

* * * * *